United States Patent
Benayon et al.

(10) Patent No.: US 7,908,161 B2
(45) Date of Patent: Mar. 15, 2011

(54) METHOD AND APPARATUS FOR BUSINESS PROCESS TRANSFORMATION WIZARD

(75) Inventors: Jay William Benayon, Thornhill (CA); Kaori Fujiwara, Yamato (JP); Makoto Kano, Yokohama (JP); Akio Koide, Yokohama (JP); Bala Ramachandran, Harrison, NY (US)

(73) Assignee: International Business Machines Corporation, Armonk, NY (US)

( * ) Notice: Subject to any disclaimer, the term of this patent is extended or adjusted under 35 U.S.C. 154(b) by 231 days.

(21) Appl. No.: 12/053,169

(22) Filed: Mar. 21, 2008

(65) Prior Publication Data
US 2009/0112663 A1    Apr. 30, 2009

Related U.S. Application Data

(63) Continuation of application No. 11/341,729, filed on Jan. 30, 2006, now abandoned.

(51) Int. Cl.
G06F 9/44 (2006.01)
G06F 17/50 (2006.01)

(52) U.S. Cl. ................................. 705/7; 705/1; 705/8
(58) Field of Classification Search .............. 705/1, 7–8
See application file for complete search history.

(56) References Cited

U.S. PATENT DOCUMENTS

| | | | |
|---|---|---|---|
| 5,706,405 A * | 1/1998 | Short et al. | 706/45 |
| 5,890,133 A * | 3/1999 | Ernst | 705/7 |
| 2001/0041995 A1 * | 11/2001 | Eder | 705/7 |
| 2002/0038228 A1 * | 3/2002 | Waldorf et al. | 705/7 |
| 2003/0110249 A1 * | 6/2003 | Buus et al. | 709/224 |
| 2003/0187707 A1 * | 10/2003 | Hack et al. | 705/7 |
| 2003/0233273 A1 | 12/2003 | Jin et al. | |
| 2003/0236691 A1 * | 12/2003 | Casati et al. | 705/8 |
| 2004/0034857 A1 | 2/2004 | Mangino et al. | |
| 2004/0078777 A1 | 4/2004 | Bahrami | |
| 2004/0103396 A1 | 5/2004 | Nehab | |

(Continued)

FOREIGN PATENT DOCUMENTS

WO    WO99/63503    12/1999

OTHER PUBLICATIONS

MOF Executive Overview, Microsoft Operations Framework, Published Oct. 2002.*

(Continued)

*Primary Examiner* — Beth V Boswell
*Assistant Examiner* — Nadja Chong Cruz
(74) *Attorney, Agent, or Firm* — Whitham, Curtis, Christofferson & Cook, P.C.; Stephen C. Kaufman

(57) ABSTRACT

A computer implemented method and a computer system implementing the method of a business process transformation wizard leads a business analyst through a series of steps to invoke business transformation patterns, in order to analyze the results of those processes. The wizard first prompts the business analyst to specify business objectives of process transformation. Required parameters are added to the business process model guided by the business process transformation wizard until the business process model is completed. Once the model is completed, the wizard prompts the business analyst to select transformation techniques or patterns for optimizing process parameters and, for each selected transformation pattern, optimizes process parameters using a selected optimization technique. The wizard also prompts the business analyst to select transformation patterns for optimizing topology of the business process and, for each selected transformation pattern, optimizes topology for the business process using a selected optimization technique.

8 Claims, 54 Drawing Sheets

U.S. PATENT DOCUMENTS

| | | | |
|---|---|---|---|
| 2004/0176968 A1* | 9/2004 | Syed et al. ......................... | 705/1 |
| 2005/0065904 A1* | 3/2005 | DeAngelis et al. ................ | 707/1 |
| 2005/0080609 A1 | 4/2005 | Bhaskaran et al. | |
| 2005/0147946 A1 | 7/2005 | Ramamurthy et al. | |
| 2005/0165822 A1* | 7/2005 | Yeung et al. .................. | 707/102 |

OTHER PUBLICATIONS

Christoph Hartwich, Flexible Distributed Process Topologies for Enterprise Applications, SEM 2002, pp. 1-19, 2003.*

IBM Business Consulting Services, Component business models, Making specialization real, IBM Institute for Business Value, 2005.*

Adams et al., Patterns for e-business, a strategy for reuse, IBM Press, Sep. 2001.*

Effective Uses of Business Process Simulation; A. Greasley; Proceedings of the 2000 Winter Simulation Conference; pp. 2004-2009.

Analyzing and Re-Engineering Business Processes Using Simulation; R. Bhaskar, et al.; Proceedings of the 1994 Winter Simulation conference; pp. 1206-1213.

Simulation Satyagraha, A Successful Strategy for Business Process Reengineering; D. Bridgeland, et al.; Proceedings of the 1994 Winter Simulation Conference; pp. 1214-1220.

Simulation of Business Processes; Paul, et al..; 42 (10): 1551; American Behavioral Sciences.

* cited by examiner

Business Process Transformation wizard

Step 11 Specify potential impact level on each task as a result of introduction of IT solution

Level of Automation

| Process | As-is Level | To-Be Level | IT Solution Cost | | |
|---|---|---|---|---|---|
| | | | One Time | Ongoing | |
| Identify EC req/Opp | Manual | Fully Automated | $ | $ | hour |
| Rework EC Case | Manual | Partially Automated | $ | $ | unit |
| Distribute EC for Feedback | Manual | Manual | $ | $ | unit |
| Get Engg Feedback | Manual | Manual | $ | $ | unit |
| Get Manufacturing Feedback | Manual | Manual | $ | $ | unit |
| Get Procurement Feedback | Manual | Manual | $ | $ | unit |
| Get Service Feedback | Manual | Manual | | | |

Back | Next > | Finish | Cancel

*Figure 37*

METHOD AND APPARATUS FOR BUSINESS PROCESS TRANSFORMATION WIZARD

CROSS REFERENCE TO RELATED APPLICATION

This application is a continuation of application Ser. No. 11/341,729 filed Jan. 30, 2006, now abandoned.

BACKGROUND OF THE INVENTION

1. Field of the Invention

The present application generally relates to business process modeling and, more particularly, to a methodology and apparatus for a Business Process Transformation Wizard (BPTW) which assists a business analyst in identifying and analyzing business process transformation opportunities.

2. Background Description

Business process modeling is a technology aimed at modeling business processes and analyzing them with the objective of using the analyses to drive process transformations. Business process modeling tools have underlying capabilities such as simulation that helps business analysts to understand and quantify the impact of different process transformations on process Key Performance Indicators (KPIs). Even though business process modeling is widely used, analytic capabilities such as simulation are used to a much lesser degree because developing and running simulation models and interpreting their results is seen as a complicated activity by a majority of business analysts. As a result, many business analysts consider such tools as only suitable for experts in the field and are hampered in unlocking the full potential of business process modeling for identifying and assessing business process transformation options. Hence, there is a need for developing a methodology and apparatus that enable business analysts to use quantitative analysis methods easily towards the overall objective of business process transformation.

SUMMARY OF THE INVENTION

According to the present invention, there is provided a Business Process Transformation Wizard (BPTW) which enables the transformation of business process models by identifying business process transformation opportunities and analyzing their performance under different scenarios. The net result is the construction of an improved business process model, as specified by selected Key Performance Indicators (KPIs). In order to analyze the business process performance under different scenarios, the BPTW may invoke different analysis techniques such as simulation, optimization, queuing analytics, systems dynamics etc. The Wizard also interprets the scenario analysis results both to communicate them in a suitable form to business analysts and also to suggest potential focus areas for transformation. Thus, it also alleviates the need to be an expert in the analysis techniques, which is a barrier in their current use.

This invention achieves this by encapsulating the methodology that an expert would use in developing and interpreting analysis models such as simulation models. The Business Process Transformation Wizard (BPTW) guides business analysts in specifying data that is required for the analysis and also interprets the results to deliver business insights. Furthermore, the BPTW can also encapsulate knowledge by identifying the process patterns where specific transformation patterns are most suitable, so that this knowledge can be leveraged in other situations to identify appropriate business process transformation options.

BRIEF DESCRIPTION OF THE DRAWINGS

The foregoing and other objects, aspects and advantages will be better understood from the following detailed description of a preferred embodiment of the invention with reference to the drawings, in which:

FIG. 37 is a screen print showing the screen prompting the analyst to specify potential impact level on each task as a result of introduction of IT solution and related parameters such as costs;

DETAILED DESCRIPTION OF A PREFERRED EMBODIMENT OF THE INVENTION

Figure 1:
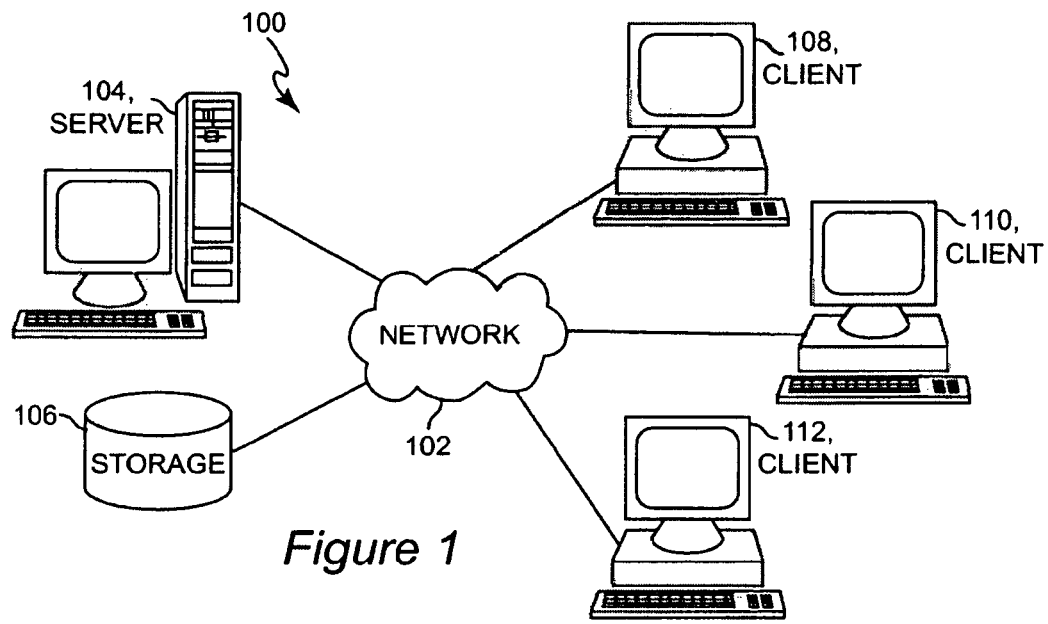
FIG. 1 is a block diagram of a computer system on which the method according to the invention may be implemented.

Referring now to the drawings, and more particularly to FIG. 1, there is shown a computer system on which the method according to the invention may be implemented. Computer system 100 contains a network 102, which is the medium used to provide communications links between various devices and computers connected together within computer system 100. Network 102 may include permanent connections, such as wire or fiber optic cables, wireless connections, such as wireless Local Area Network (WLAN) products based on the IEEE 802.11 specification (also known as Wi-Fi), and/or temporary connections made through telephone, cable or satellite connections, and may include a Wide Area Network (WAN) and/or a global network, such as the Internet. A server 104 is connected to network 102 along with storage unit 106. In addition, clients 108, 110 and 112 also are connected to network 102. These clients 108, 110 and 112 may be, for example, personal computers or network computers. For purposes of this application, a network computer is any computer, coupled to a network, which receives a program or other application from another computer coupled to the network. The server 104 provides data, such as boot files, operating system images, and applications to clients 108, 110 and 112. Clients 108, 110 and 112 are clients to server 104.

Computer system 100 may include additional servers, clients, and other devices not shown. In the depicted example, the Internet provides the network 102 connection to a worldwide collection of networks and gateways that use the TCP/IP (Transmission Control Protocol/Internet Protocol) suite of protocols to communicate with one another. At the heart of the Internet is a backbone of high-speed data communication lines between major nodes or host computers, consisting of thousands of commercial, government, educational and other computer systems that route data and messages. In this type of network, hypertext mark-up language (HTML) documents and applets are used to exchange information and facilitate commercial transactions. Hypertext transfer protocol (HTTP) is the protocol used in these examples to send data between different data processing systems. Of course, computer system 100 also may be implemented as a number of different types of networks such as, for example, an intranet, a local area network (LAN), or a wide area network (WAN). FIG. 1 is intended as an example, and not as an architectural limitation for the present invention.

Figure 2:
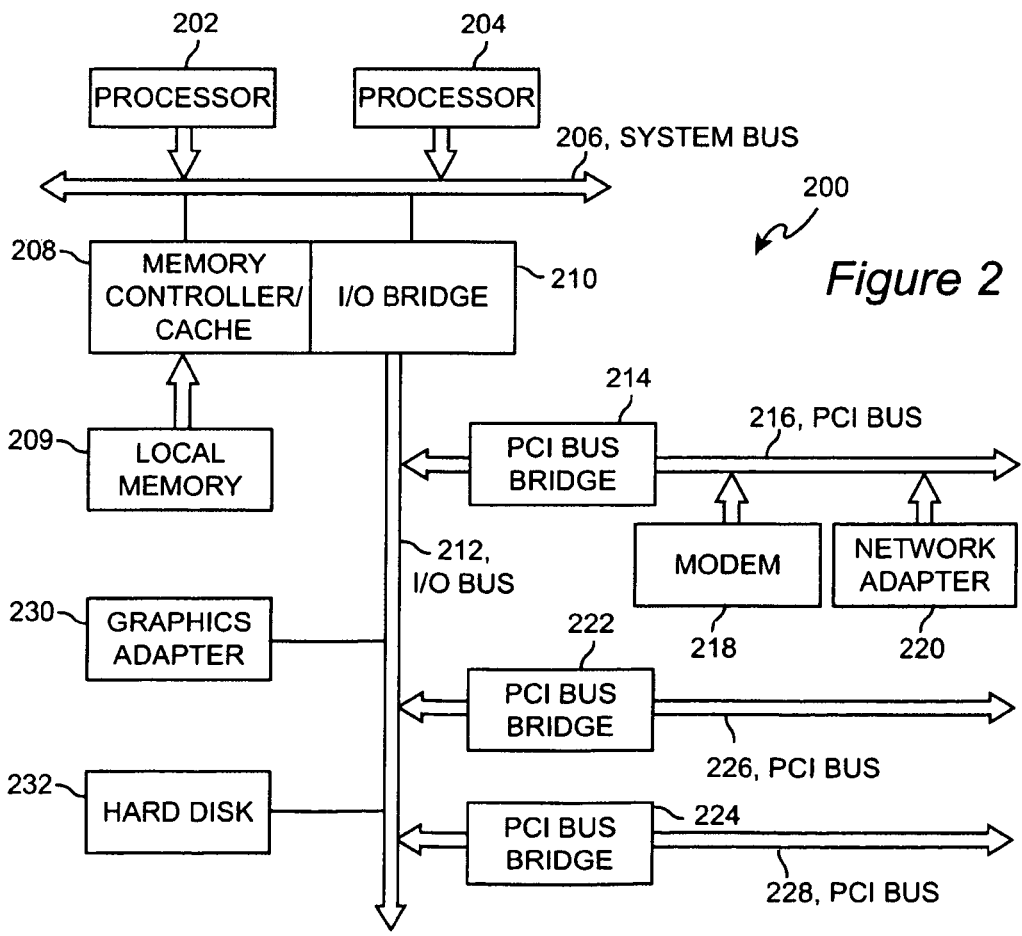
FIG. 2 is a block diagram of a server used in the computer system shown in FIG. 1.

Referring to FIG. 2, a block diagram of a data processing system that may be implemented as a server, such as server 104 in FIG. 1, is depicted in accordance with a preferred embodiment of the present invention. Server 200 may be used to execute any of a variety of business processes. Server 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. Input/Output (I/O) bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IEBM RISC/System 6000 system, a product of International Business Machines Corporation in Armonk, N.Y., running the Advanced Interactive Executive (AIX) operating system.

Figure 3:
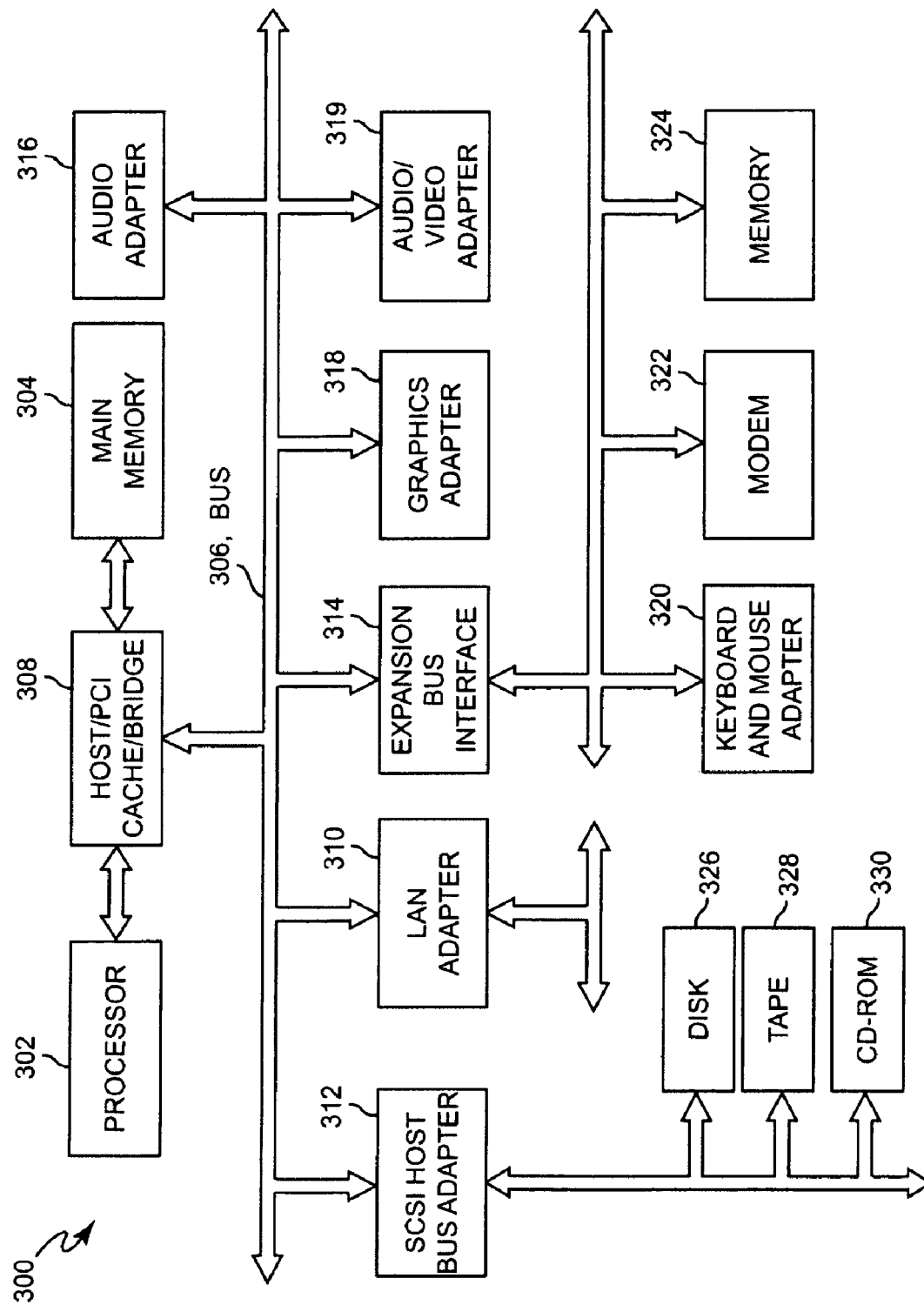
FIG. 3 is a block diagram of a client used in the computer system shown in FIG. 1.

With reference now to FIG. 3, a block diagram illustrating a client computer is depicted in accordance with a preferred embodiment of the present invention. Client computer 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards.

In the depicted example, local area network (LAN) adapter 310, Small Computer System Interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object-oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, and/or I/O devices, such as Universal Serial Bus (USB) and IEEE 1394 devices, may be used in addition to or in place of the hardware depicted in FIG. 3. Also, the processes of the present invention may be applied to a multiprocessor data processing system.

Data processing system 300 may take various forms, such as a stand alone computer or a networked computer. The depicted example in FIG. 3 and above-described examples are not meant to imply architectural limitations.

Business users are interested in business process modeling with the broad objective of business process transformation, but most business users find simulation and optimization to be complex. We describe here a specific embodiment of the Business Process Transformation Wizard (BPTW) which is meant to be a bridge that enables business users to leverage quantitative analysis techniques for business process transformation. This is described as a sequence of steps that the Wizard takes the business analyst through, and these steps are illustrated by way of screen prints.

Figure 4:
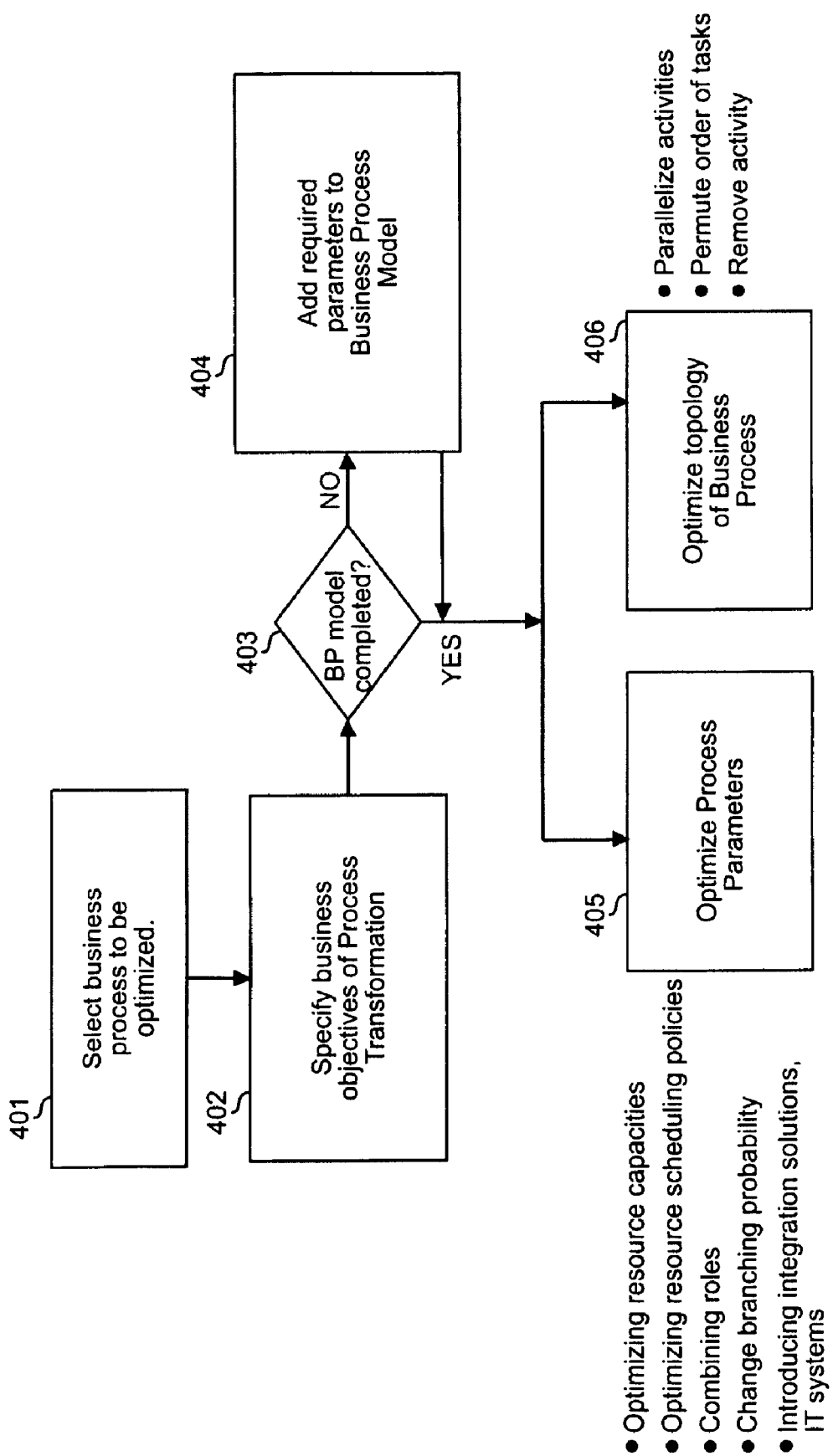
FIG. 4 is a flow diagram illustrating the overall process of the Business Process Transform Wizard (BPTW) according to the invention.

FIG. 4 illustrates by way of a flow diagram the overall process of the Business Process Transformation Wizard (BPTW). As will become clear from the following description, the process is simplified for the business analyst by the Wizard. The process begins in function block 401 where the business process to be optimized is selected. Next, in function block 402 the business objectives of the process transformation are specified. At decision block 403, a determination is made as to whether the business process model is completed. If not, the business process model is further developed and the required parameters are added to the business process model in function block 404. When the business process model is completed, the process splits into two branches. The first of these in function block 405 is to optimize process parameters. More specifically, a number of business process transformation patterns can be leveraged to assess potential process transformation options. These transformation patterns include:

Optimize resource capacities,
Optimize resource scheduling policies
Combine roles,
Change branching probability, and
Introduce integration solutions, IT (Information Technology) systems.

The second branch in function block 406 optimizes the topology of the business process. This step also leverages a number of Business Process Transformation patterns to assess potential process transformation options. These patterns include:
   Parallelize activities,
   Permute the order of tasks, and
   Remove activities.
The BPTW may use a knowledge database that contains specific information of the effectiveness of different transformation patterns on specific business process patterns. Inputs for the BPTW may be obtained from a design-time business process modeling system or, in the alternative, from a run-time business process monitoring system. Outputs of the BPTW may be deployed in a run-time business process in a business process management system.

Figure 54:
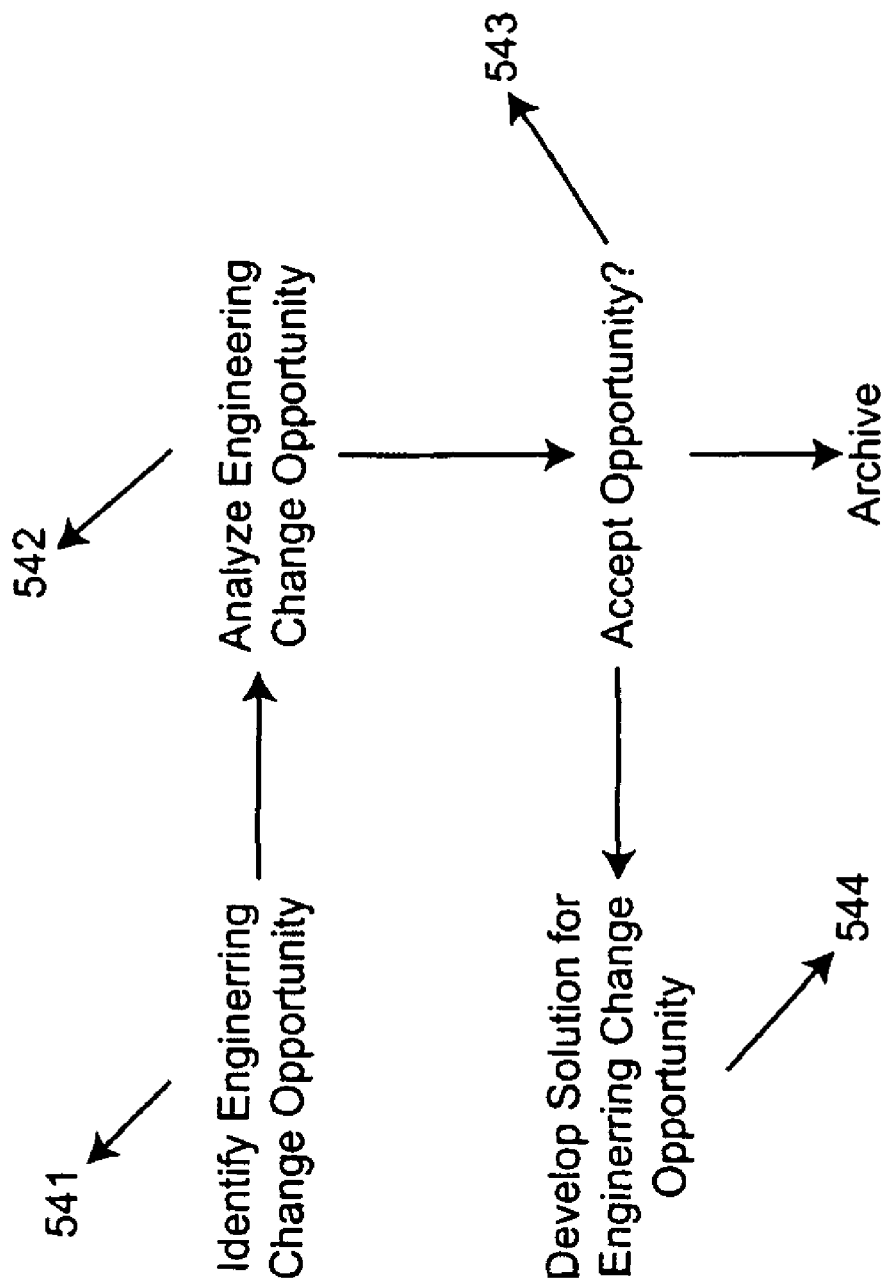
FIG. 54 is a diagram illustrating an example business process based on engineering Change Management.

We will illustrate the preferred embodiment using an example business process based on Engineering Change Management, a schematic of which is shown in FIG. 54. In this process, potential engineering change opportunities are identified in activity 541 "Identify Engineering Change Opportunity". Identified opportunities are then analyzed by different people in the organization in activity 542 "Analyze Engineering Change Opportunity" and feedback obtained. Then, feedback is analyzed to make a decision on whether to accept the opportunity for implementation in the decision node 543 "Accept Opportunity". If the opportunity is accepted, then a solution is developed to address the opportunity in activity 544 "Develop Solution"; or else, the identified opportunity is archived. We will use this process as an example to illustrate how the Business Process Transformation Wizard as exemplified in this embodiment, can serve to identify and assess business process transformation opportunities.

Figure 5:
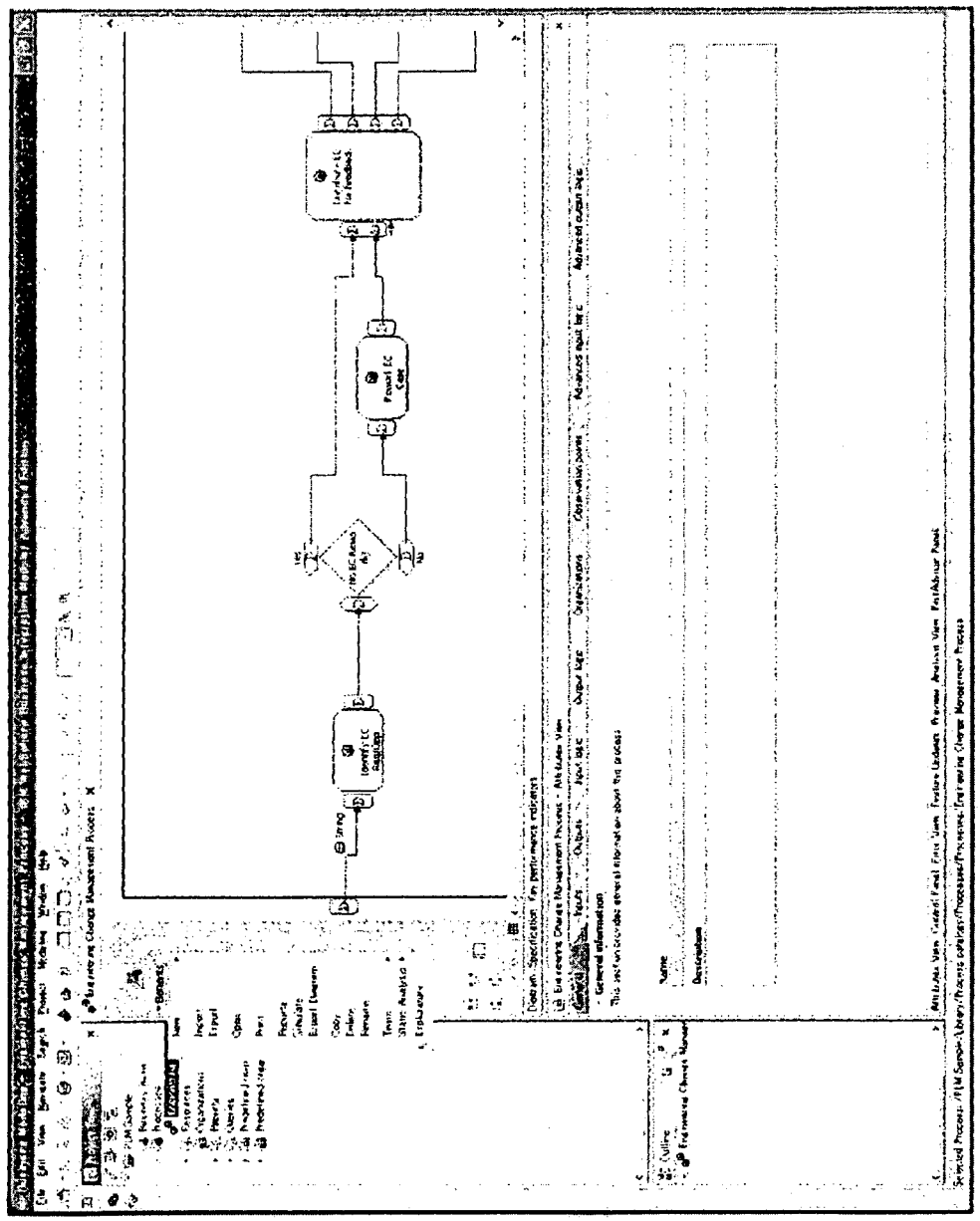
FIG. 5 is a screen print of the opening screen of the Business Process Transform Wizard (BPTW)
Figure 6:
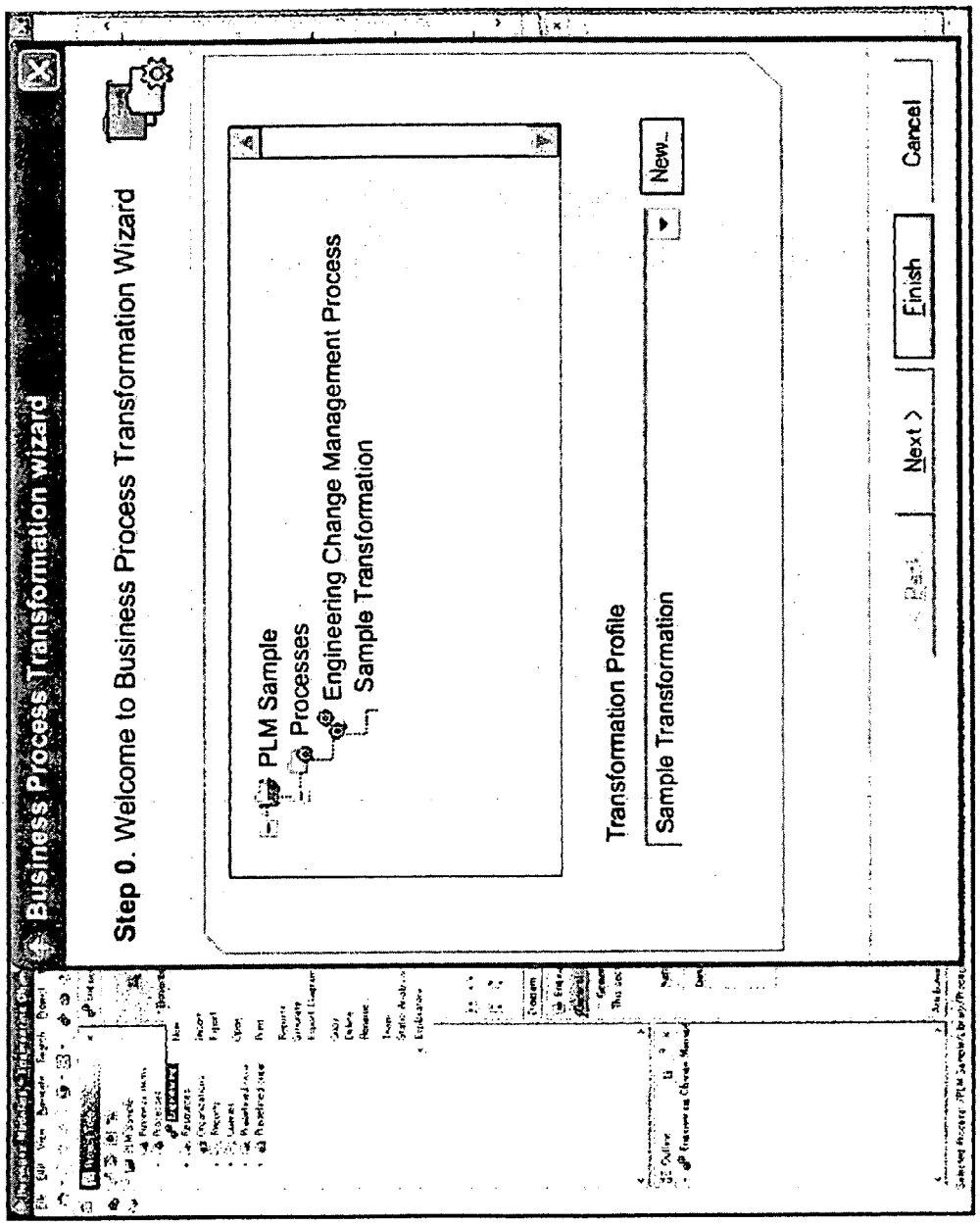
FIG. 6 is a screen print of the opened Business Process Transform Wizard (BPTW)
Figure 7:
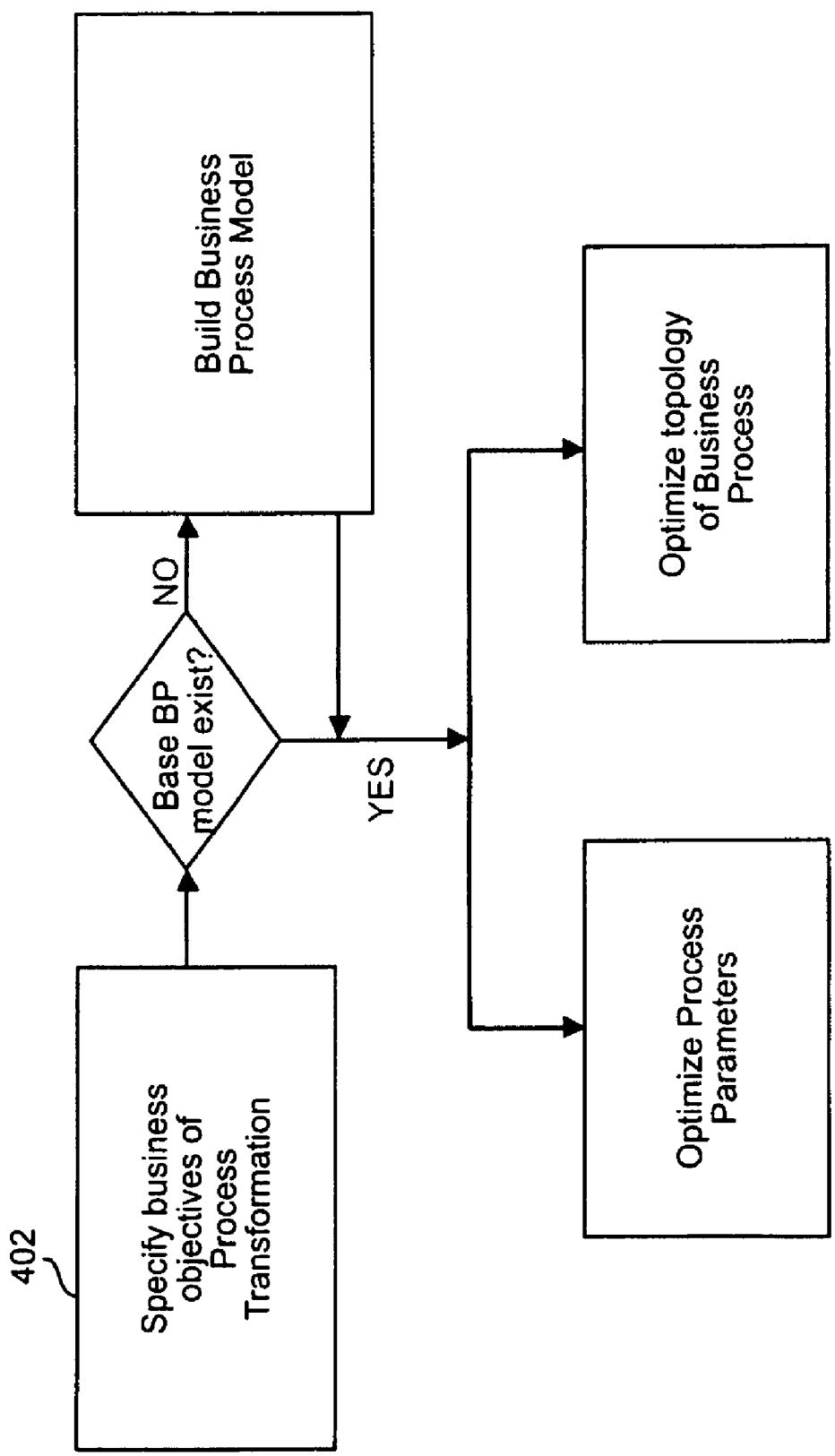
FIG. 7 is a flow diagram illustrating the process of specifying business objectives of process transformation.
Figure 8:
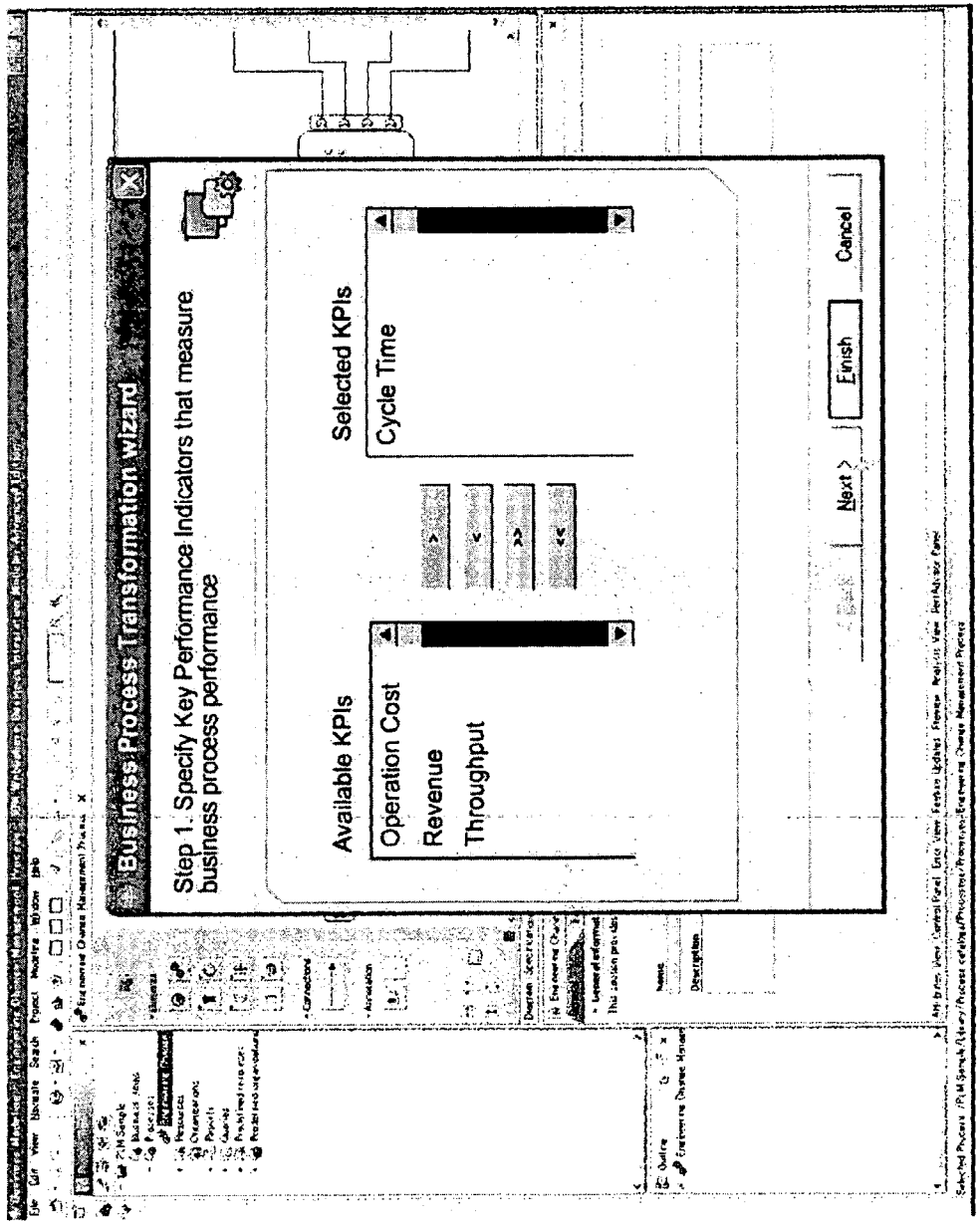
FIG. 8 is a screen print of the screen prompting the analyst to specify Key Performance Indicators (KPIs)

FIG. 5 shows the open Business Process Transformation Wizard (BPTW) screen, and FIG. 6 shows the screen once the Wizard has been opened. Notice the button at the bottom of the screen which is labeled "Next". The business analyst would select this button to continue. As shown in FIG. 7, this invokes that part of the of the process of FIG. 4 in function block 402 which is "Specify business objectives of process transformation". When the "Next" button in FIG. 6 is selected, the screen shown in FIG. 8 is displayed. Note at the top of the window is the legend "Step 1. Specify Key Performance Indicators that measure business process performance". This is the first step in a series of steps that the Business Process Transformation Wizard (BPTW) leads the business analyst through. This screen requests or prompts the business analyst to specify Key Performance Indicators (KPIs) that measure business process performance. This can be chosen from a list of KPIs, such as cost, revenue, resource utilization, etc. In the example shown, the business analyst makes selections from the available KPIs shown in the left hand menu and adds those selections to the right hand menu by selecting the right pointing arrow between the menus. Corrections to the selections can be made by making appropriate selections in the right hand menu and then selecting the left pointing arrow, which restores the selection to the left hand menu. All items in the left hand menu can be selected and moved to the right hand menu by selecting the double right hand arrow and, conversely, all items in the right hand menu can be restored to the left hand menu by selecting the double left hand arrow.

Figure 9:
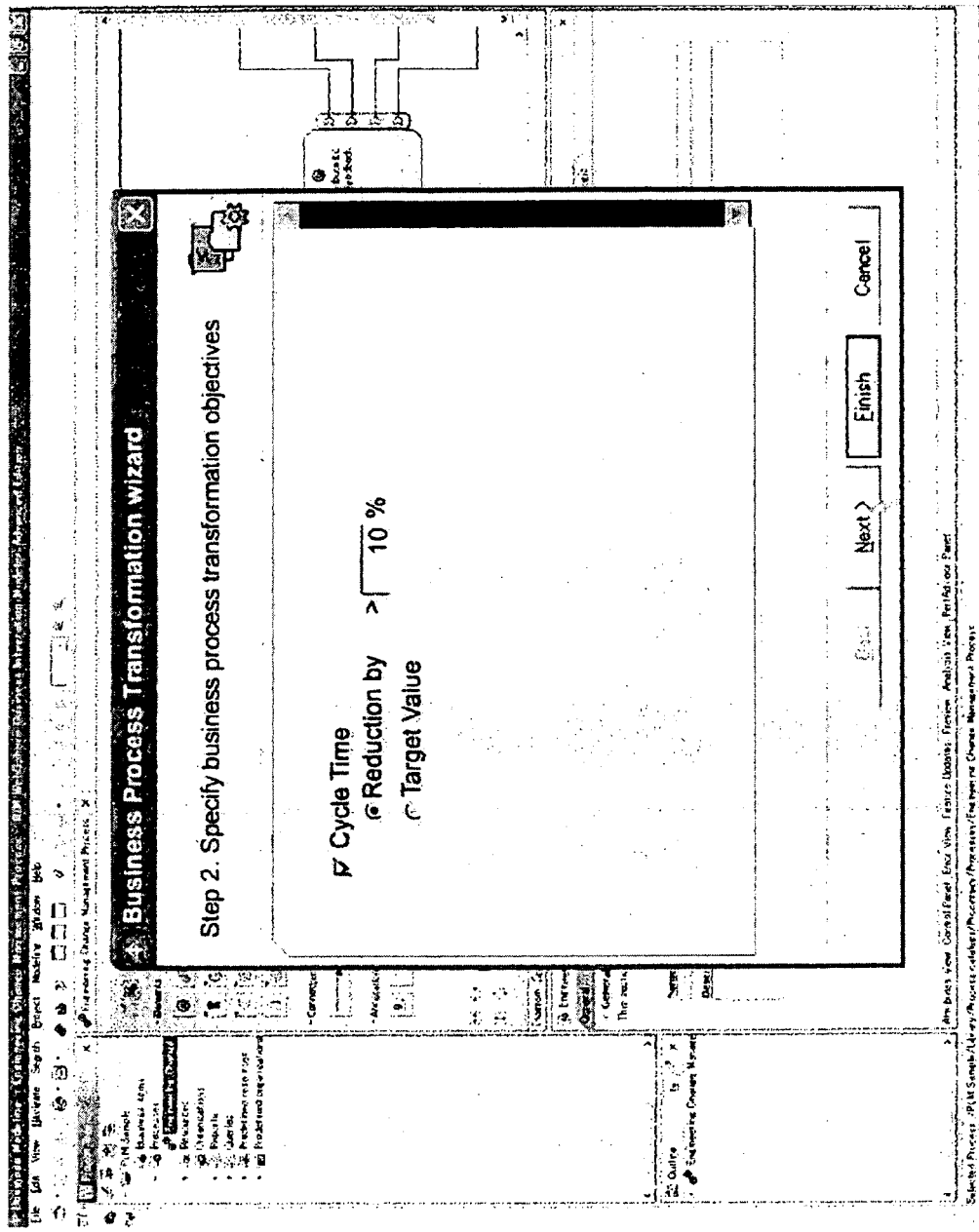
FIG. 9 is a screen print of the screen prompting the analyst to specify business transformation objectives.
Figure 10:
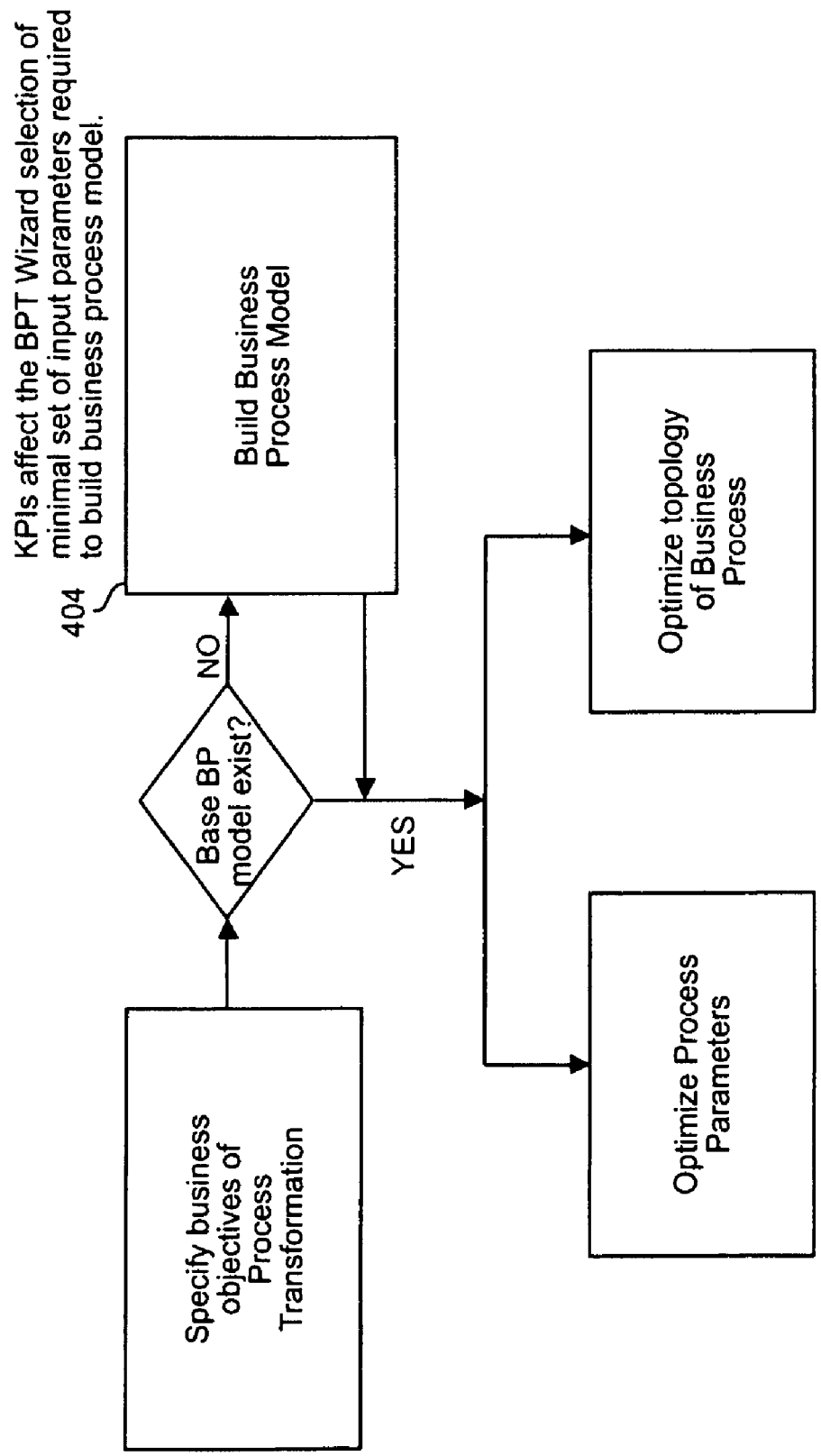
FIG. 10 is a flow diagram illustrating the process of building a business process model.
Figure 11:
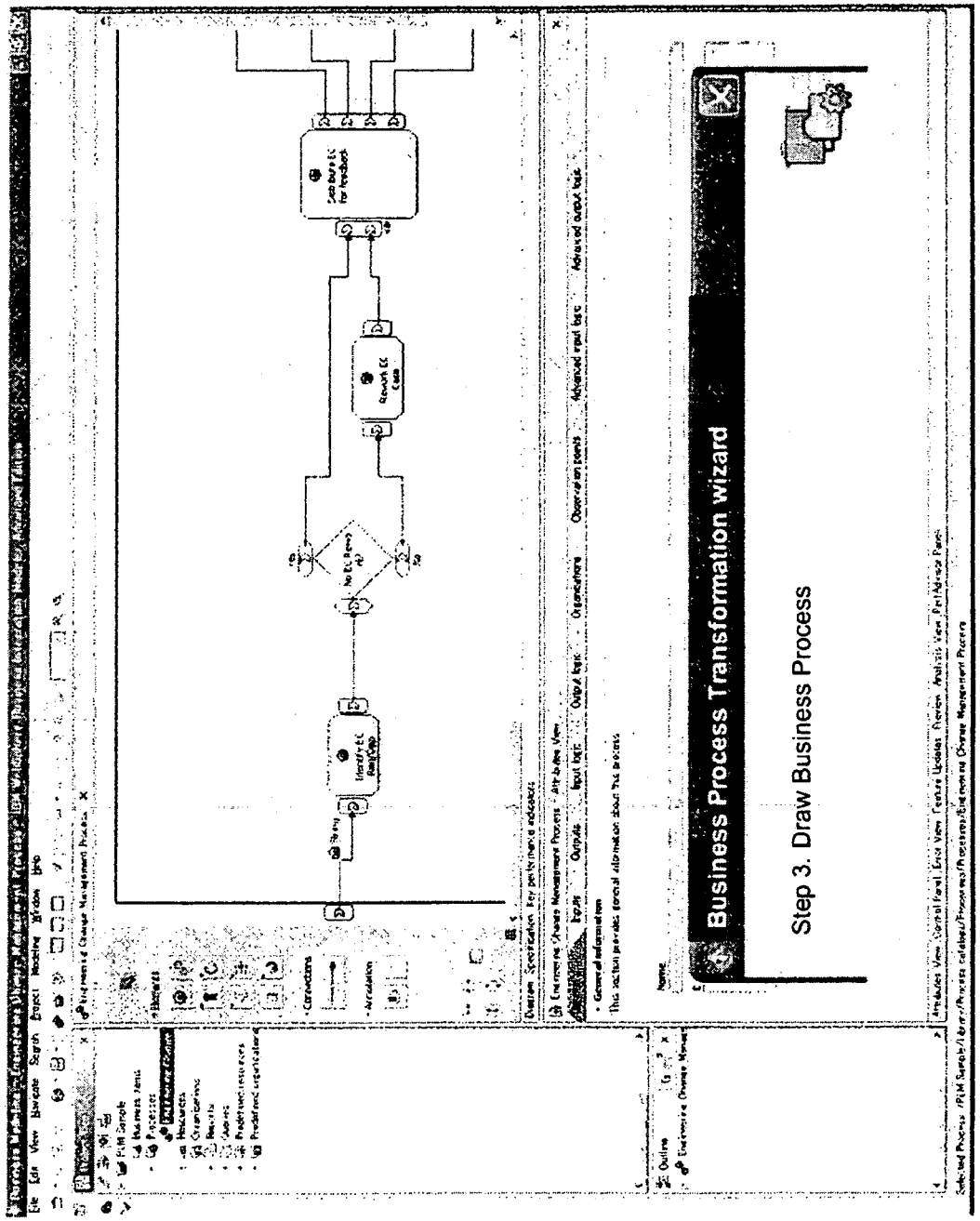
FIG. 11 is a screen print of the screen prompting the analyst to map the business process.

Once the selections have been made, the business analyst selects the "Next" button at the bottom of the screen, which results in the screen of FIG. 9 being displayed. This is Step 2 of the several steps by which the Wizard leads the business analyst through. This screen prompts the business analyst to specify business process transformation objectives. For example, a potential objective is the reduction of operational cycle time by 10% (see FIG. 9), as indicated by the checked box and selected objective. Selecting the "Next" button at the bottom of the screen results in the next part of the process shown in FIG. 4, as shown in FIG. 10. Specifically, the process of function block 404 is next performed. In this part of the process, the selected KPIs affect the Business Process Transformation Wizard (BPTW) selection of a minimal set of input parameters required to build the business process model. The screen shown in FIG. 11 permits the business analyst to either map a business process from scratch or choose to import processes specified in other tools or formats, such as Visio, BPEL, MQWF, etc. In this example, the analyst models the As-Is business process. This is Step 3 in the series of steps followed by the BPTW.

Figure 12:
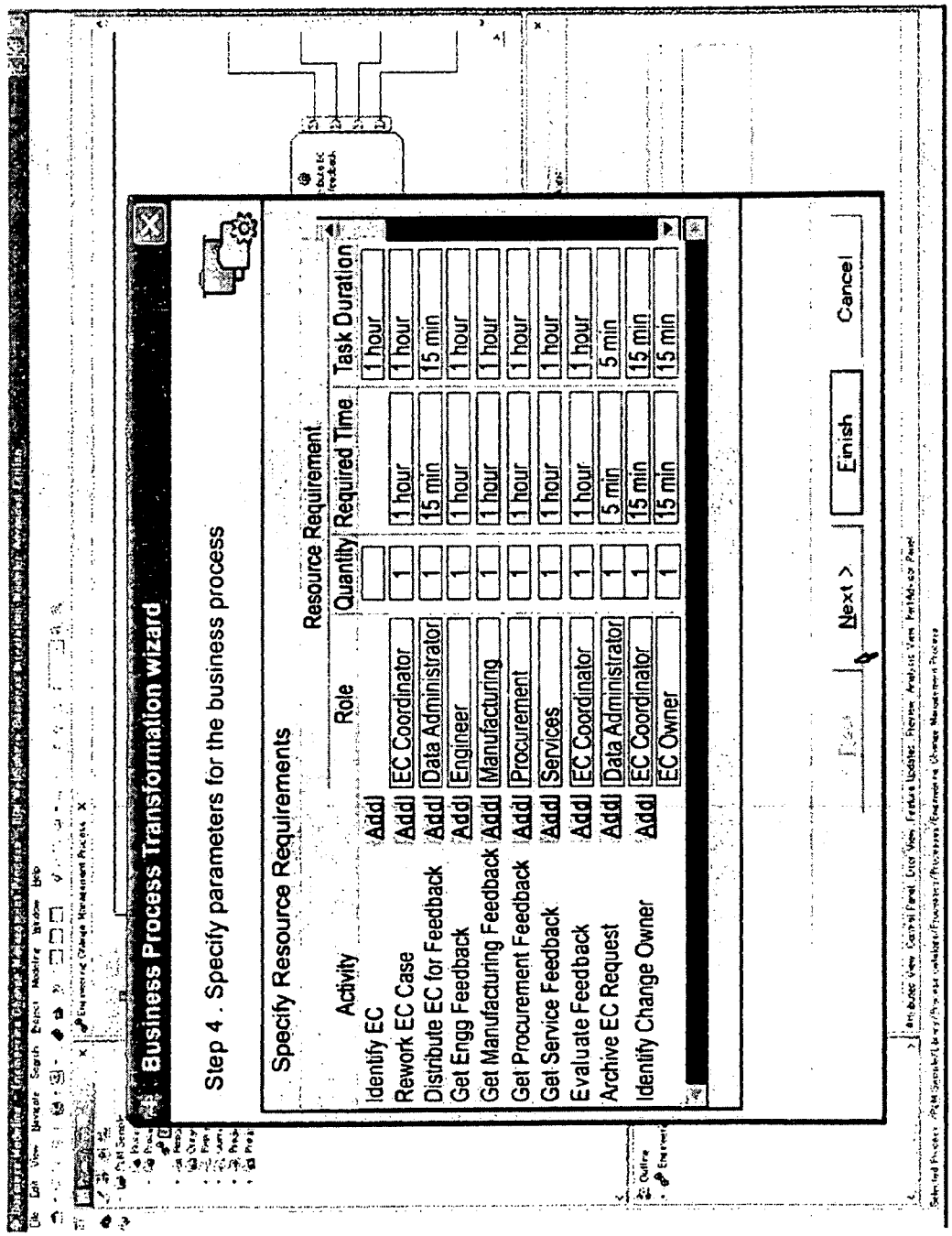
FIG. 12 is a screen print of the screen prompting the analyst to specify parameters for the business process.
Figure 13:
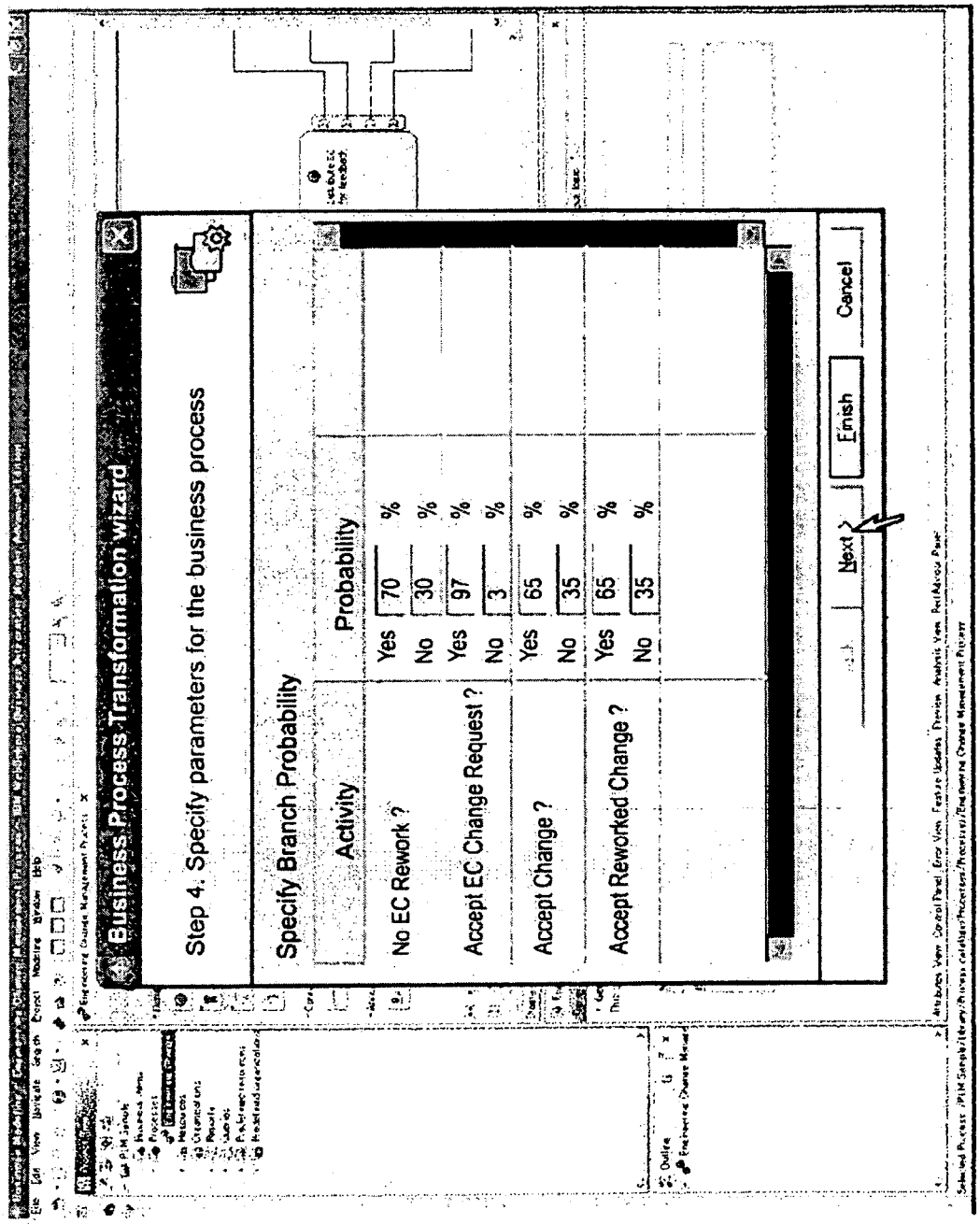
FIG. 13 is a screen print the screen following the screen of FIG. 12 prompting the analyst to specify parameters for the business process.
Figure 14:
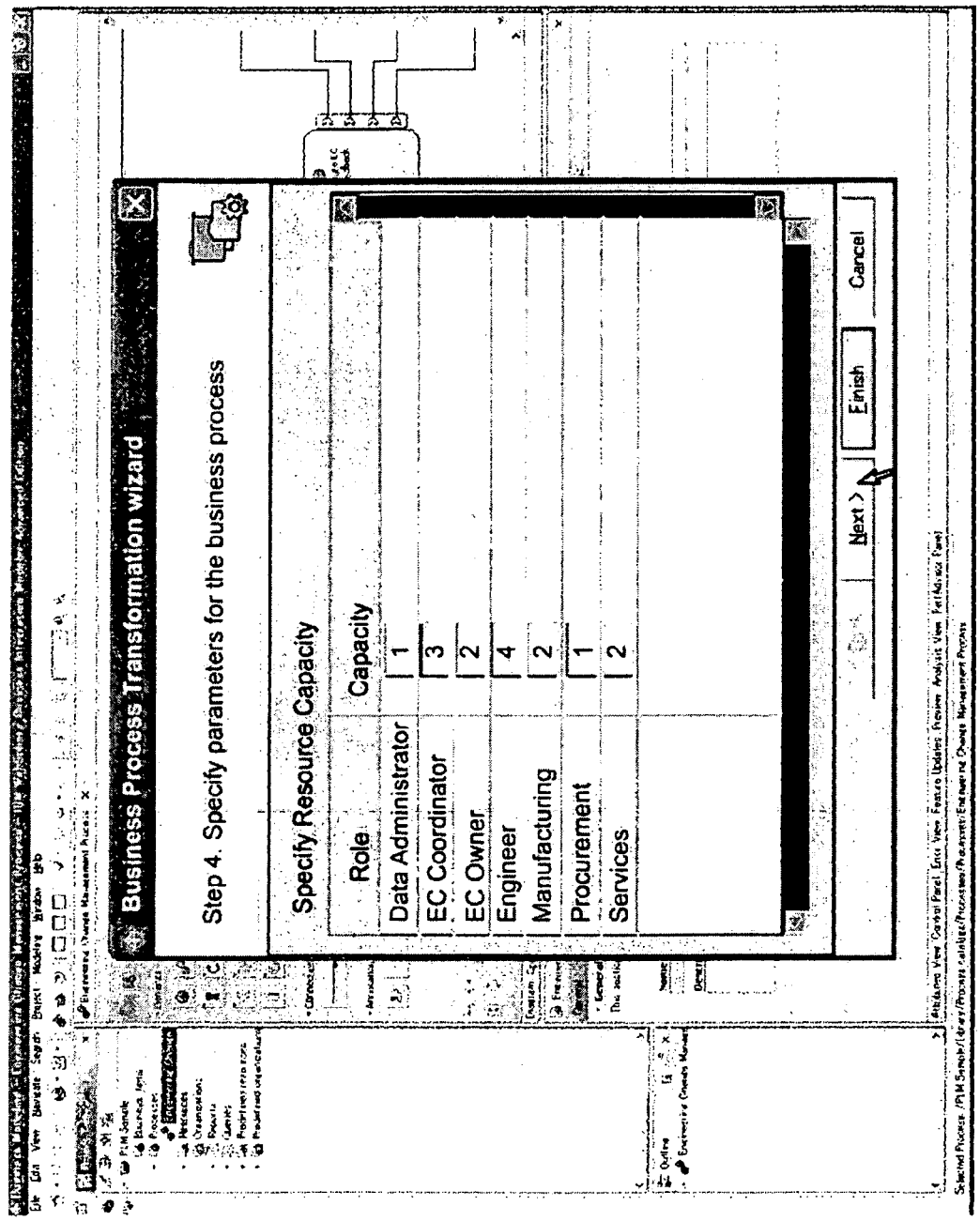
FIG. 14 is a screen print of the screen following the screen of FIG. 13 prompting the analyst to specify parameters for the business process.
Figure 15:
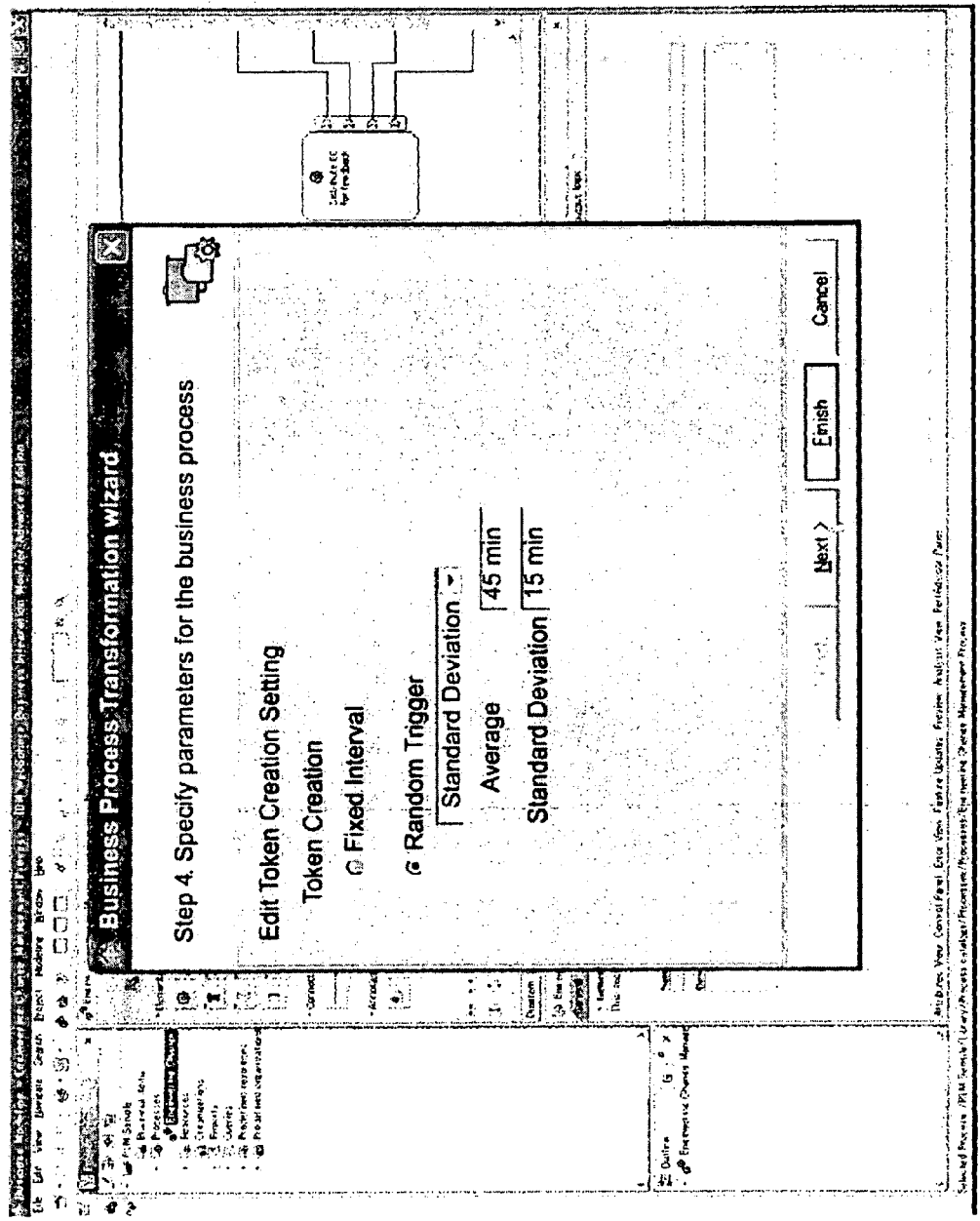
FIG. 15 is a screen print of the screen following the screen of FIG. 14 prompting the analyst to specify parameters for the business process.

The screen shown in FIG. 12 prompts the business analyst to specify parameters for the business process. This is Step 4 in the series of steps followed by the BPTW. In this step, the Wizard will ensure that sufficient data is specified that enables the analysis of business process performance. This could consist of activity resource requirements, resource capacities, etc. When the "Next" button is selected after making the initial selections, the screen shown in FIG. 13 is displayed. Here the business analyst enters various branching probabilities for the decision nodes. The selection of the "Next" button next displays the screen shown in FIG. 14. Here the business analyst enters various resource capacities. The selection of the "Next" button next displays the screen shown in FIG. 15. Here the business analyst edits token creation settings. Note that FIGS. 13, 14 and 15 are part of Step 4. The Wizard effectively guides the user to select appropriate random distributions for different process aspects—such as arrival rate to the process, duration of a task etc. In some cases, the Wizard can suggest default distributions and can allow users to specify alternate distributions. In addition, users can be allowed to alter distributions using graphical depictions visually.

Figure 16:
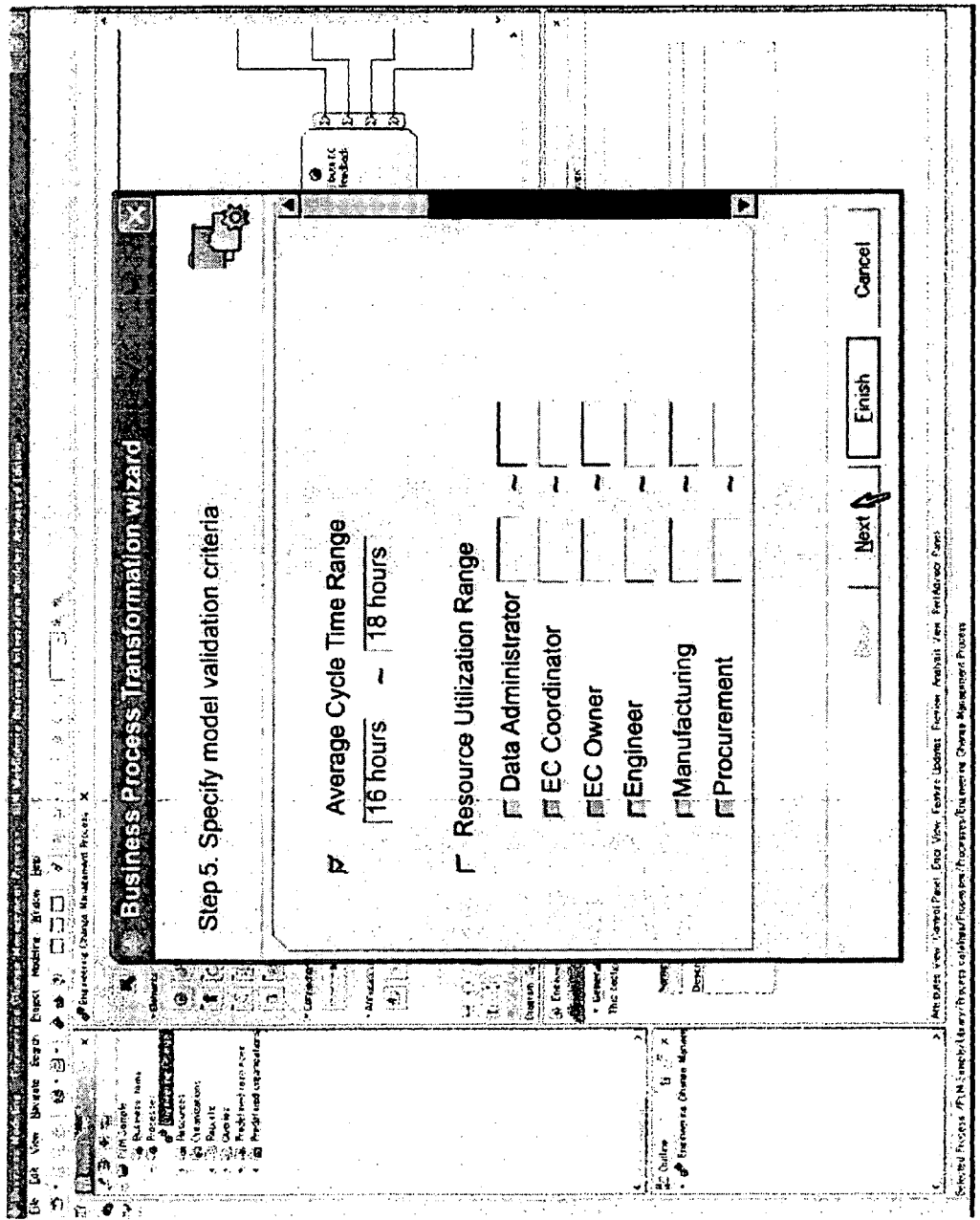
FIG. 16 is a screen print of the screen prompting the analyst to specify model validation criteria.
Figure 17:
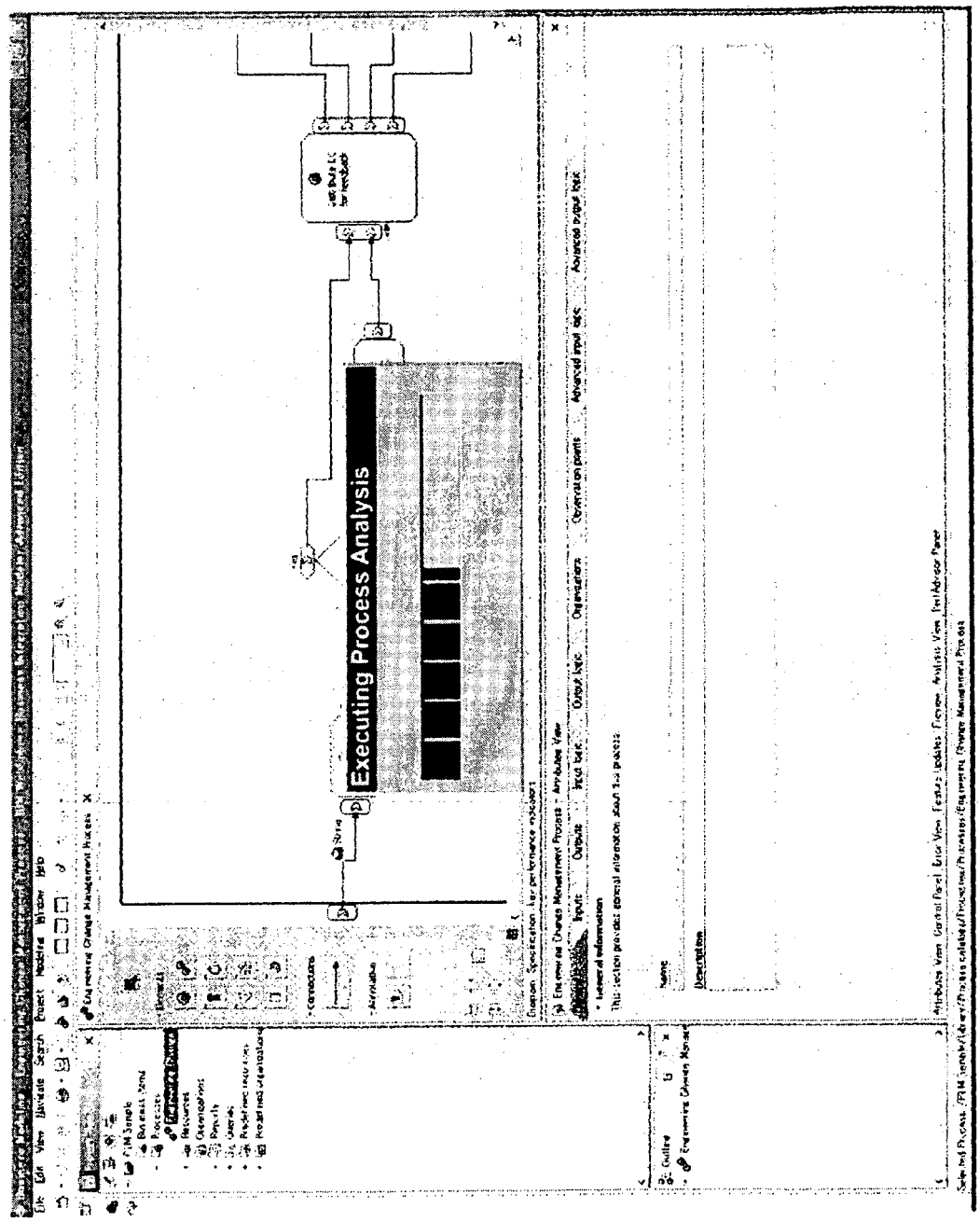
FIG. 17 is a screen print showing the screen while the Business Process Transform Wizard (BPTW) executes process analysis for validating the model according to the specified criteria.

The selection of the "Next" button next results in the screen shown in FIG. 16. This is Step 5 of the process by which the Wizard leads the business analyst through. The Wizard allows optional user interaction to validate and confirm feasibility of selected parameters. Here the business analyst is prompted for model validation criteria. Once the model validation criteria have been entered by the business analyst, the Business Process Transformation Wizard executes the process analysis, during which time the screen shown in FIG. 17 is displayed. This may involve execution of process analysis algorithms, such as simulation, queuing analytics, systems dynamics, etc. In the course of executing the process analysis, the Business Process Transformation Wizard checks whether the results validate the model according to the specified criteria. If satisfactory, the Business Process Transformation Wizard confirms that the model validation criteria have been satisfied and displays the results in the screen shown in FIG. 18. If unsatisfactory, the Business Process Transformation Wizard will request the analyst to either change the process and/or process parameters and perform multiple iterations, until the model validation criteria have been met.

Figure 18:
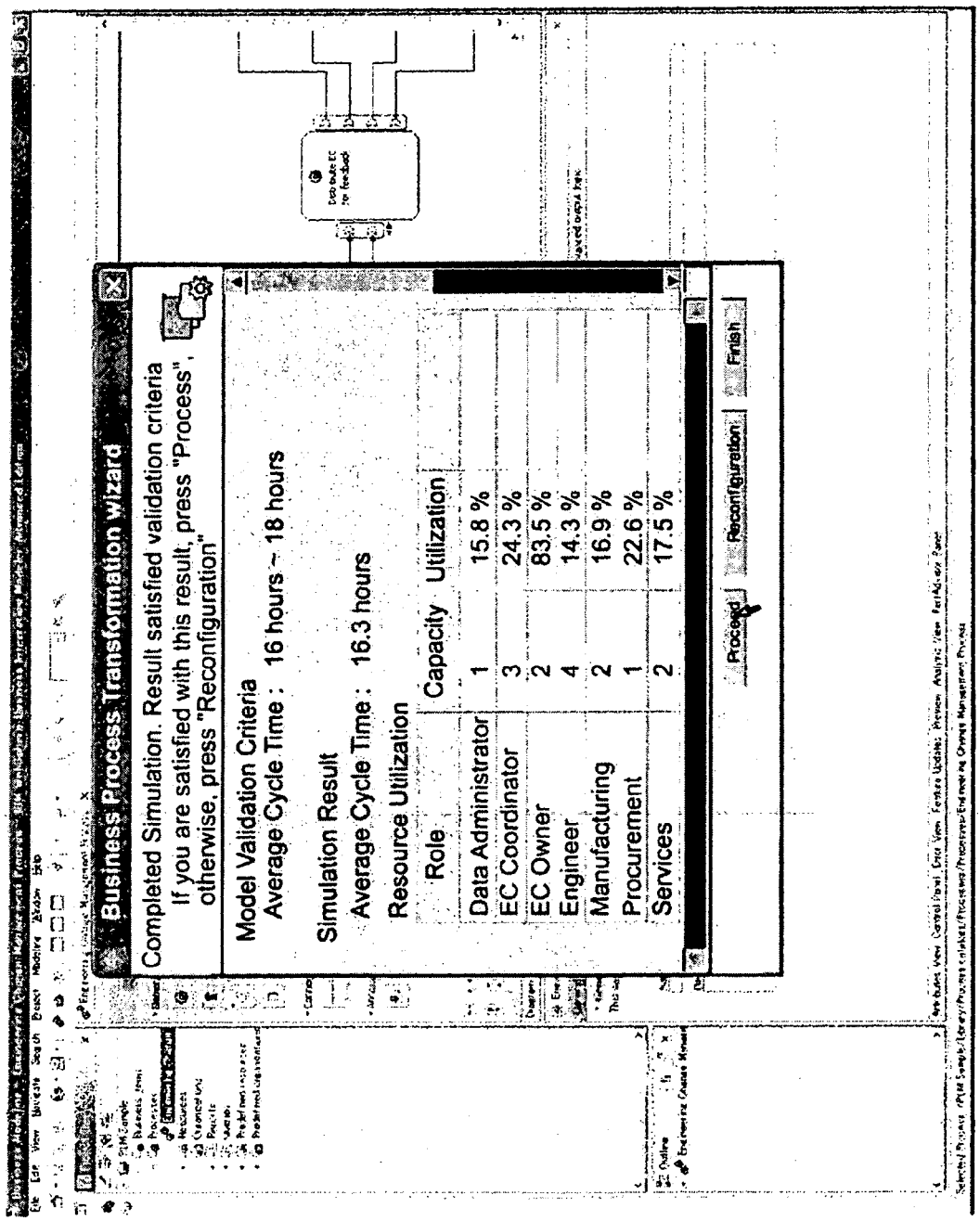
FIG. 18 is a screen print showing the results of the completed simulation which validate the model according to the specified criteria.
Figure 19:
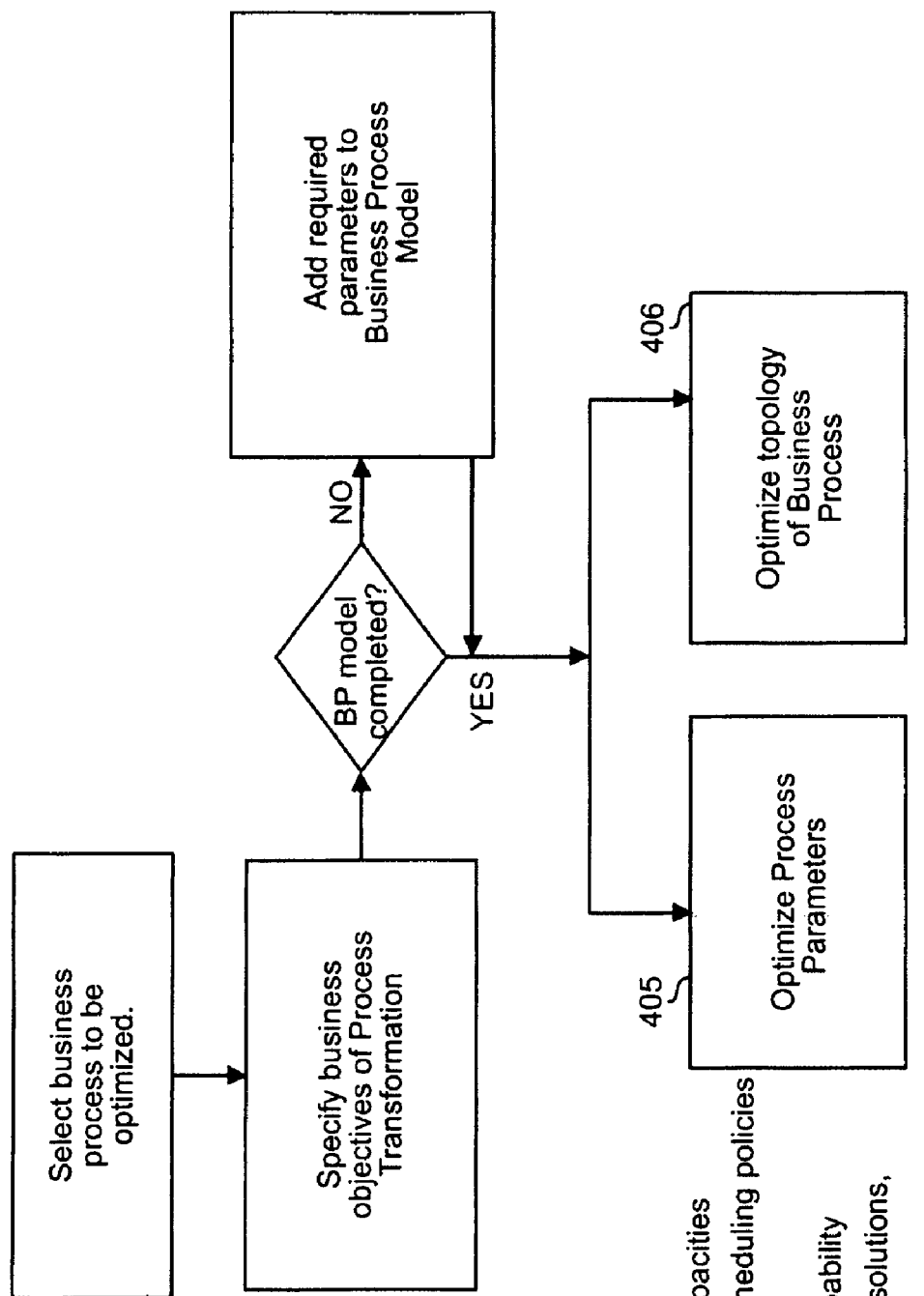
FIG. 19 is a flow diagram illustrating the process of optimizing process parameters.

At the bottom of the screen shown in FIG. 18 is a "Proceed" button. When selected, the Wizard goes to the next step, as shown in FIG. 19. During this phase, the Wizard prompts the business analyst to specify business process transformation patterns for optimizing process parameters, function block 405, and optimizing topology of the business process, function block 406. This may include additional inputs such as resource utilization criteria and throughput criteria, as will become clear from the following description. Note that steps involving specific transformation patterns are optional, i.e. the analyst can choose an appropriate subset of transformation patterns in a business process.

Figure 20:
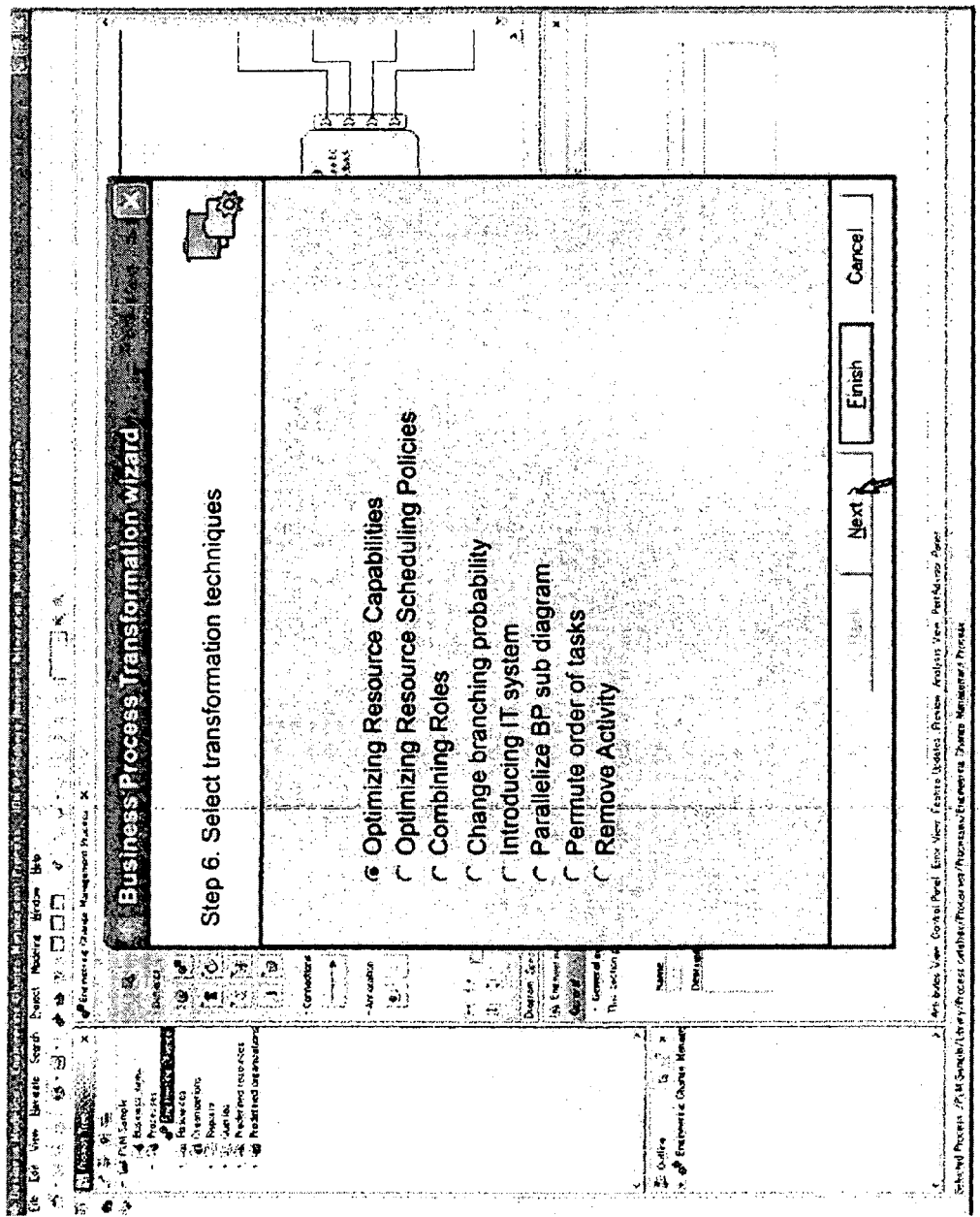
FIG. 20 is a screen print showing the screen prompting the analyst to select process transformation methods in which "Optimizing Resource Capabilities" is selected.

We will now illustrate how the Wizard executes specific transformation patterns. The screen displayed in FIG. 20 prompts the business analyst to select specific transformation patterns. This is Step 6 by which the Wizard leads the business analyst through. In this screen, the option "Optimizing Resource Capabilities" has been selected. Resource capacities can be optimized subject to resource utilization targets, business throughput targets and lead time targets. This part of the processing executes the process analysis (multiple times as appropriate) and identifies the optimal resource capacities.

Figure 21:
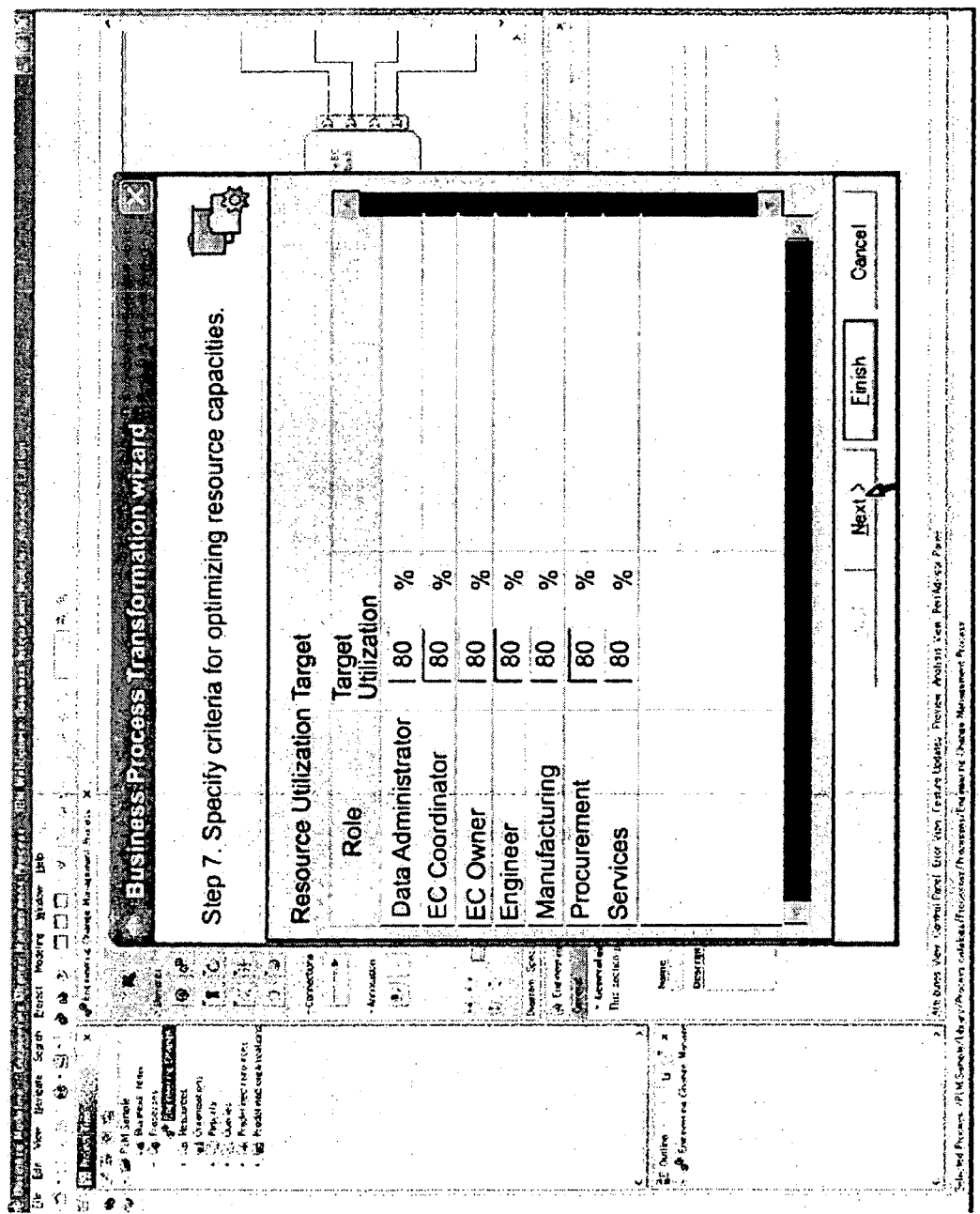
FIG. 21 is a screen print showing the screen which prompts the analyst to specify criteria for optimizing resource capacities.
Figure 22:
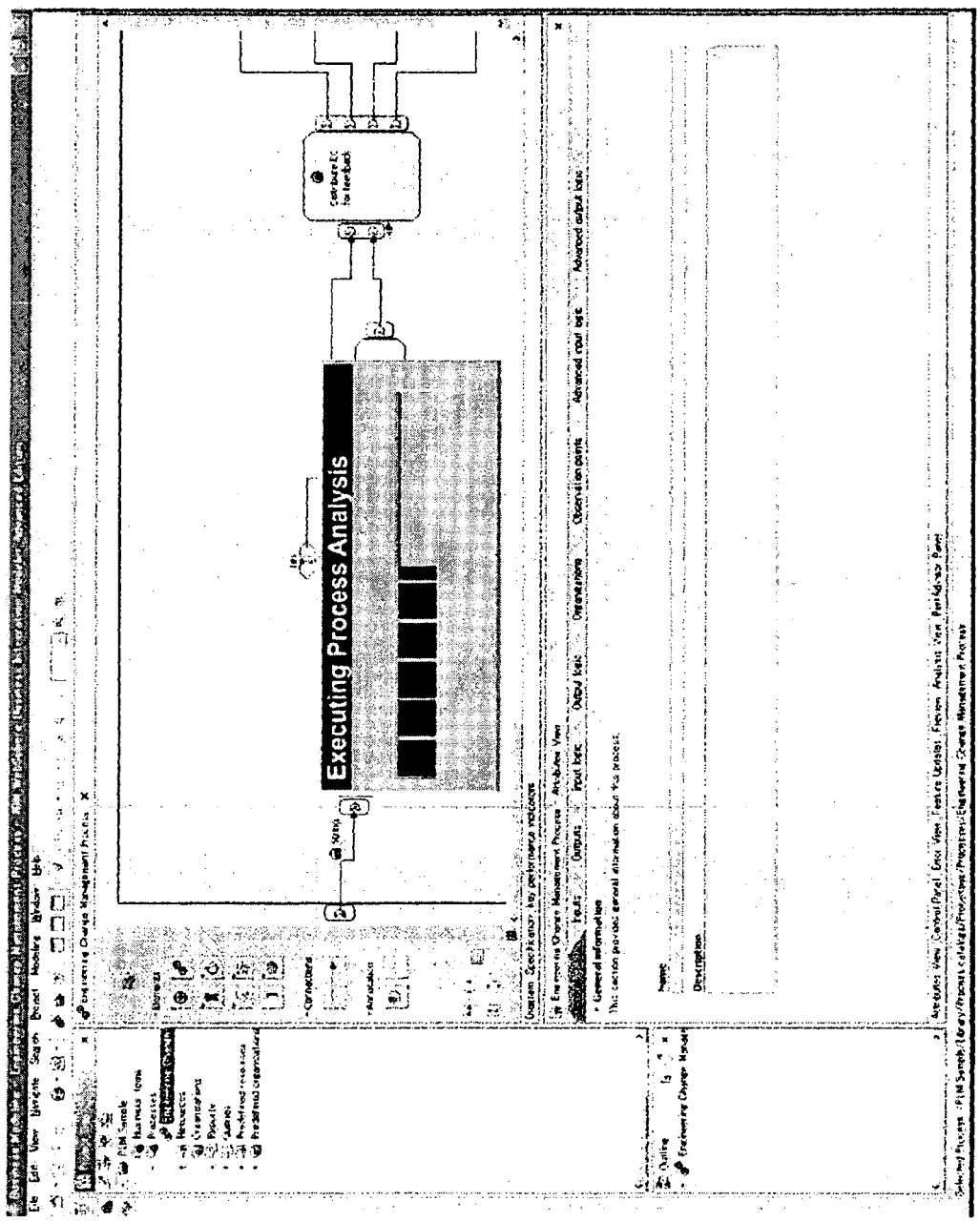
FIG. 22 is a screen print showing the screen while the Business Process Transform Wizard (BPTW) executes process analysis for optimizing resource capacities.

Selecting the first option and selecting the "Next" button at the bottom of the screen results in the display of the screen shown in FIG. 21. This is Step 7 by which the Wizard leads the business analyst through the transformation. The screen prompts the business analyst to enter target utilization figures as criteria for optimizing resource capacities. Once the utilization figures have been entered and the "Next" button has been selected by the business analyst, the Business Process Transformation Wizard executes the process analysis, during which time the screen shown in FIG. 22 is displayed. When the process analysis is completed by the Business Process Transformation Wizard, the results of the resource capacity optimization are displayed in the screen shown in FIG. 23. Note that the capacities in different roles have changed, leading to a cost reduction from $1.2 million to $950K. The user now has the option of performing more iterations in Step 7, by choosing the "Reconfiguration" button shown at the bottom of FIG. 23.

Figure 23:
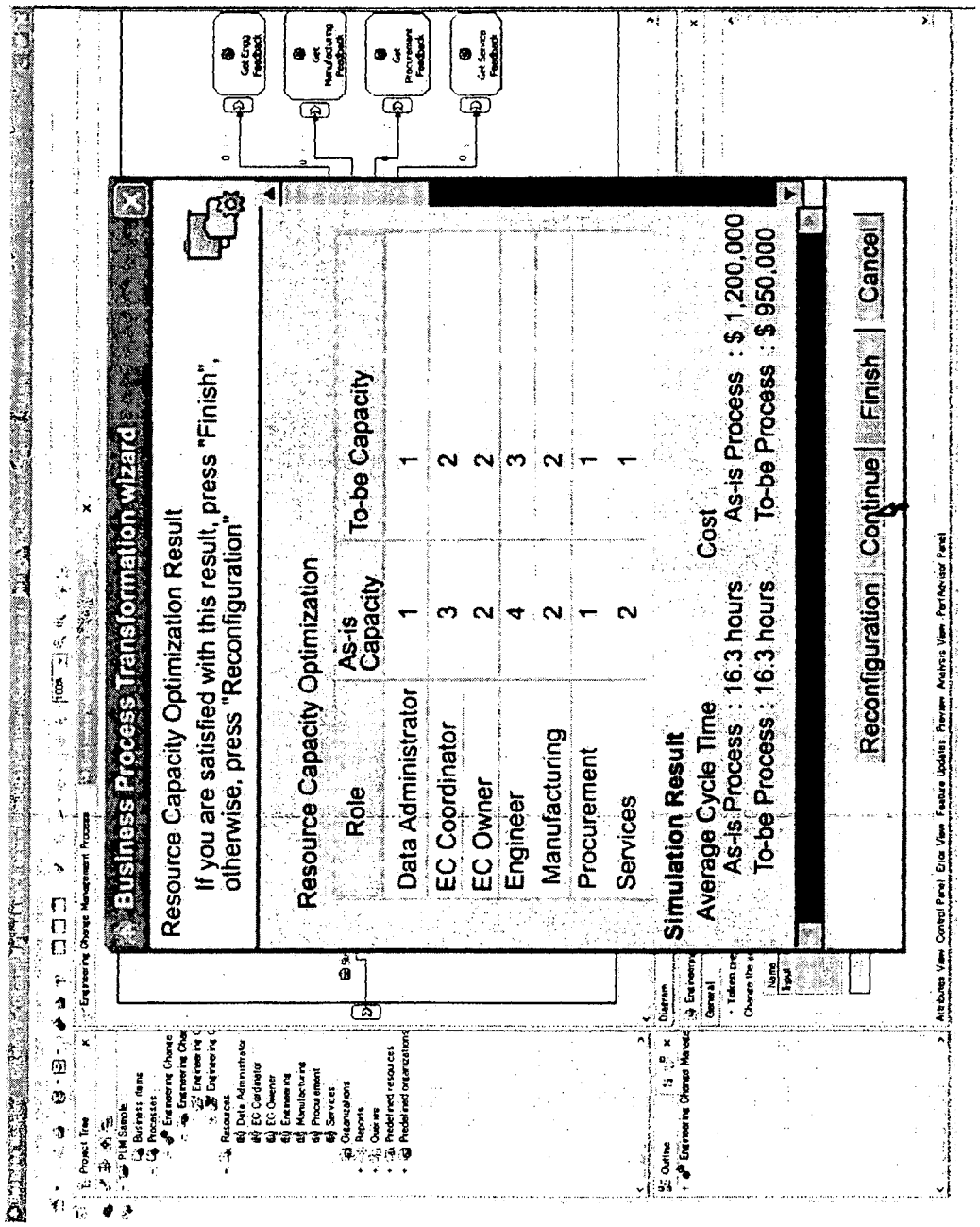
FIG. 23 is a screen print showing results of the resource capacity optimization.
Figure 24:
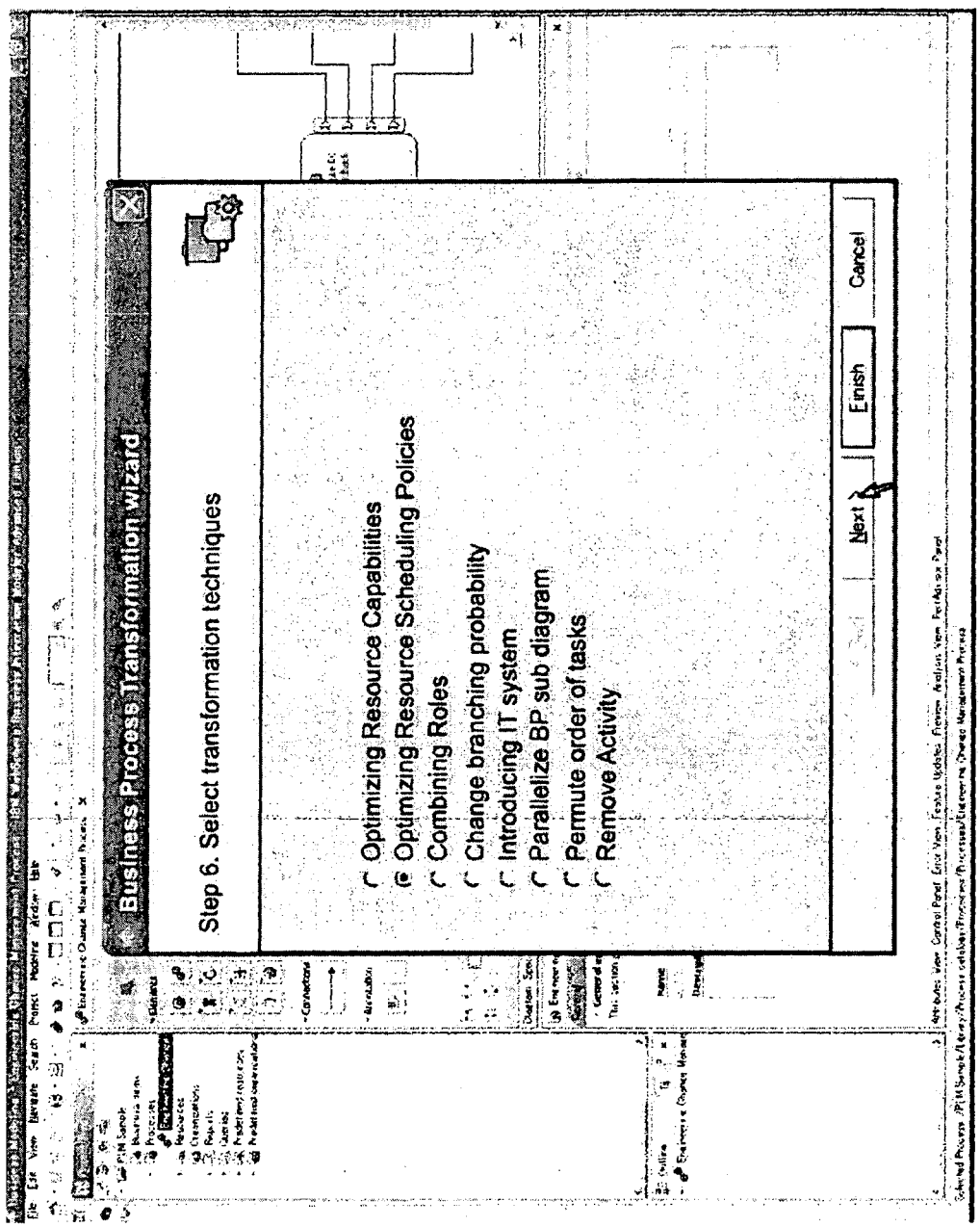
FIG. 24 is a screen print showing the screen prompting the analyst to select process transformation methods in which "Optimizing Resource Scheduling Policies" is selected.
Figure 25:
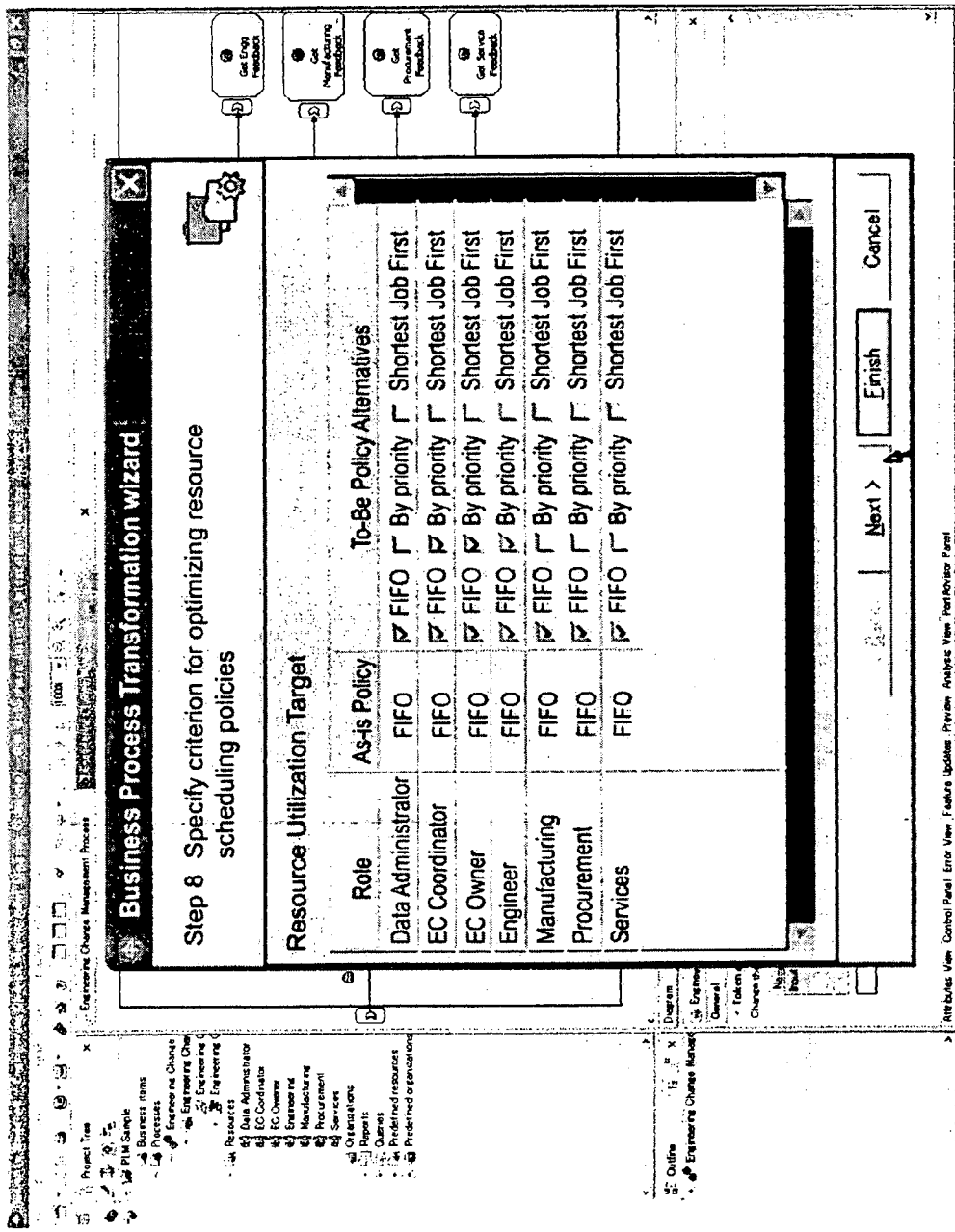
FIG. 25 is a screen print showing the screen prompting the analyst to specify the criterion for optimizing resource scheduling policies.
Figure 26:
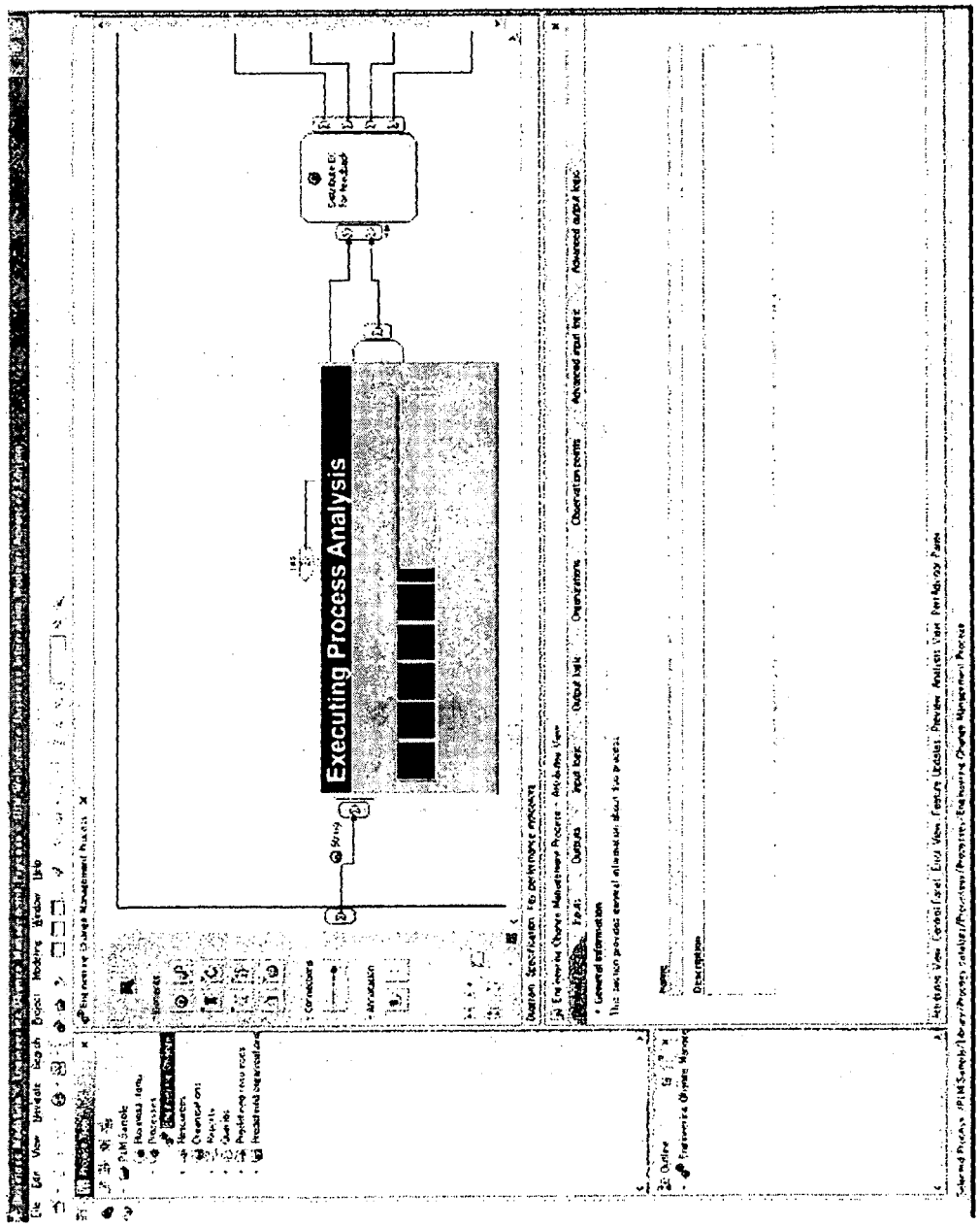
FIG. 26 is a screen print showing the screen while the Business Process Transform Wizard (BPTW) executes process analysis for optimizing resource scheduling policies.

After selecting the "Continue" button at the bottom of the screen shown in FIG. 23, a return to Step 6 is made and the screen shown in FIG. 24 is displayed, which is the same as the screen shown in FIG. 20 and again prompts the business analyst to select transformation techniques. In the screen shown in FIG. 24, the option "Optimizing Resource Scheduling Policies" has been selected. This is Step 8 by which the Wizard leads the business analyst through the transformation process. With this option, the scheduling policy for different activities/resources and criteria for optimizing the policies is analyzed. The Business Process Transformation Wizard executes the process analysis (multiple times as appropriate) and identifies the optimal resource scheduling policies. The screen shown in FIG. 25 is displayed and prompts the business analyst to specify various options for resource scheduling policies. After entering these criteria, the business analyst selects the "Next" button at the bottom of the screen. The Business Process Transformation Wizard then executes the process analysis, during which time the screen shown in FIG. 26 is displayed. When the process analysis is completed by the Business Process Transformation Wizard, the results of the resource scheduling policies optimization are displayed in the screen shown in FIG. 27. Note from the results that the average cycle time has been reduced from 16.2 hours to 14.8 hours by optimizing the scheduling policies.

Figure 27:
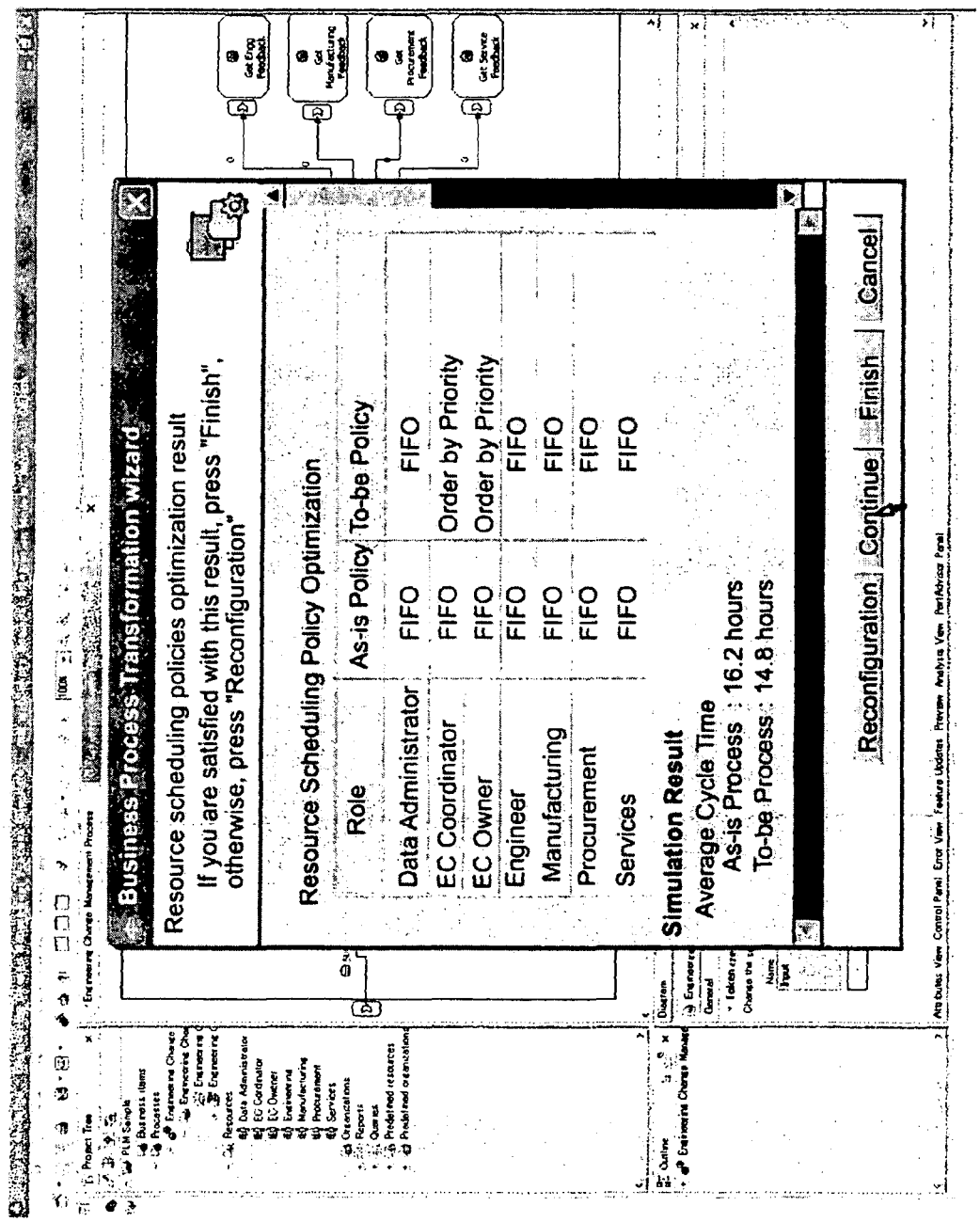
FIG. 27 is a screen print showing results of the resource scheduling polices optimization.
Figure 28:
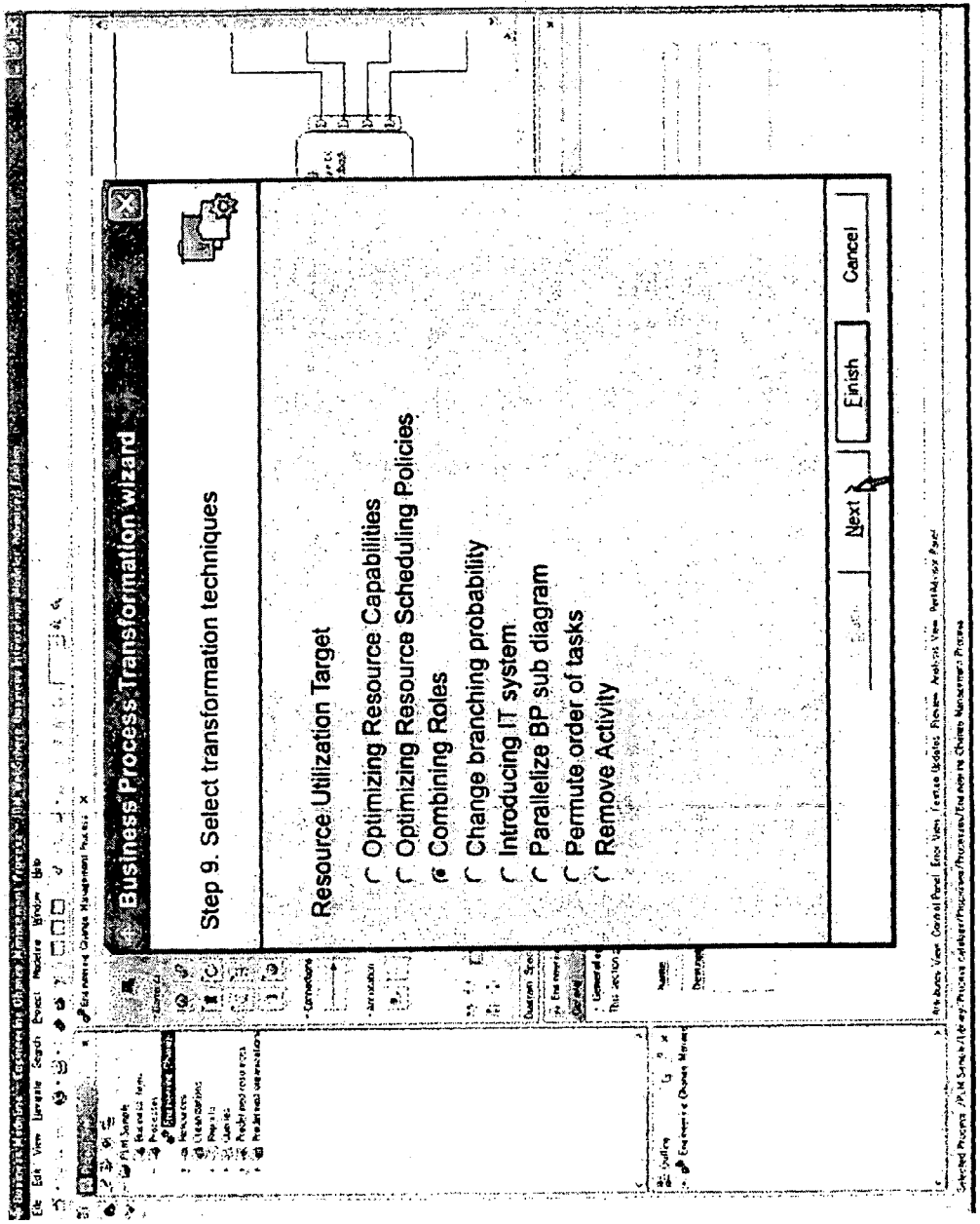
FIG. 28 is a screen print showing the screen prompting the analyst to select process transformation methods in which "Combining Roles" is selected.
Figure 29:
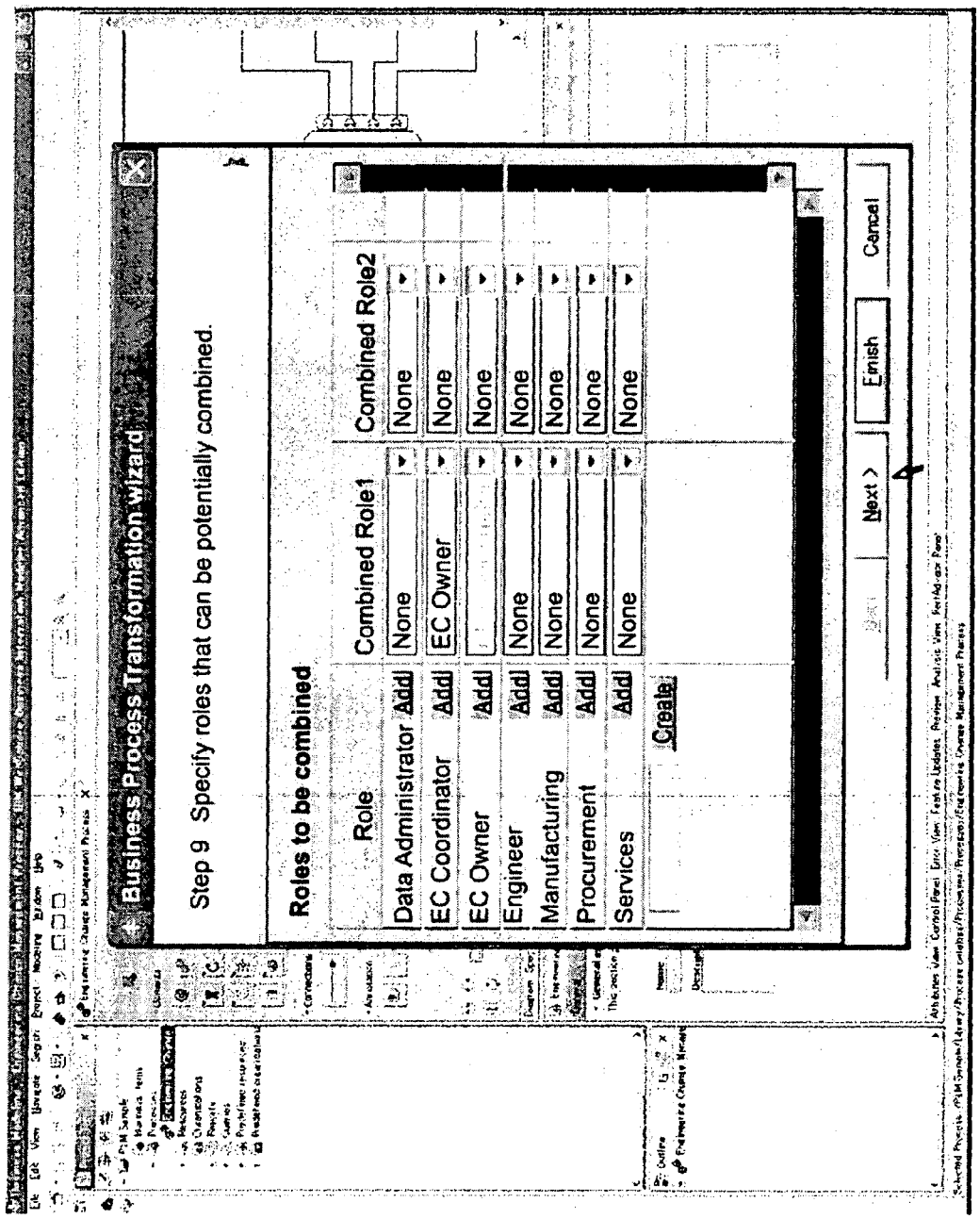
FIG. 29 is a screen print showing the screen prompting the analyst to specify roles that can be potentially combined.
Figure 30:
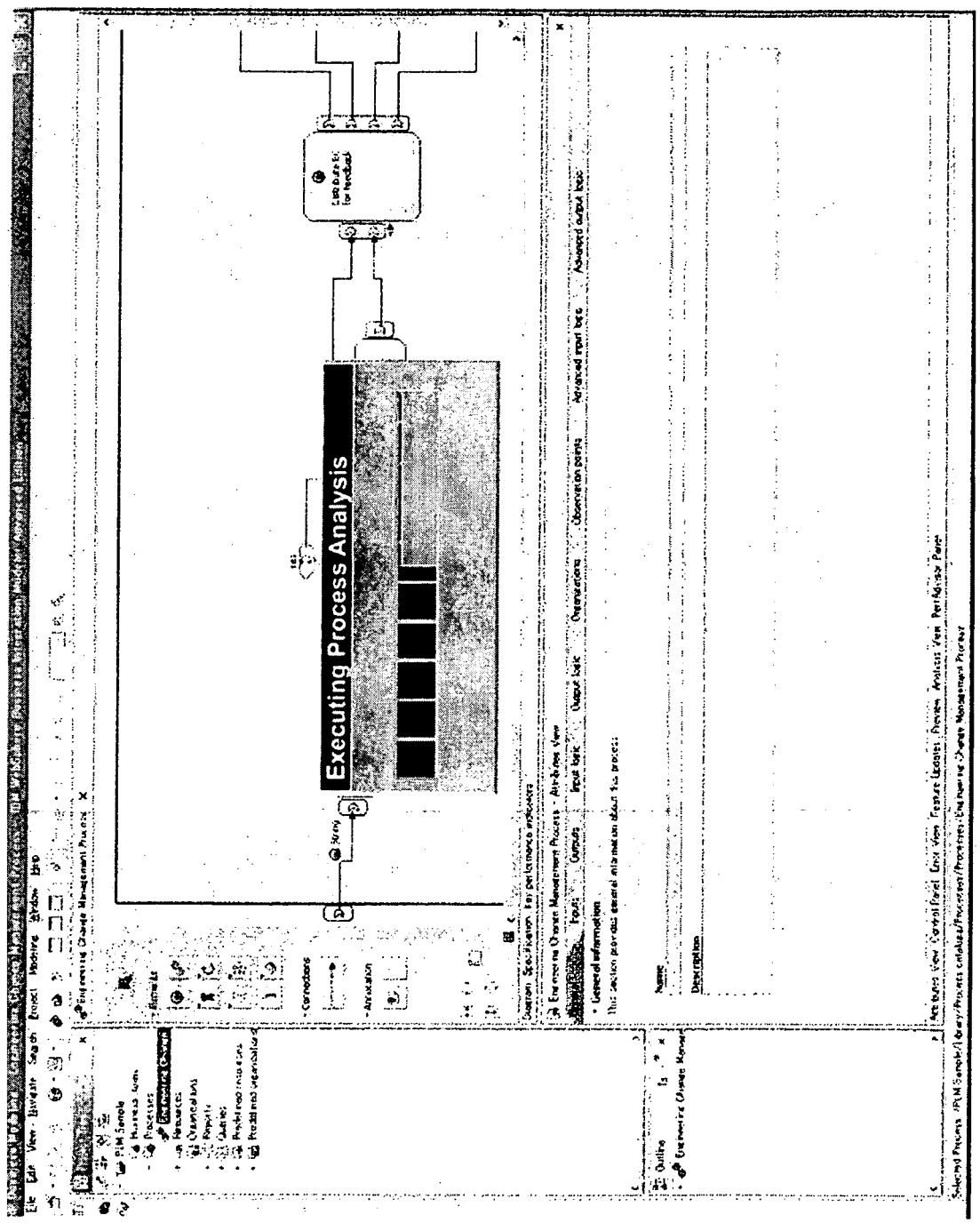
FIG. 30 is a screen print showing the screen while the Business Process Transform Wizard (BPTW) executes process analysis for combining roles.

After selecting the "Continue" button at the bottom of the screen shown in FIG. 27, the Wizard returns to Step 6 and the screen shown in FIG. 28 is displayed, which again is the same as the screen shown in FIG. 20 and again prompts the business analyst to select transformation techniques. In the screen shown in FIG. 28, the option "Combining Roles" has been selected. This is Step 9 in the process by which the Wizard leads the business analysts through the transformation process. With this option, the business analyst is requested to specify roles that can be potentially combined. This can be alternatively suggested by the Wizard, which executes the process analysis (multiple times as appropriate) and identifies the combination of roles that optimize the business process performance. The screen shown in FIG. 29 is displayed and prompts the business analyst to specify various roles that can be potentially combined. After entering those roles that can be combined, the business analyst selects the "Next" button at the bottom of the screen. The Business Process Transformation Wizard then executes the process analysis, during which time the screen shown in FIG. 30 is displayed. When the process analysis is completed by the Business Process Transformation Wizard, the results of the optimized process are displayed in the screen shown in FIG. 31. Note from the simulation results that the process cost has been reduced to $875K, as a result of combining roles.

Figure 31:
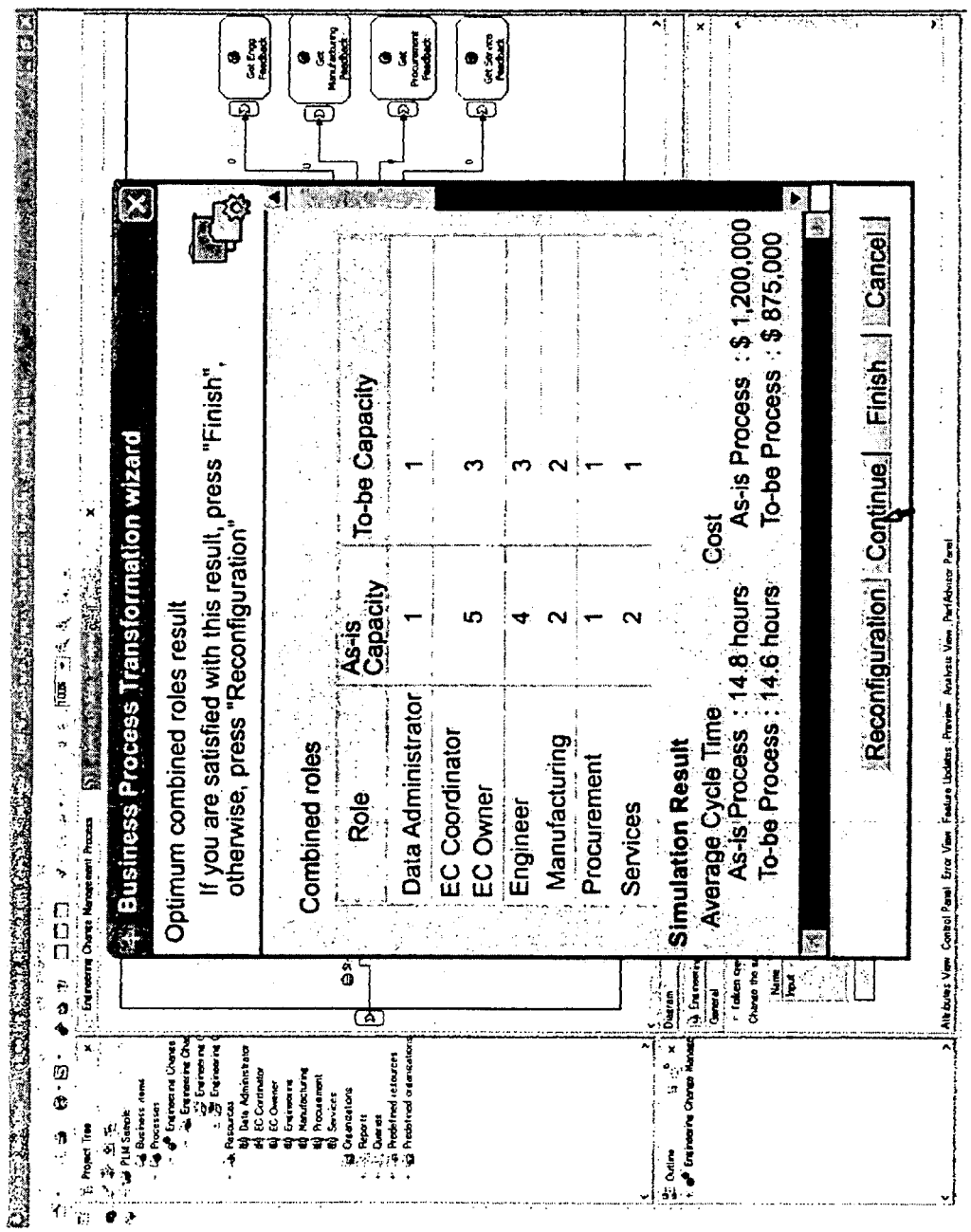
FIG. 31 is a screen print showing the results of the optimized combined roles.
Figure 32:
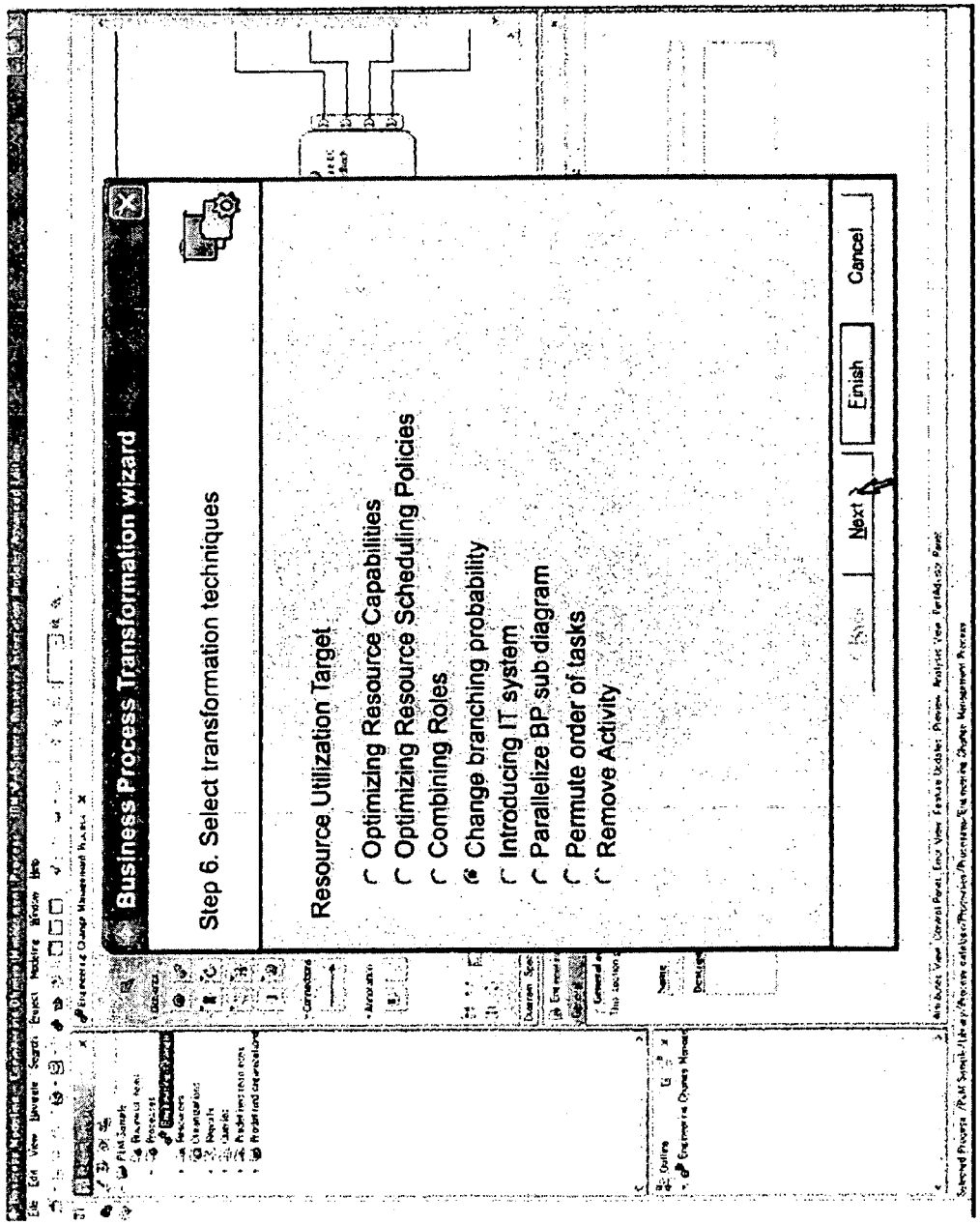
FIG. 32 is a screen print showing the screen prompting the analyst to select process transformation methods in which "Change Branching Probability" is selected.
Figure 33:
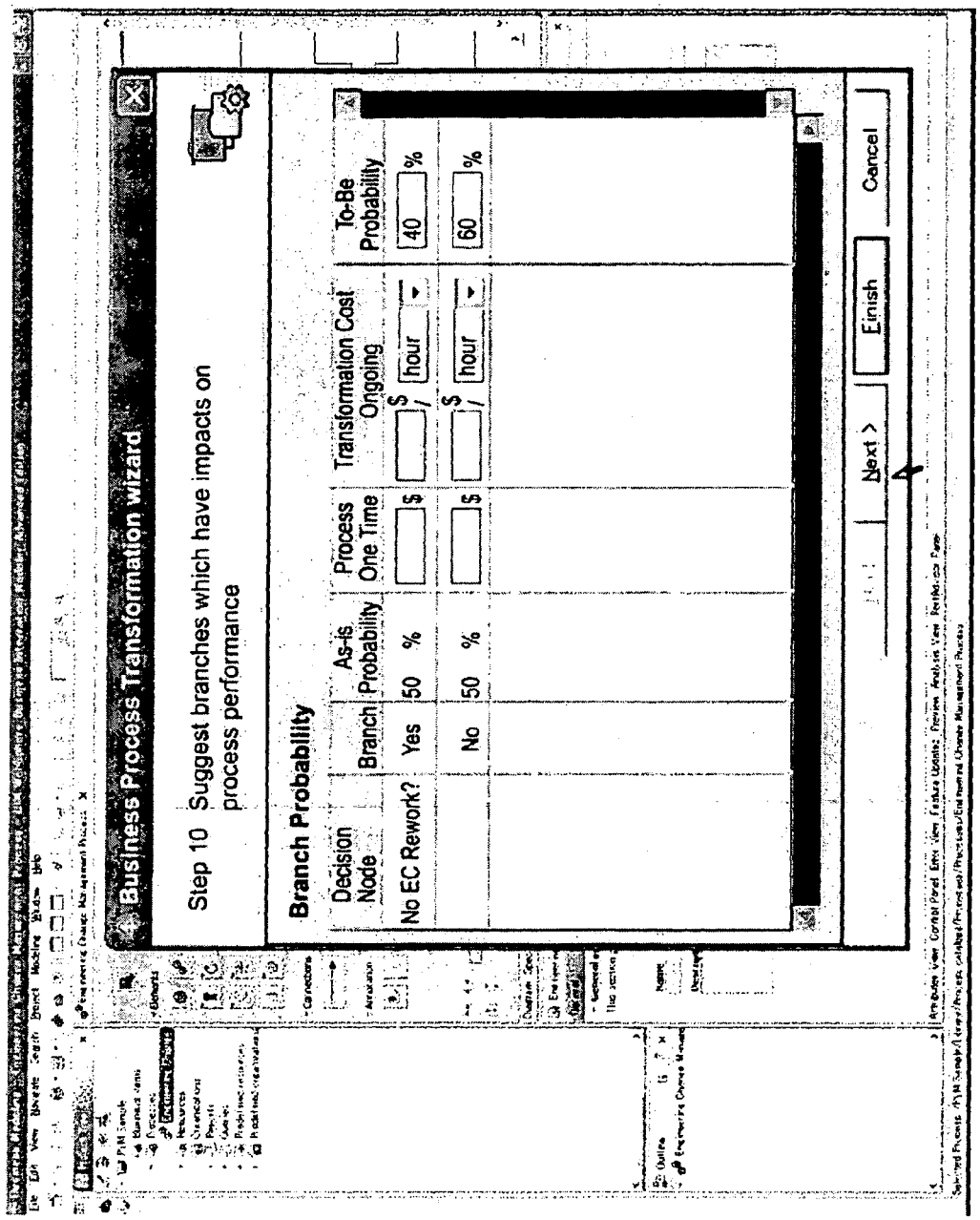
FIG. 33 is a screen print showing the screen prompting the analyst to suggest branches which have impacts on process performance.
Figure 34:
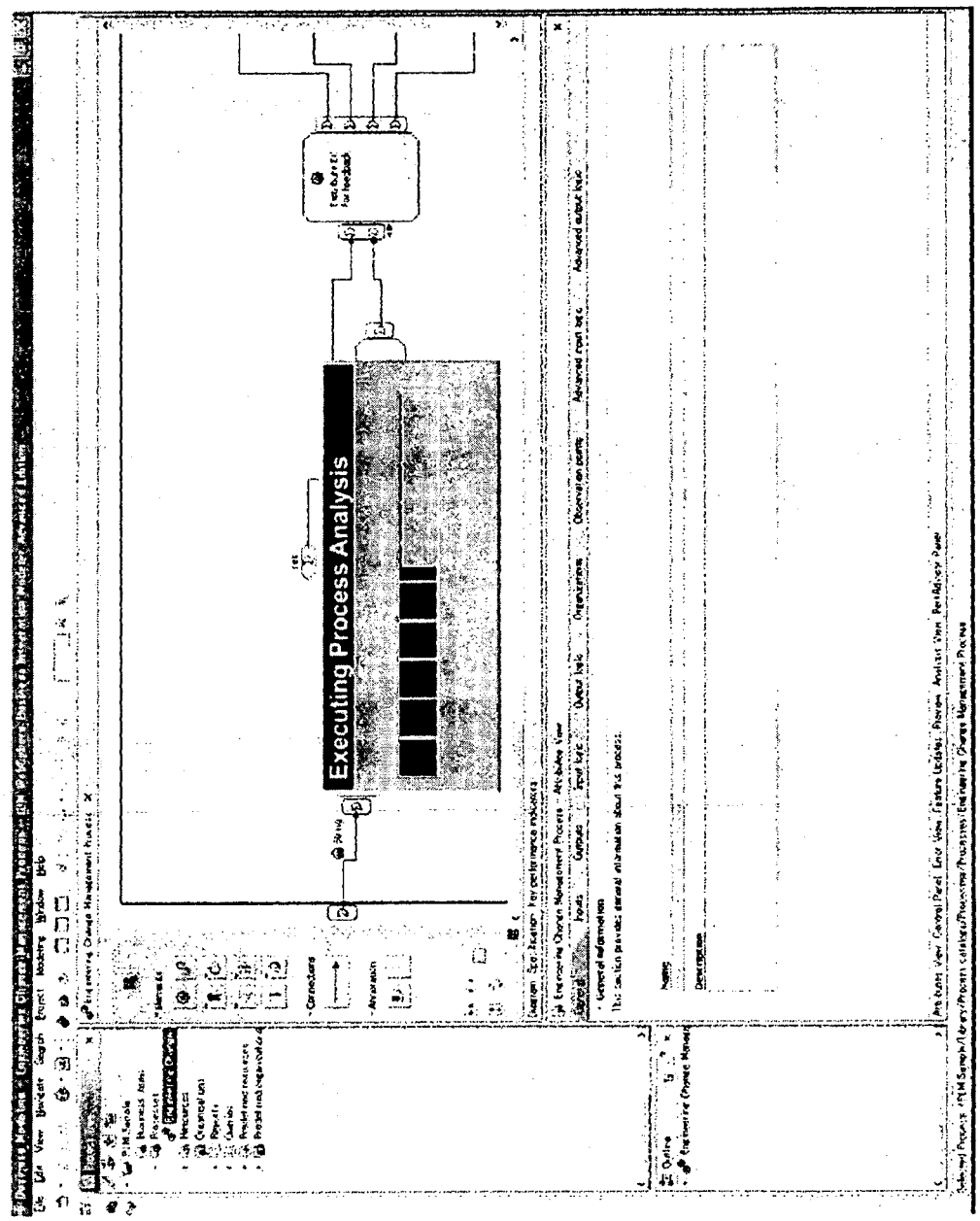
FIG. 34 is a screen print showing the screen while the Business Process Transform Wizard (BPTW) executes process analysis for change branches which have impacts on process performance.

After selecting the "Continue" button at the bottom of the screen shown in FIG. 31, a return is made to Step 6 and the screen displayed is shown in FIG. 32, which again is the same as the screen shown in FIG. 20 and again prompts the business analyst to select transformation techniques. In the screen shown in FIG. 32, the option "Change Branching Probability" has been selected. This is Step 10 by which the Wizard leads the business analyst through the transformation process. With this option, the Wizard suggests branches which have impacts on process performance and asks the business analyst whether or not the branch probabilities can be improved. For example, introduction of check list may allow entry operator to identify format error, and the branch probability downstream regarding format error identification may be improved. In that case, the Wizard requests the analyst to specify new branch probabilities and executes the process analysis and identifies the overall impact of the improvement. The screen shown in FIG. 33 is displayed and prompts the business analyst to suggest branches which have impacts on process performance. After entering the information, the business analyst selects the "Next" button at the bottom of the screen. The Business Process Transformation Wizard then executes the process analysis, during which time the screen shown in FIG. 34 is displayed. When the process analysis is completed by the Business Process Transformation Wizard, the results of changing branch probabilities are displayed in the screen shown in FIG. 35.

Figure 35:
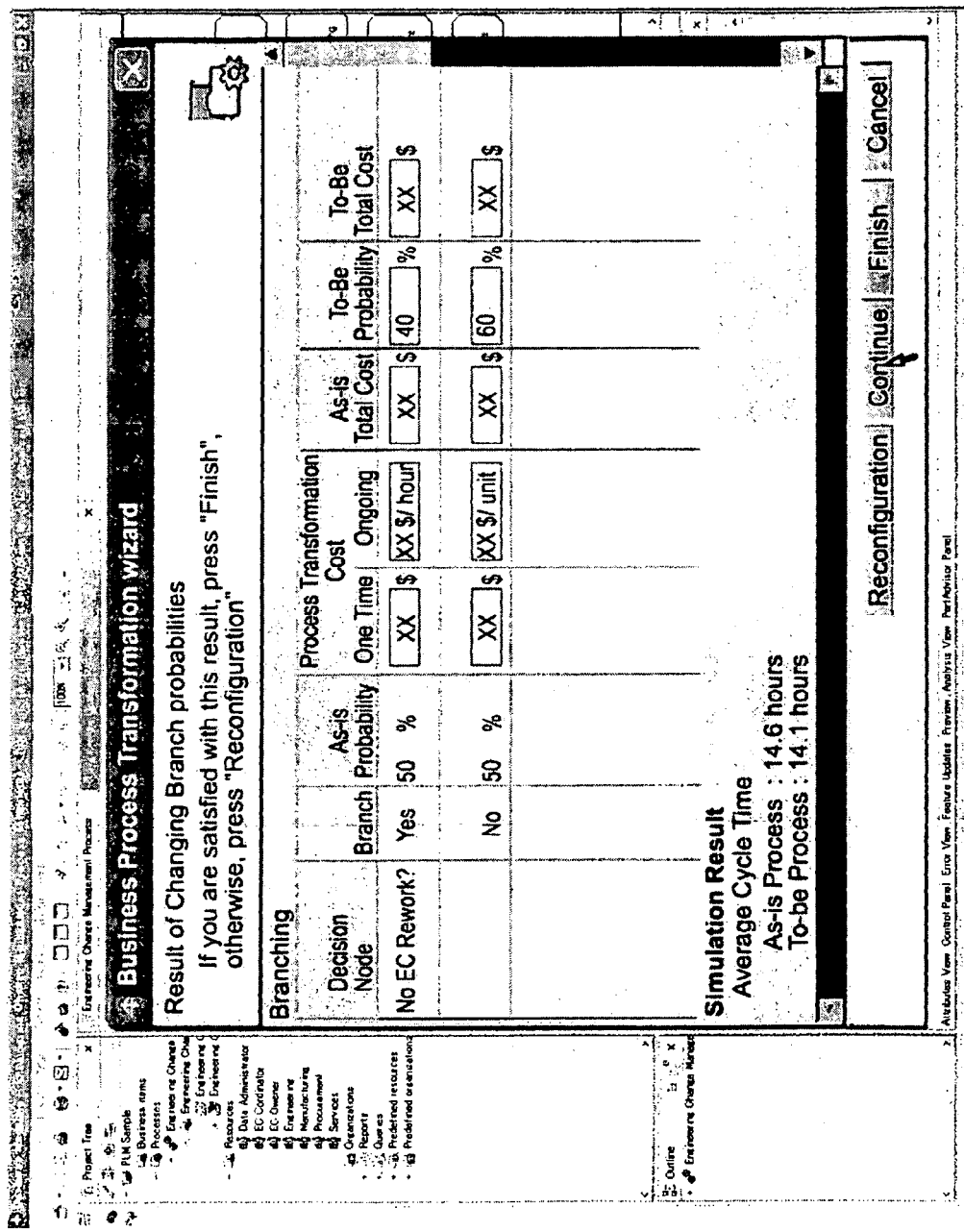
FIG. 35 is a screen print showing the results of changing branches which have impacts on process performance.
Figure 36:
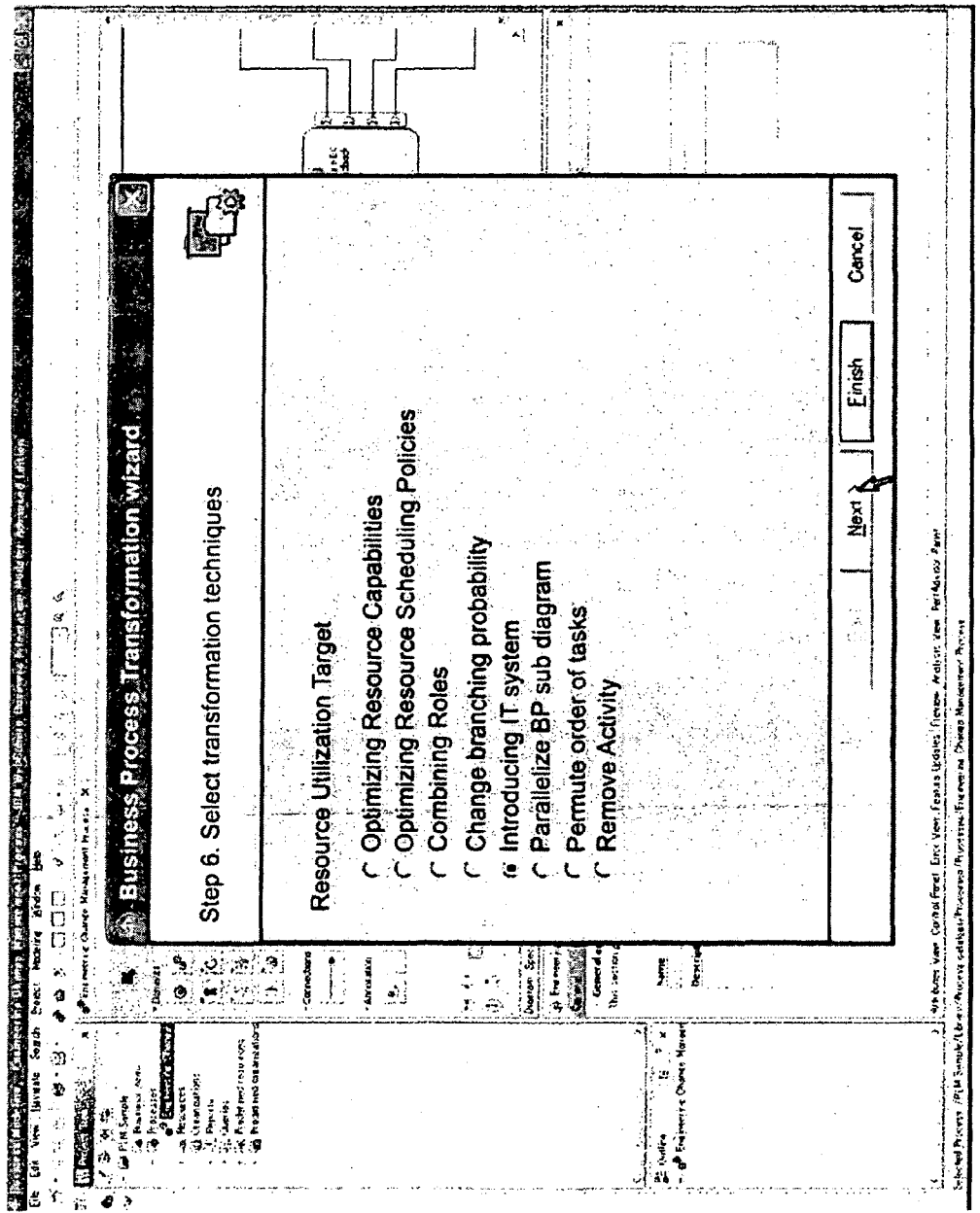
FIG. 36 is a screen print showing the screen prompting the analyst to select process transformation methods in which "Introducing IT System" is selected.
Figure 38:
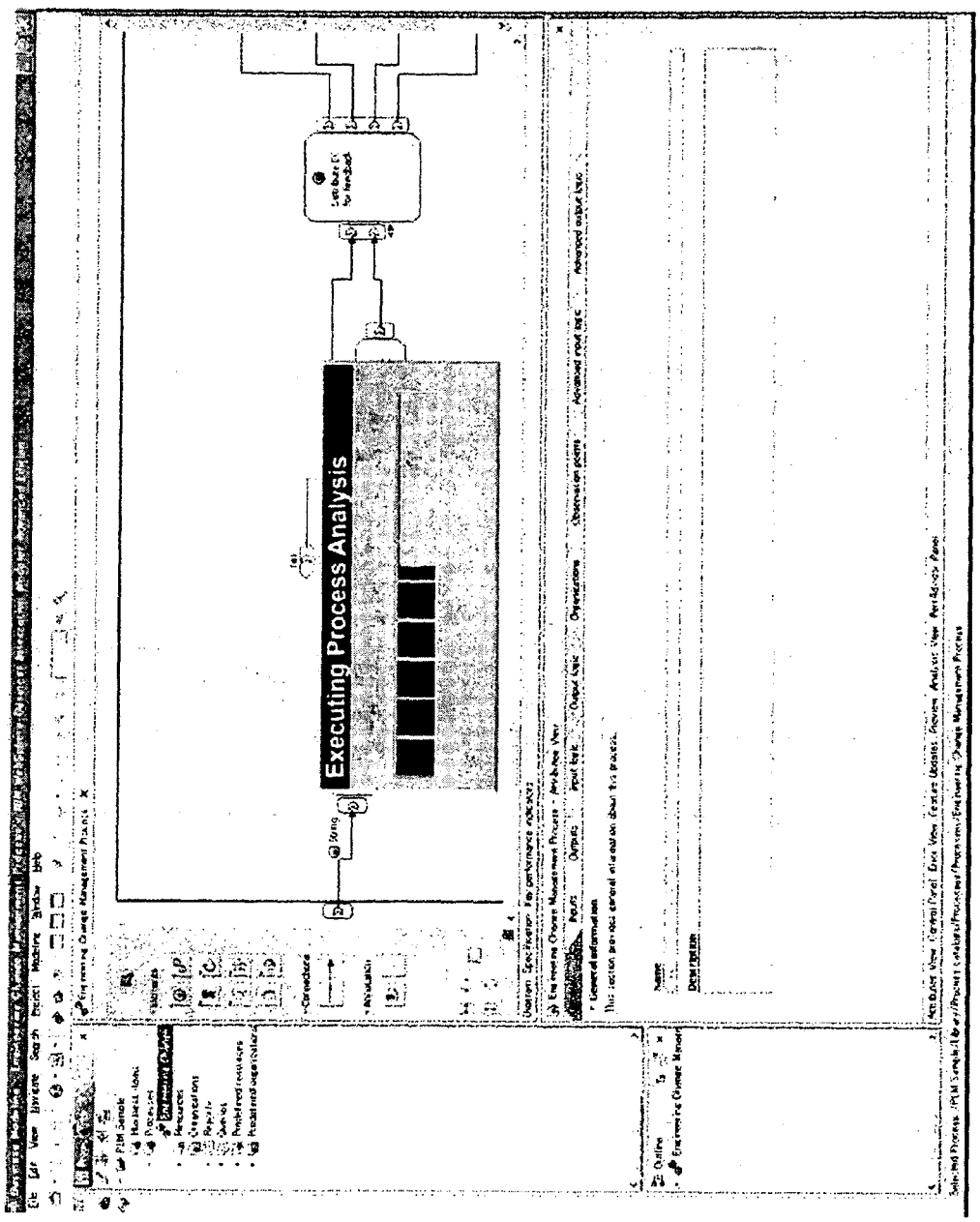
FIG. 38 is a screen print showing the screen while the Business Process Transform Wizard (BPTW) executes process analysis for the potential of improving the process using business integration and process automation solutions using IT.

After selecting the "Continue" button at the bottom of the screen shown in FIG. 35, a return is made to Step 6 and the screen displayed is shown in FIG. 36, which again is the same as the screen shown in FIG. 20 and again prompts the business analyst to select transformation techniques. In the screen shown in FIG. 36, the option "Introducing IT System" has been selected. This is Step 11 by which the Wizard leads the business analyst through the transformation process. With this option, the Wizard requests the business analyst to specify impact level on each task by introduction of IT systems for process automation/integration. Impact levels can be "fully automated", "partially automated", "outsourced", "no impact", etc. Elapsed duration for execution of each task is reduced based on predefined rule and the specified impact levels. For example, "fully automated" may reduce the elapsed duration by 50%, "partially automated" by 20%, "no impact" by 0% etc. Allow optional user interaction to customize reduction of elapsed duration of each task. The screen shown in FIG. 37 is displayed and prompts the business analyst to specify potential impact level on each task as a result of introduction of IT solution. After entering those impact levels, the business analyst selects the "Next" button at the bottom of the screen. The Business Process Transformation Wizard then executes the process analysis, during which time the screen shown in FIG. 38 is displayed. When the process analysis is completed by the Business Process Transformation Wizard, the results of process transformation using IT solution are displayed in the screen shown in FIG. 39.

Referring back to FIG. 19, this completes the "Optimize Process Parameters" processing in function block 405. We will now describe the "Optimize topology of business process" processing in function block 406 that can be performed by the Business Process Transformation Wizard.

Figure 39:
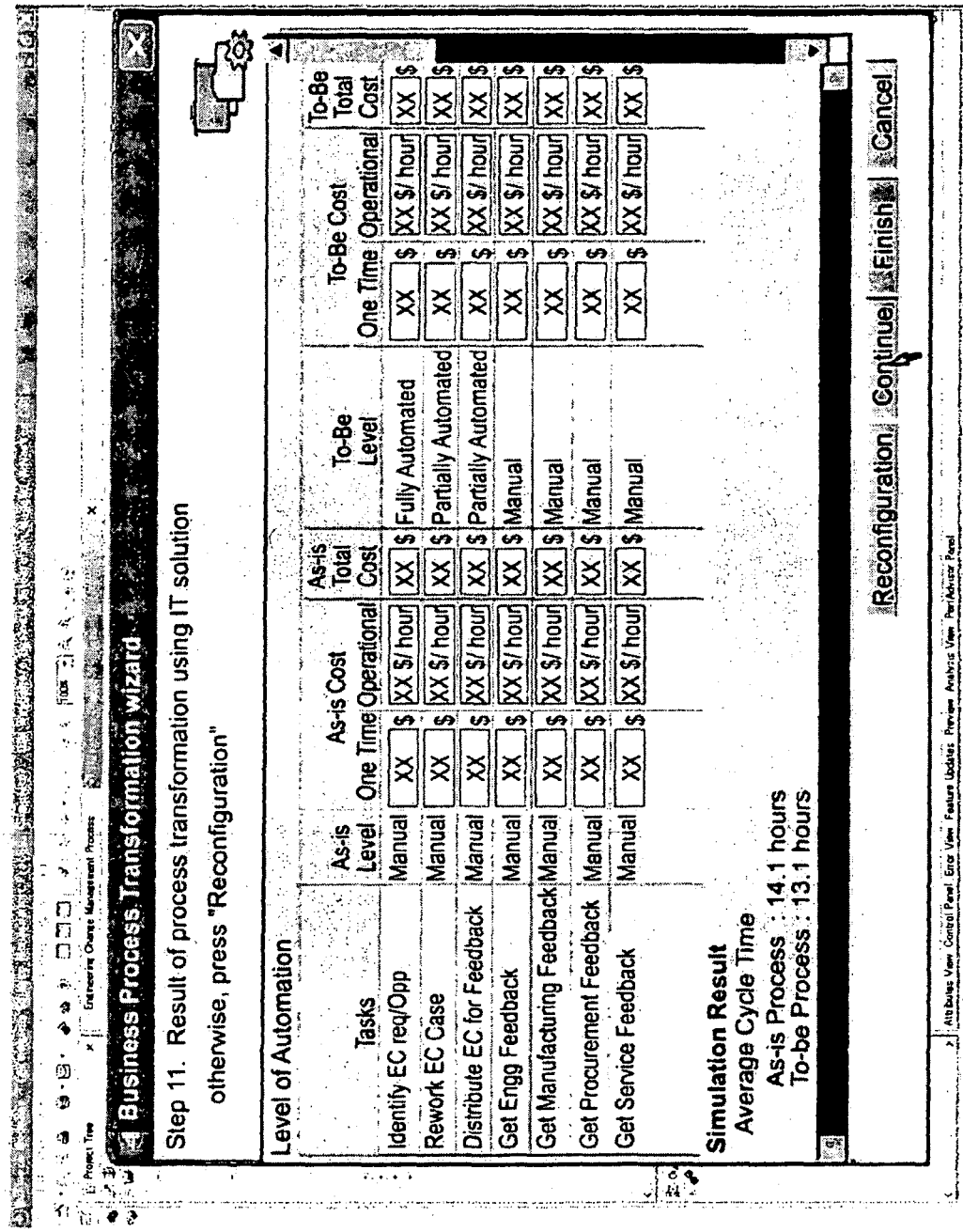
FIG. 39 is a screen print showing the results of the analysis of the potential for improving the process using business integration and process automation solutions using IT.
Figure 40:
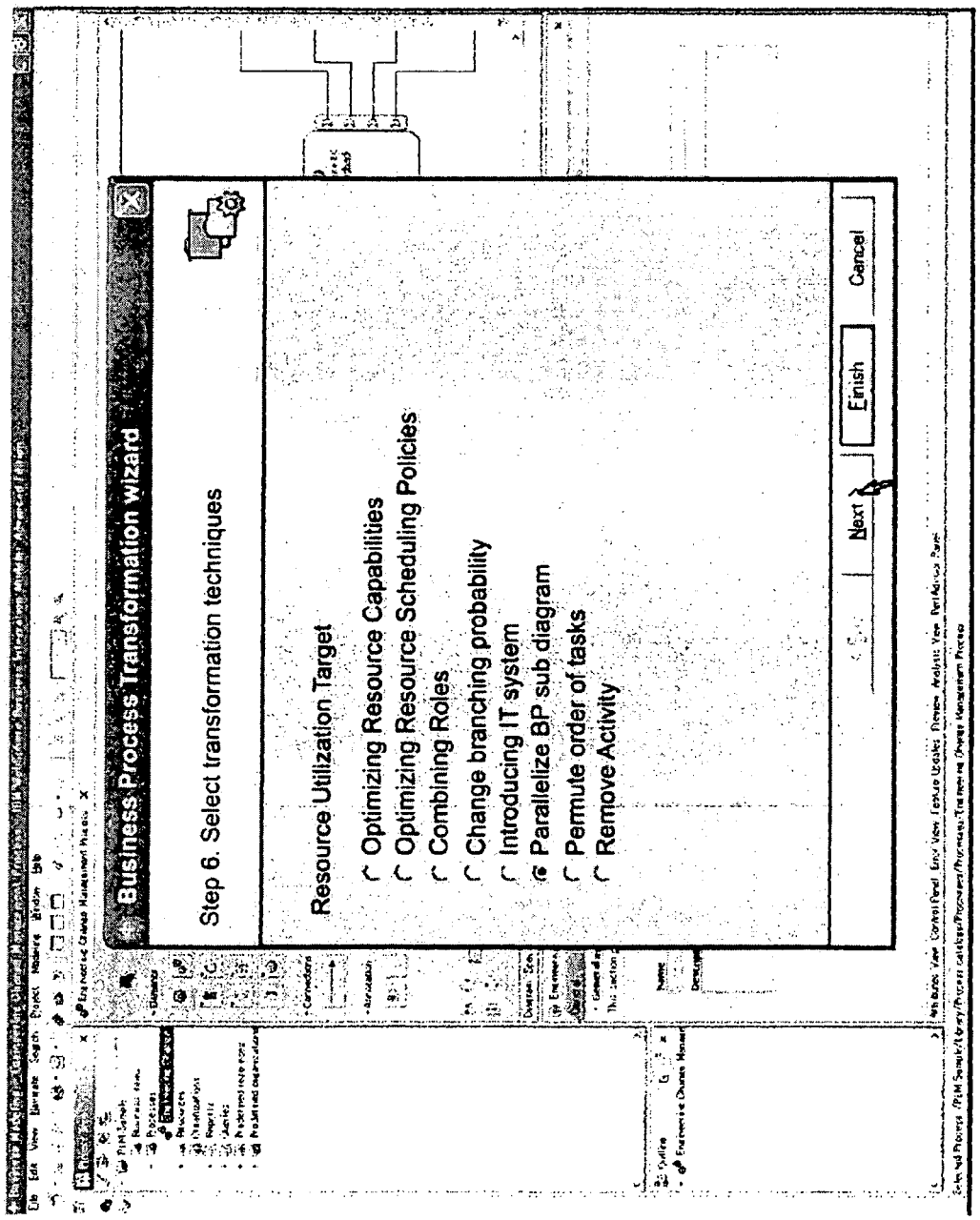
FIG. 40 is a screen print showing the screen prompting the analyst to select process transformation methods in which "Parallelize BP sub diagram" is selected.
Figure 41:
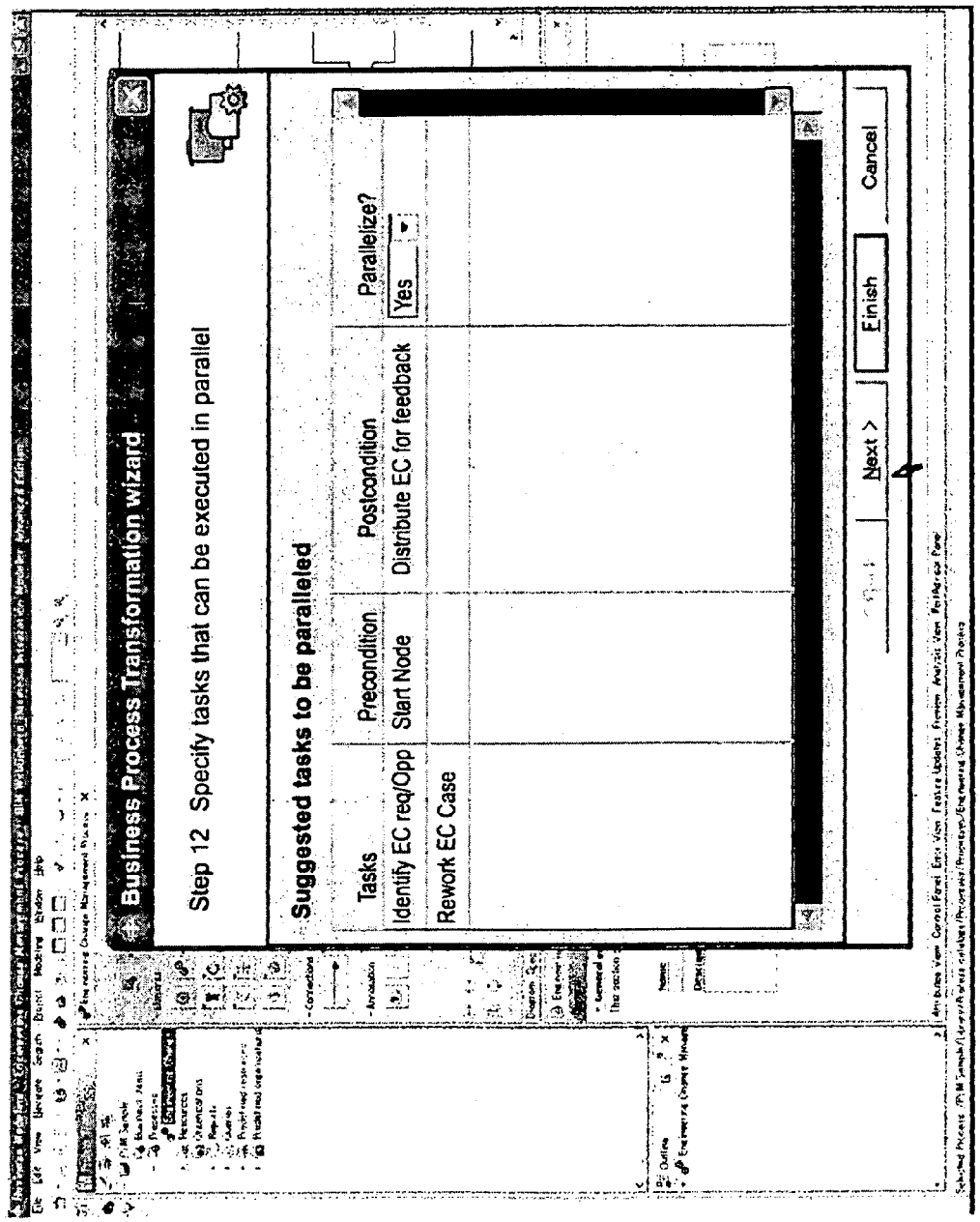
FIG. 41 is a screen print showing the screen prompting the analyst to specify tasks that can be executed in parallel.
Figure 42:
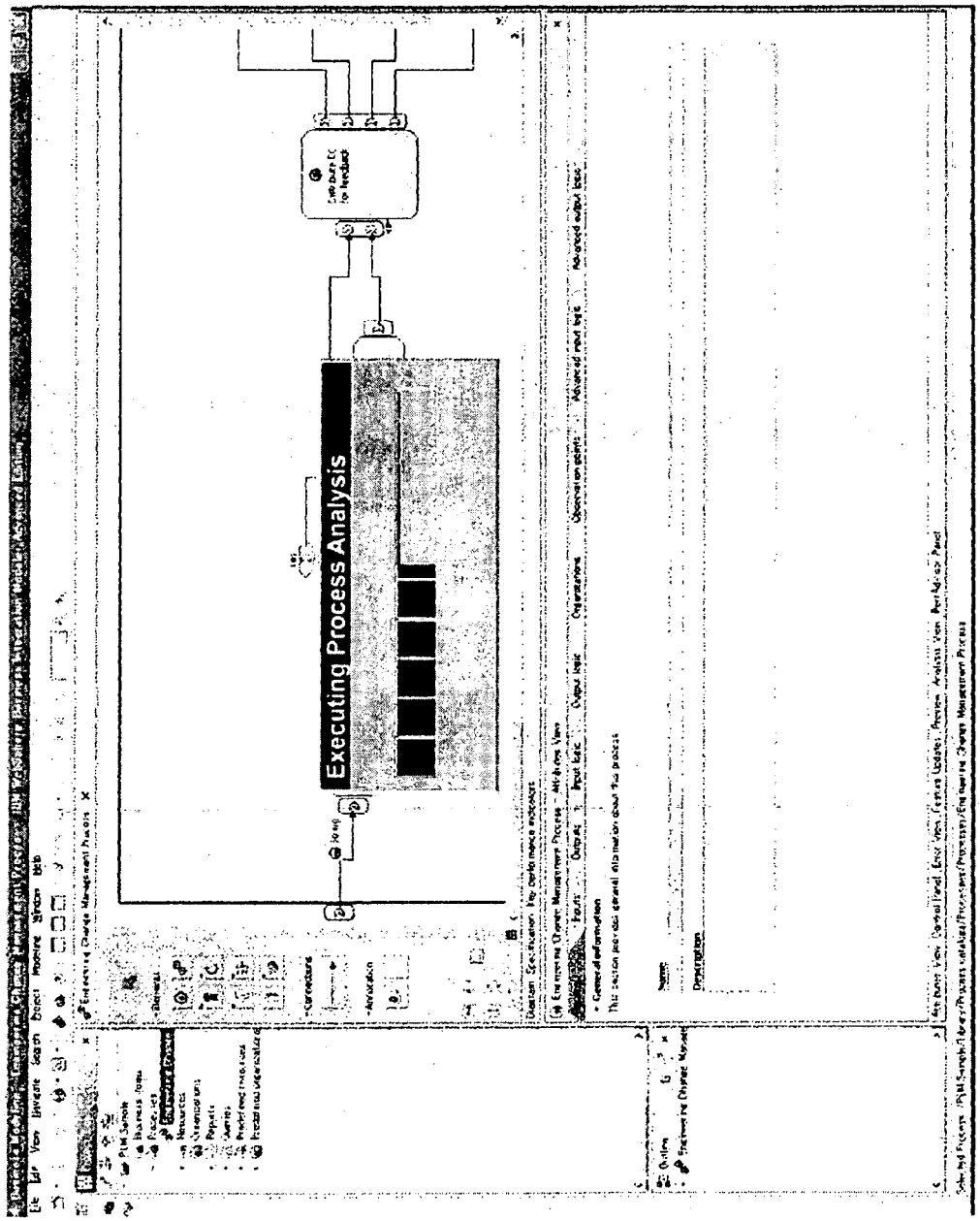
FIG. 42 is a screen print showing the screen while the Business Process Transform Wizard (BPTW) executes process analysis for the impact of changing process topology by executing some tasks in parallel.
Figure 43:
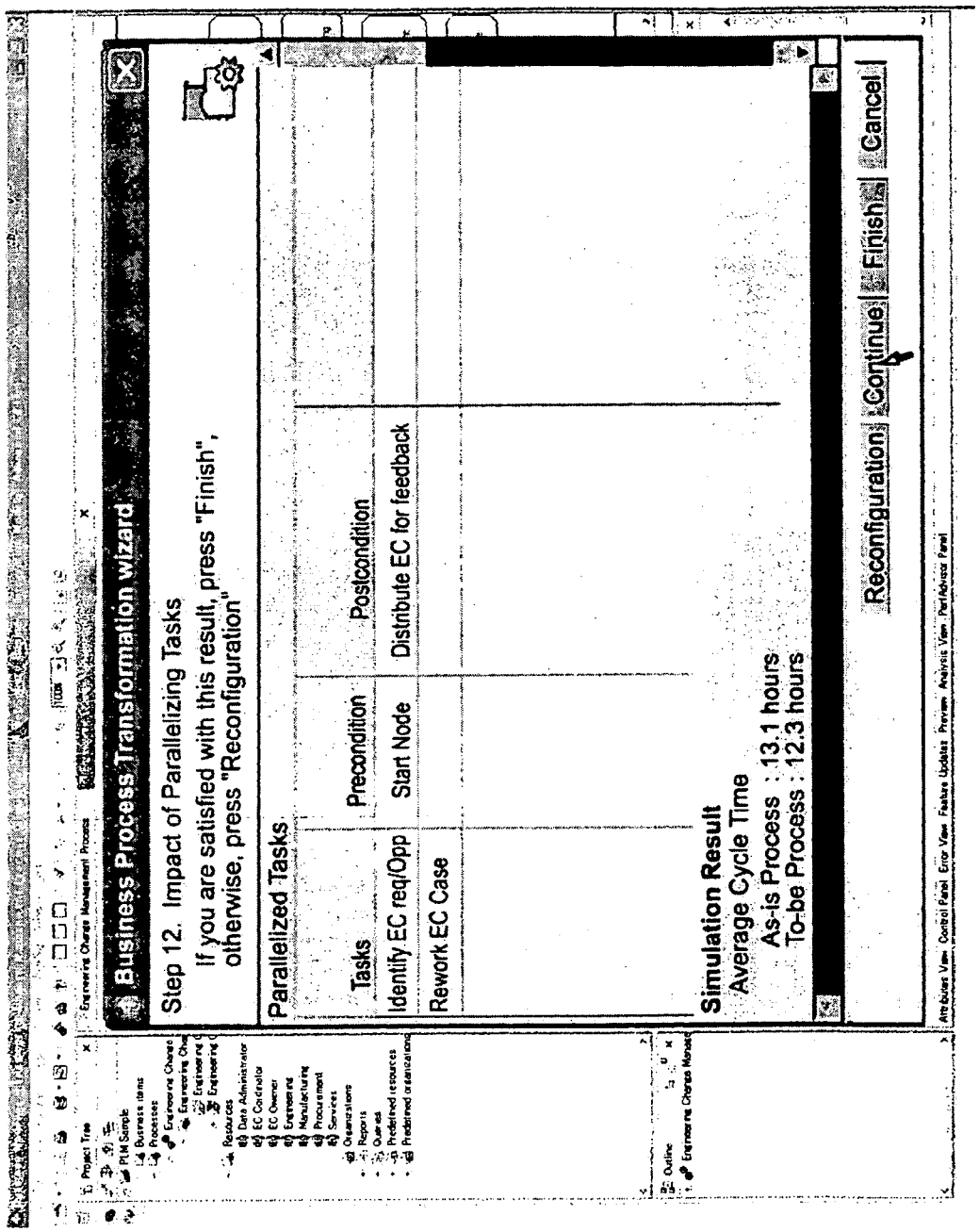
FIG. 43 is a screen print showing the results of the analysis of the impact of parallelizing some tasks on overall KPIs.

After selecting the "Continue" button at the bottom of the screen shown in FIG. 39, a return is made to Step 6 and the screen displayed is shown in FIG. 40, which again is the same as the screen shown in FIG. 20 and again prompts the business analyst to select transformation techniques. In the screen shown in FIG. 40, the option "Parallelize BP sub diagram" has been selected. This is Step 12 of the process by which the Wizard leads the business analyst through the transformation process. With this option, the Business Process Transformation Wizard requests the business analyst to specify process activities that can be potentially executed in parallel. This can be alternatively suggested by the Wizard which executes the process analysis (multiple times as appropriate) and identifies the combination of activities that can be executed in parallel, which result in overall business process performance improvement. The screen shown in FIG. 41 is displayed and prompts the business analyst to specify tasks that can be executed in parallel. After entering those tasks, the business analyst selects the "Next" button at the bottom of the screen. The Business Process Transformation Wizard then executes the process analysis, during which time the screen shown in FIG. 42 is displayed. When the process analysis is completed by the Business Process Transformation Wizard, the results of the impact of parallelizing some tasks have on overall process KPIs are displayed in the screen shown in FIG. 43.

Figure 44:
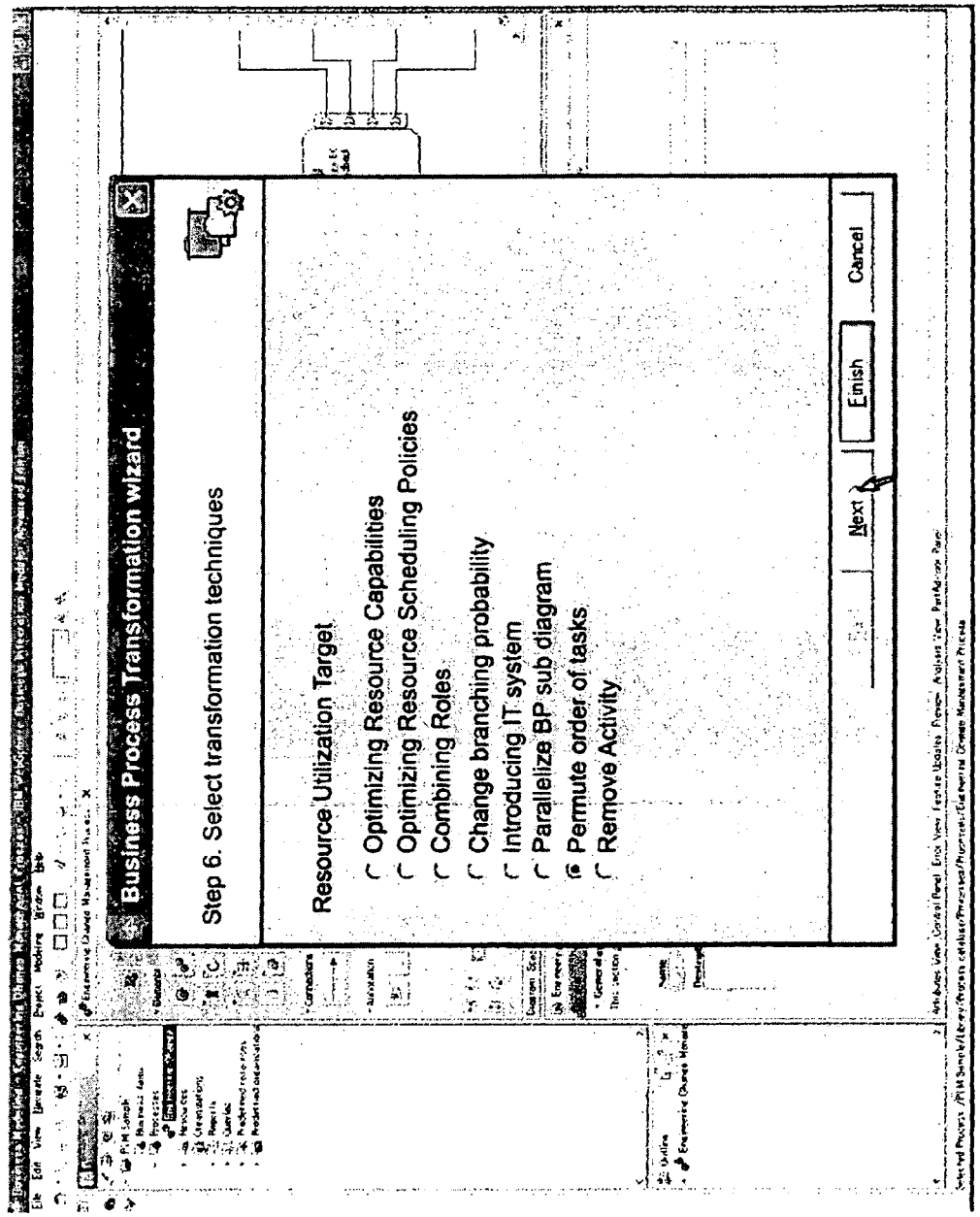
FIG. 44 is a screen print showing the screen prompting the analyst to select process transformation methods in which "Permute Order of Tasks" is selected.
Figure 45:
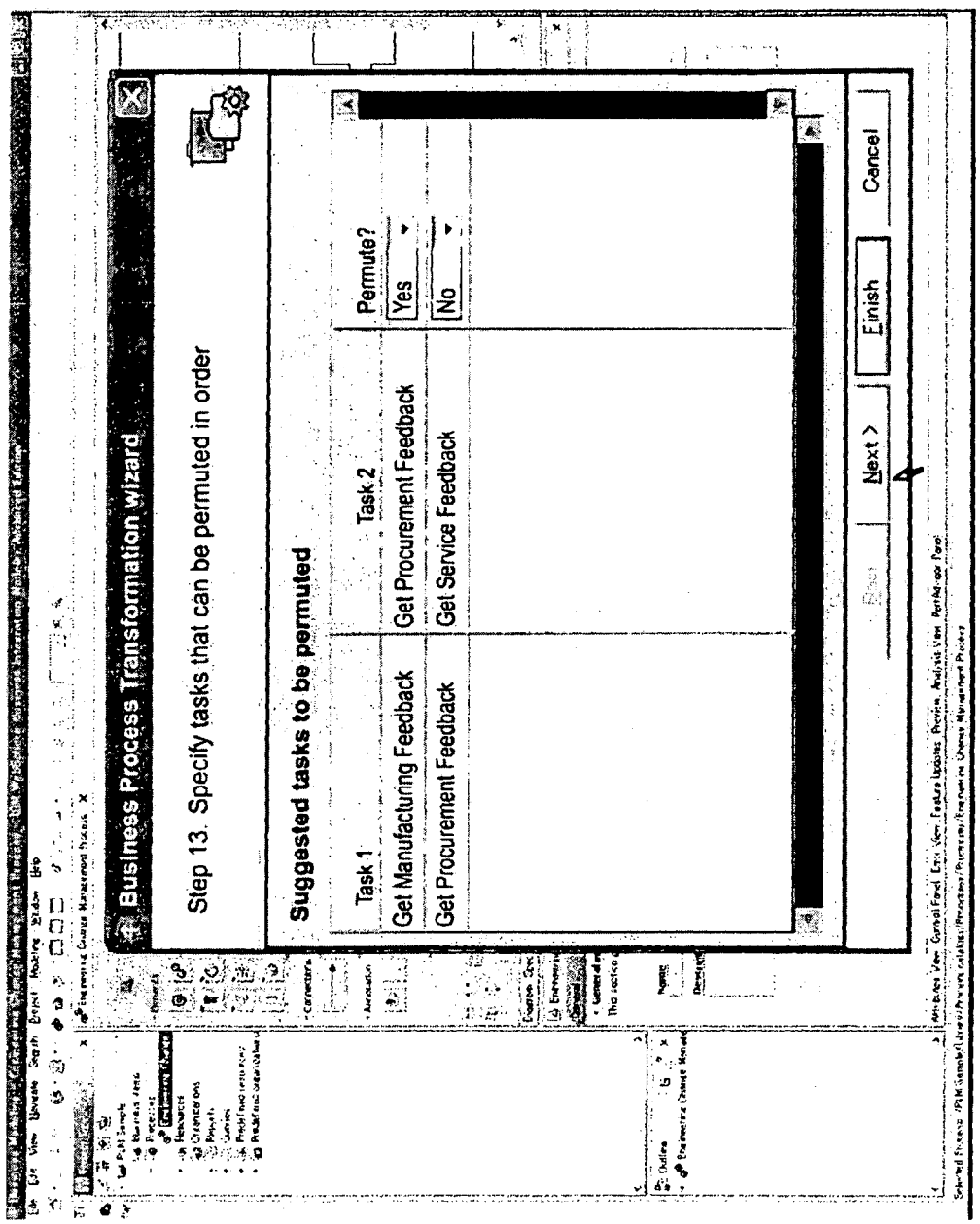
FIG. 45 is a screen print showing the screen prompting the analyst to specify tasks that can be permuted in order.
Figure 46:
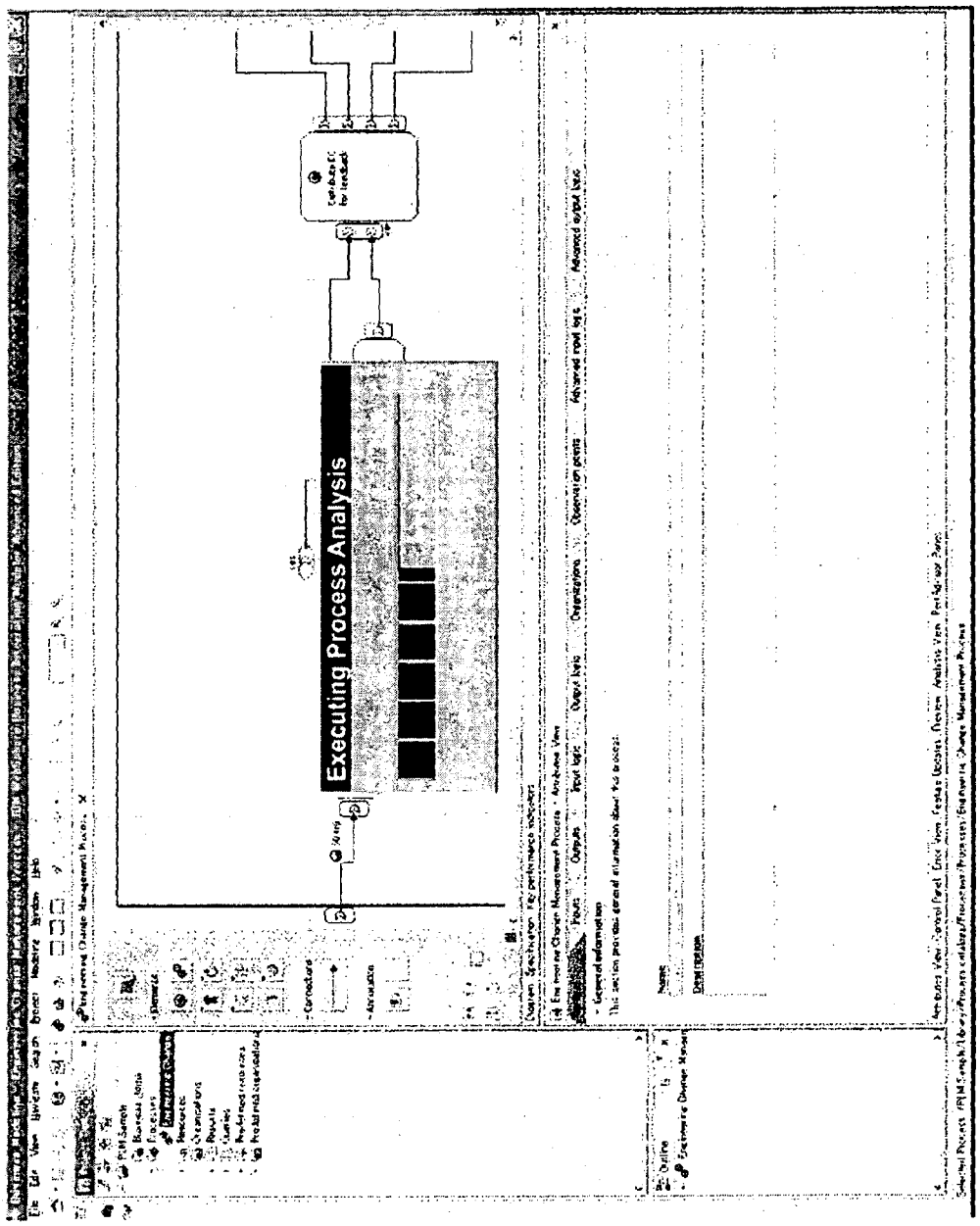
FIG. 46 is a screen print showing the screen while the Business Process Transform Wizard (BPTW) executes process analysis for the impact of permuting process tasks.
Figure 47:
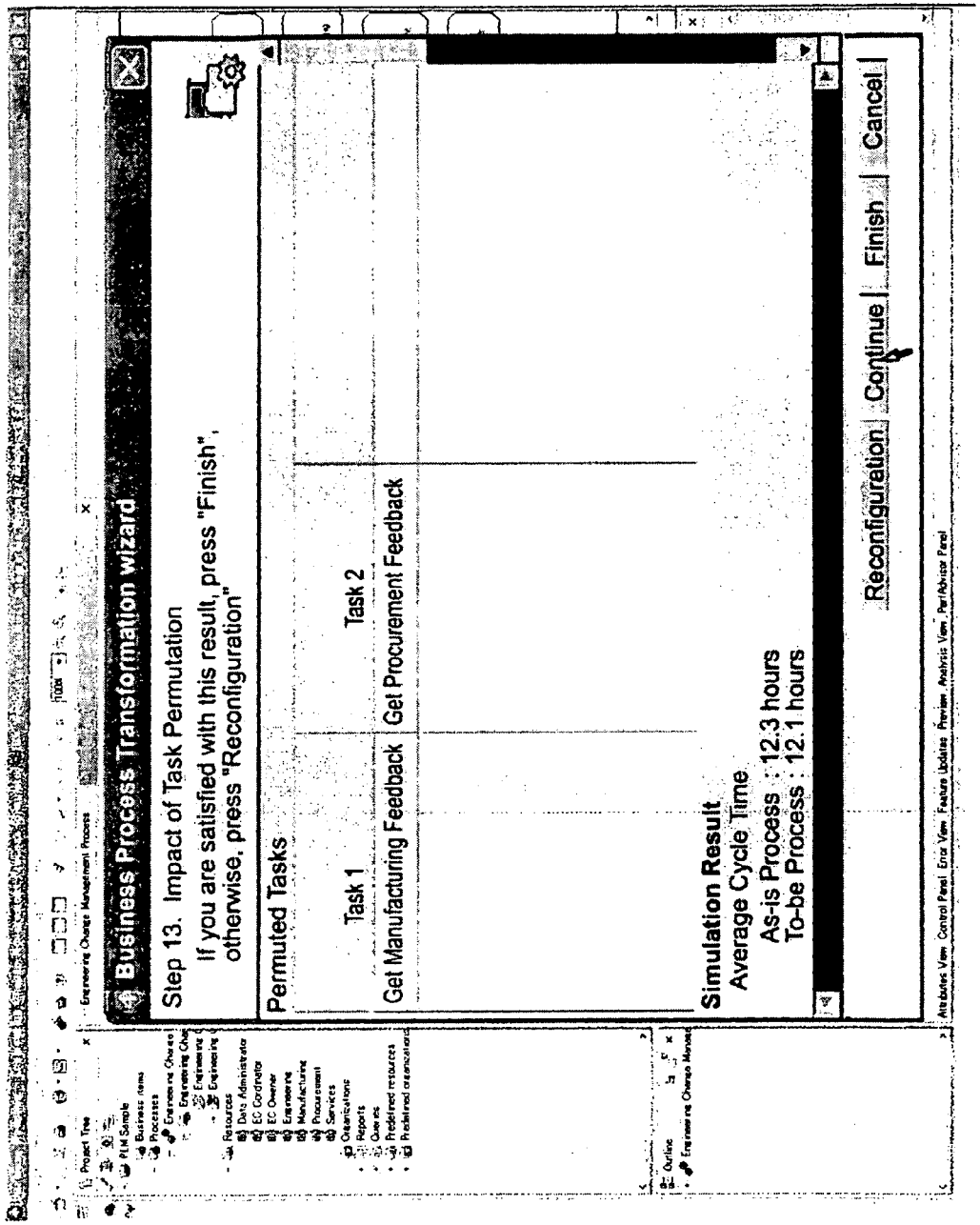
FIG. 47 is a screen print showing the results of the analysis of the impact of permuting process tasks.

After selecting the "Continue" button at the bottom of the screen shown in FIG. 43, the Wizard again returns to Step 6 and the screen shown in FIG. 44 is displayed, which again is the same as the screen shown in FIG. 20 and again prompts the business analyst to select transformation techniques. In the screen shown in FIG. 44, the option "Permute Order of Tasks" has been selected. This is Step 13 of the process by which the Wizard leads the business analyst through the transformation process. The screen shown in FIG. 45 is displayed and prompts the business analyst to specify tasks that can be permuted in order. After entering those tasks, the business analyst selects the "Next" button at the bottom of the screen. The Business Process Transformation Wizard then executes the process analysis, during which time the screen shown in FIG. 46 is displayed. When the process analysis is completed by the Business Process Transformation Wizard, the results of the impact of permuting process tasks are displayed in the screen shown in FIG. 47.

Figure 48:
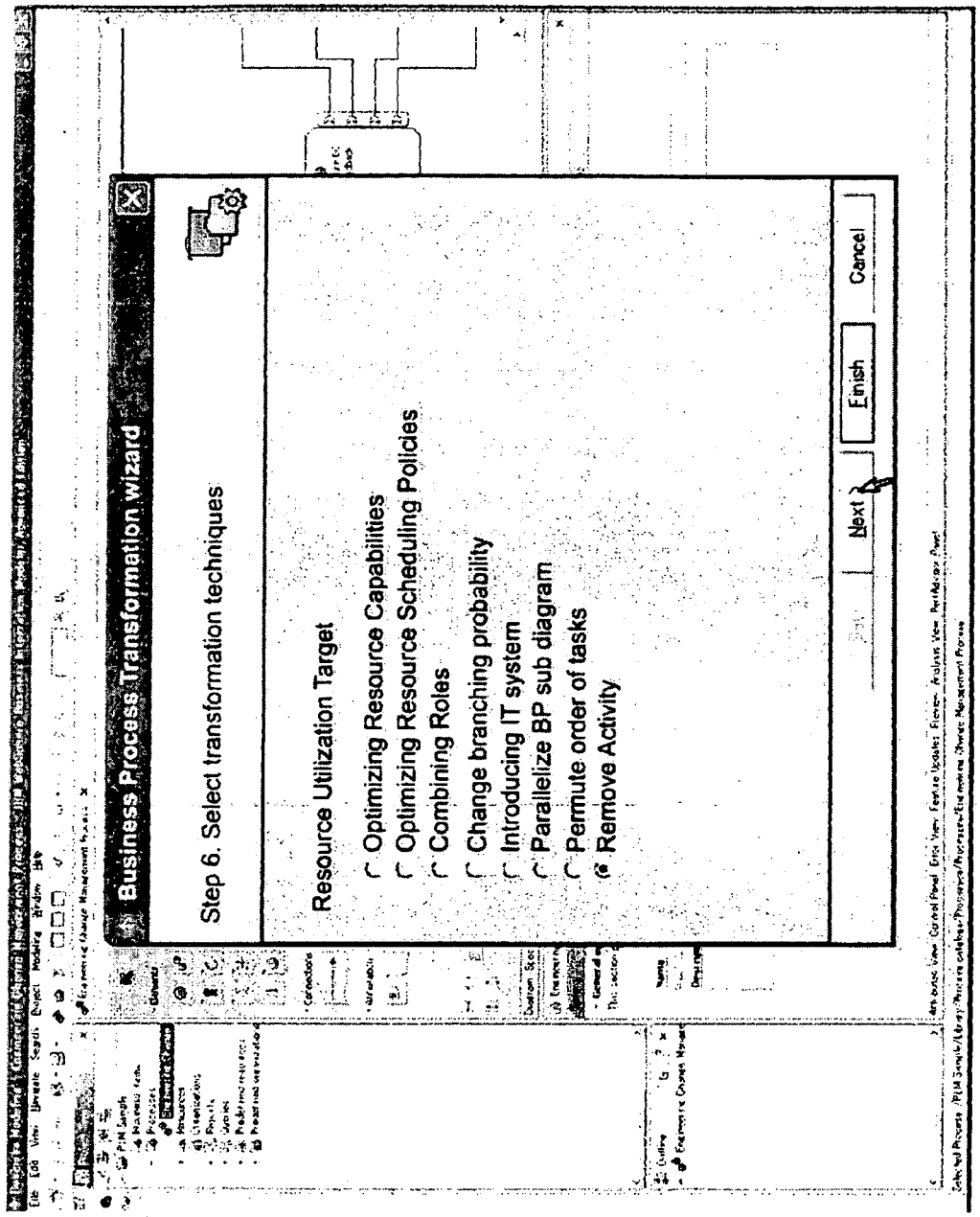
FIG. 48 is a screen print showing the screen prompting the analyst to select process transformation methods in which "Remove Activity" is selected.
Figure 49:
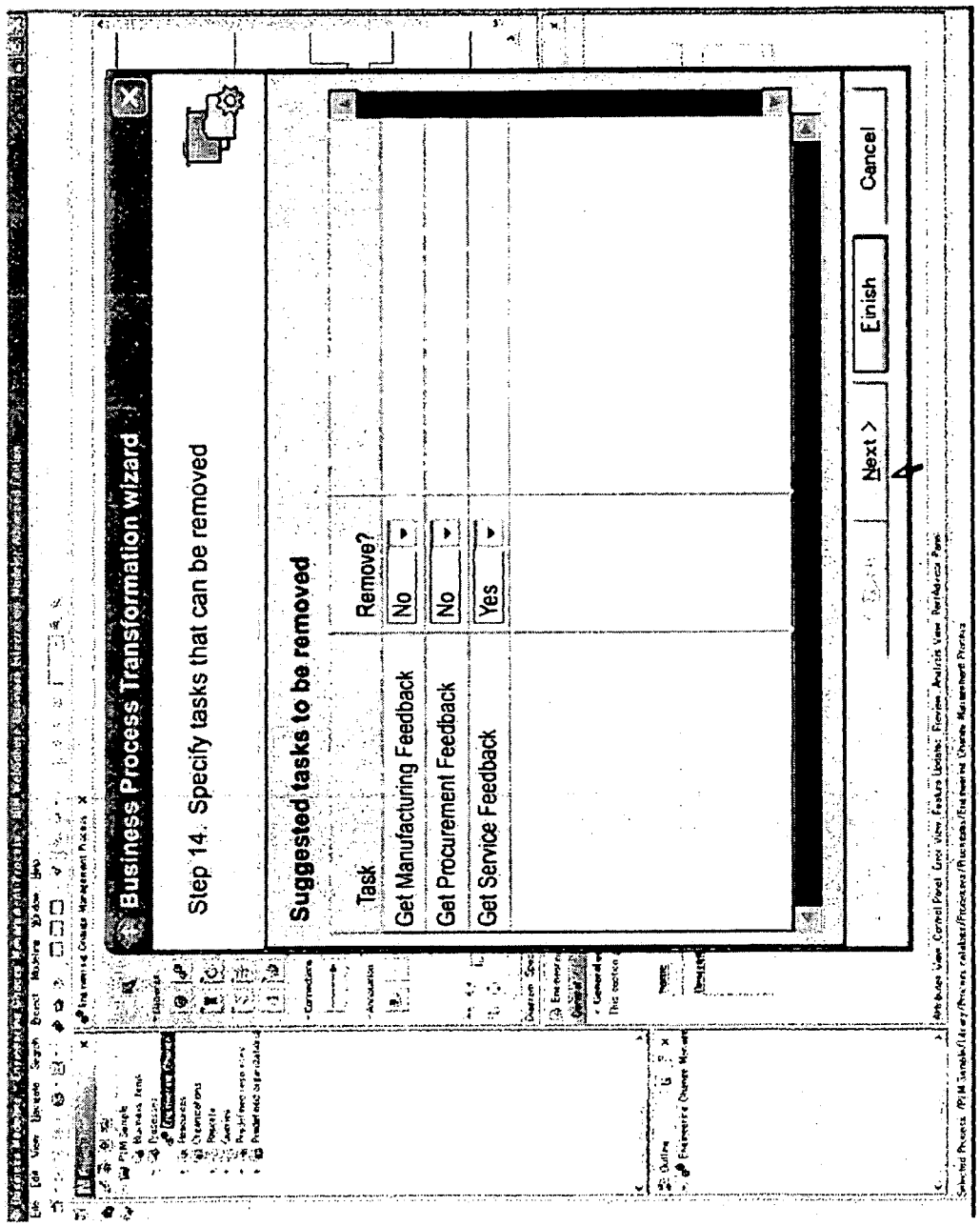
FIG. 49 is a screen print showing the screen prompting the analyst to specify tasks that can be removed.
Figure 50:
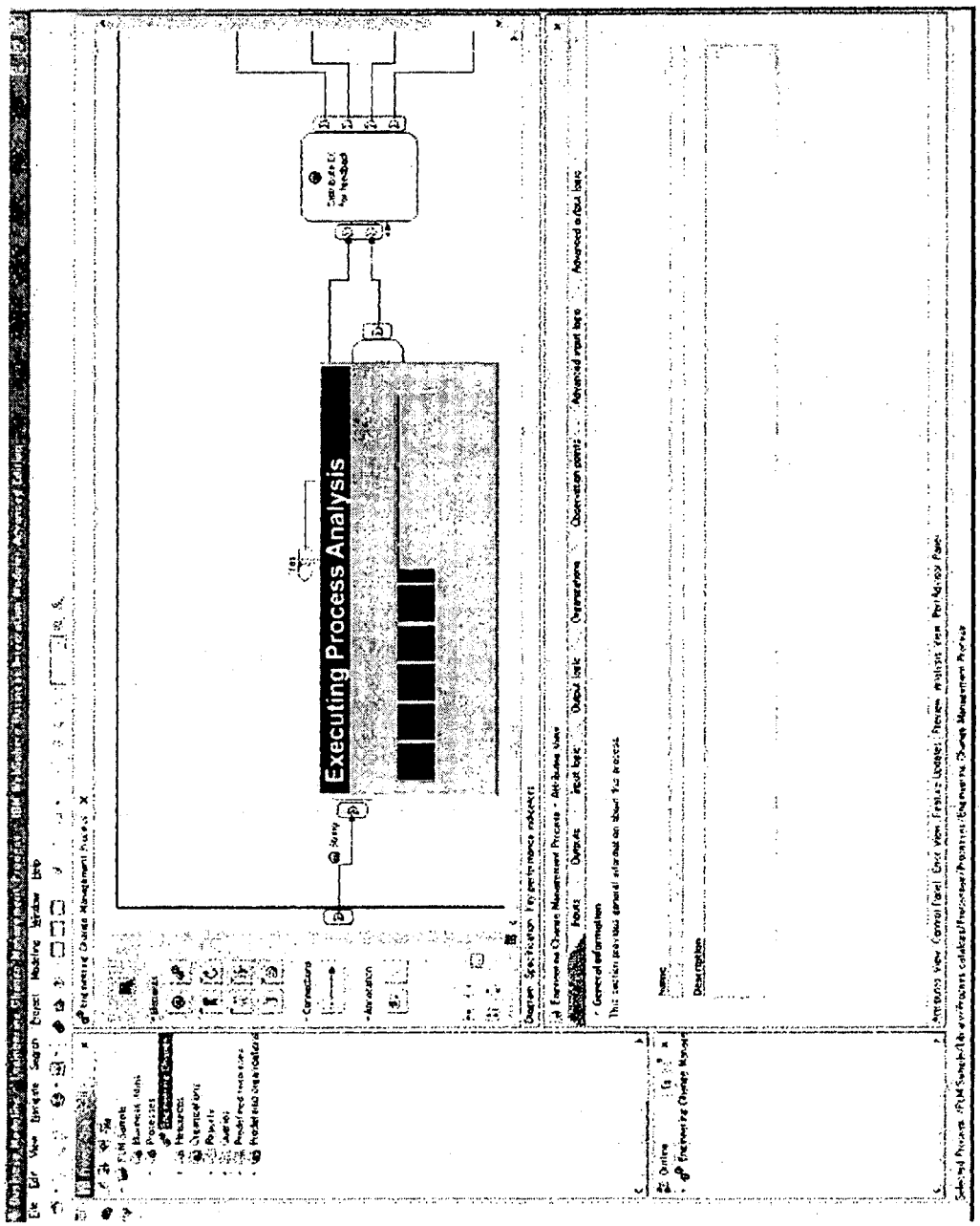
FIG. 50 is a screen print showing the screen while the Business Process Transform Wizard (BPTW) executes process analysis for the impact of removing the specified process tasks.
Figure 51:
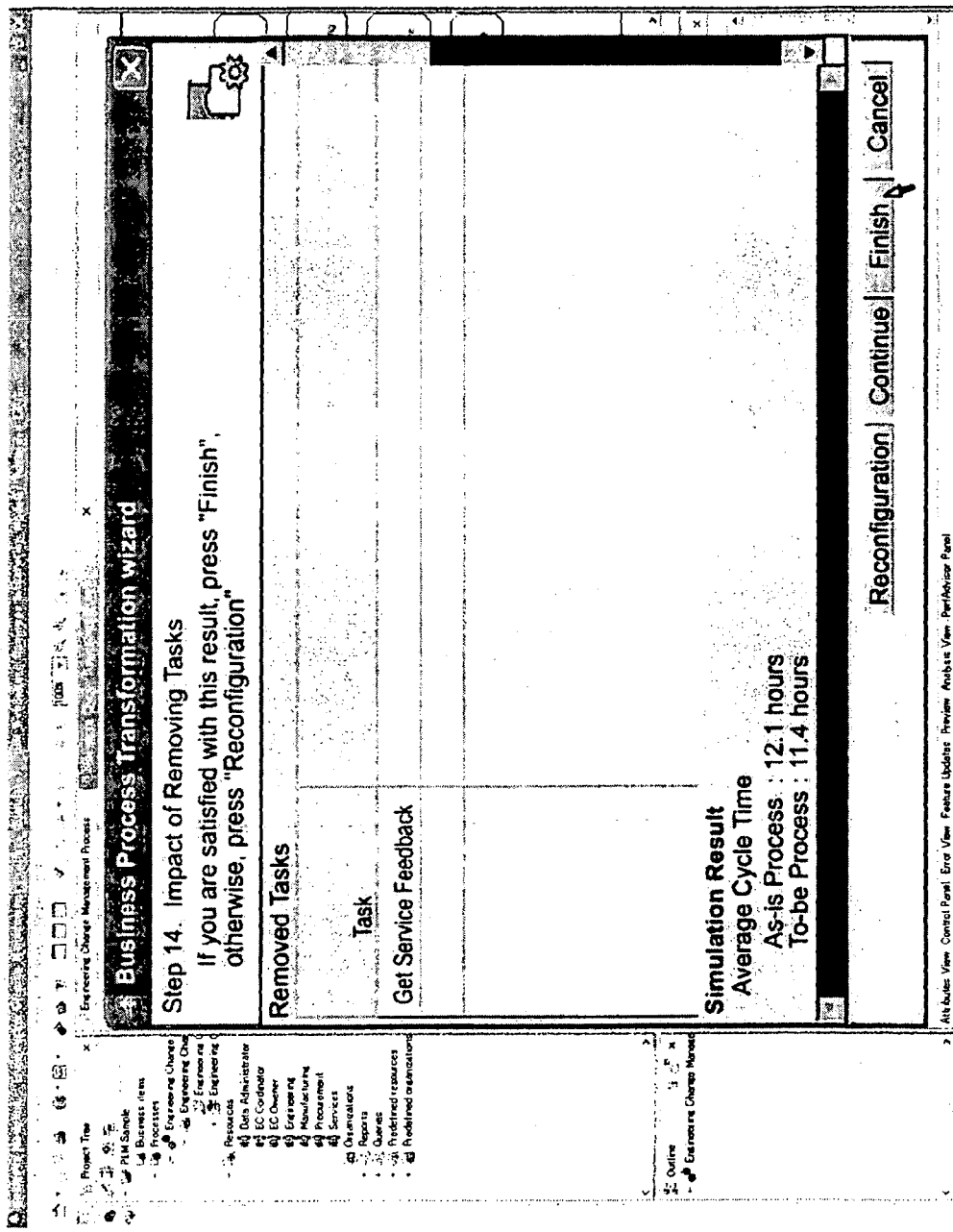
FIG. 51 is a screen print showing the results of the analysis of the potential for the impact of removing tasks in the business process.

After selecting the "Continue" button at the bottom of the screen shown in FIG. 47, a return is again made to Step 6 and the screen displayed is shown in FIG. 48, which again is the same as the screen shown in FIG. 20 and again prompts the business analyst to select transformation techniques. In the screen shown in FIG. 48, the option "Remove Activity" has been selected. This is Step 14 in the process by which the Wizard leads the business analyst through the transformation process. With this option, the Wizard requests the business analyst to specify process activities that can be potentially removed. For example, multi-step approval activities can be removed by delegation of authority. The Wizard executes the process analysis and identifies the overall impact of the improvement. The screen shown in FIG. 49 is displayed and prompts the business analyst to specify tasks that can be removed. After entering those tasks, the business analyst selects the "Next" button at the bottom of the screen. The Business Process Transformation Wizard then executes the process analysis, during which time the screen shown in FIG. 50 is displayed. When the process analysis is completed by the Business Process Transformation Wizard, the results of the impact of removing tasks are displayed in the screen shown in FIG. 51.

Figure 52:
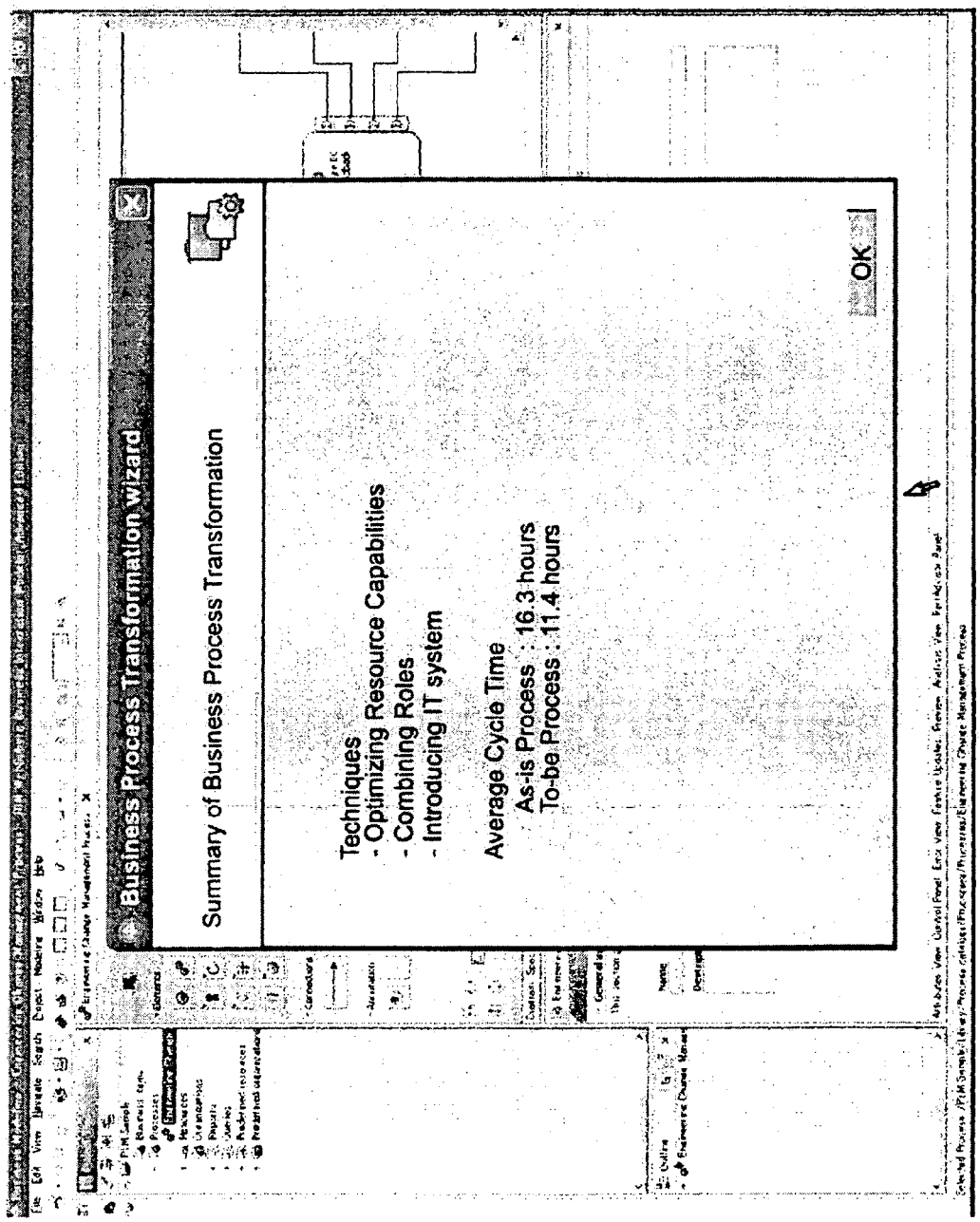
FIG. 52 is a screen print showing a summary of the business process transformation which has been performed by the Business Process Transformation Wizard (BPTW) (a subset of transformations have been chosen from the larger set of transformation patterns.

This completes the processing of function block 406 shown in FIG. 19. Step 15, shown in FIG. 52, is a summary of the analytic processes the business analyst has invoked through the the Business Process Transformation Wizard. The analyst may have chosen and analyzed several transformation patterns, and then selects a subset for designing a "To-Be" process.

Figure 53A:
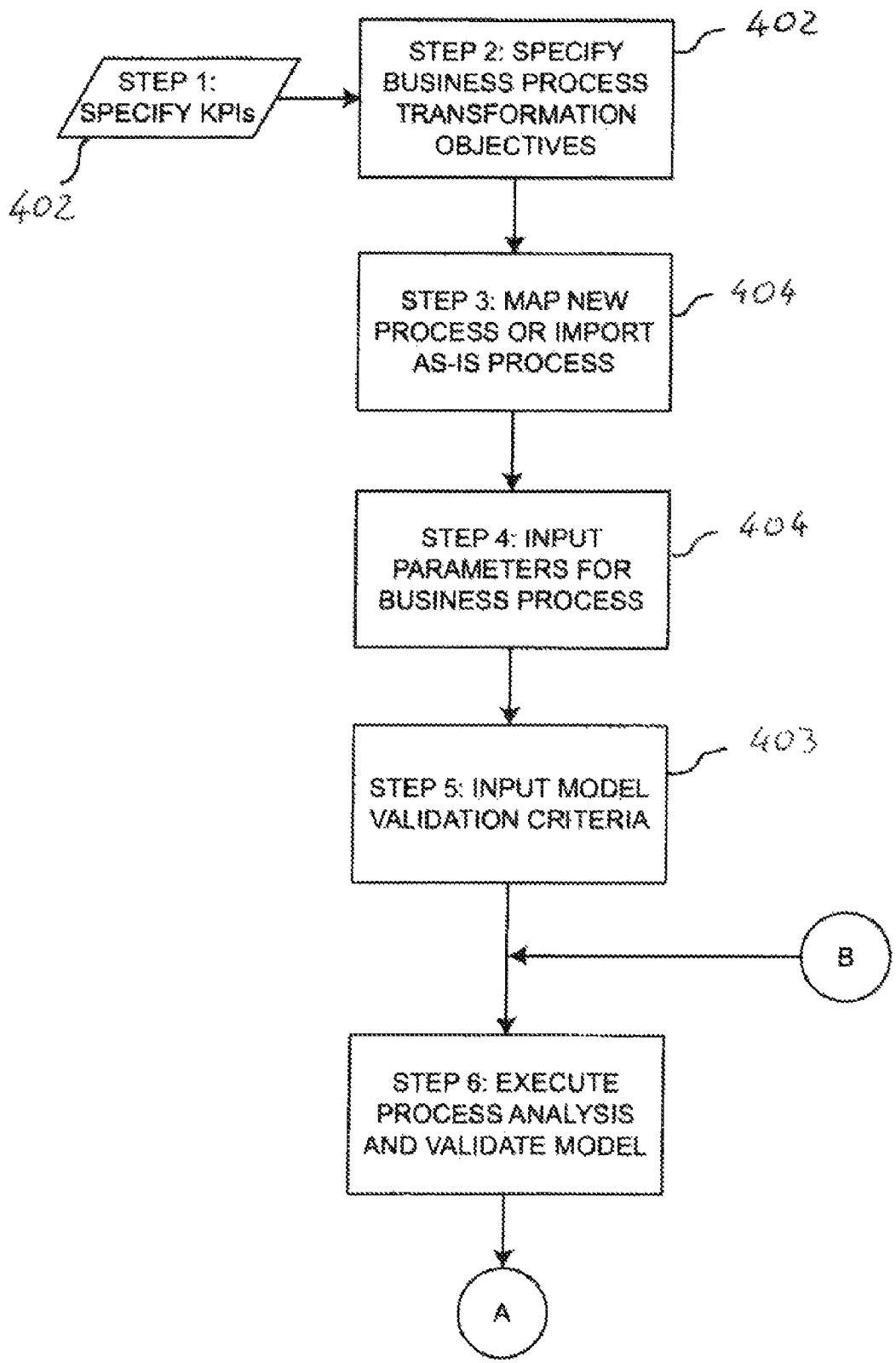
FIGS. 53A and 53B, taken together, are a flow diagram summarizing the several steps implemented by the Business Process Transform Wizard (BPTW) according to the invention.
Figure 53B:
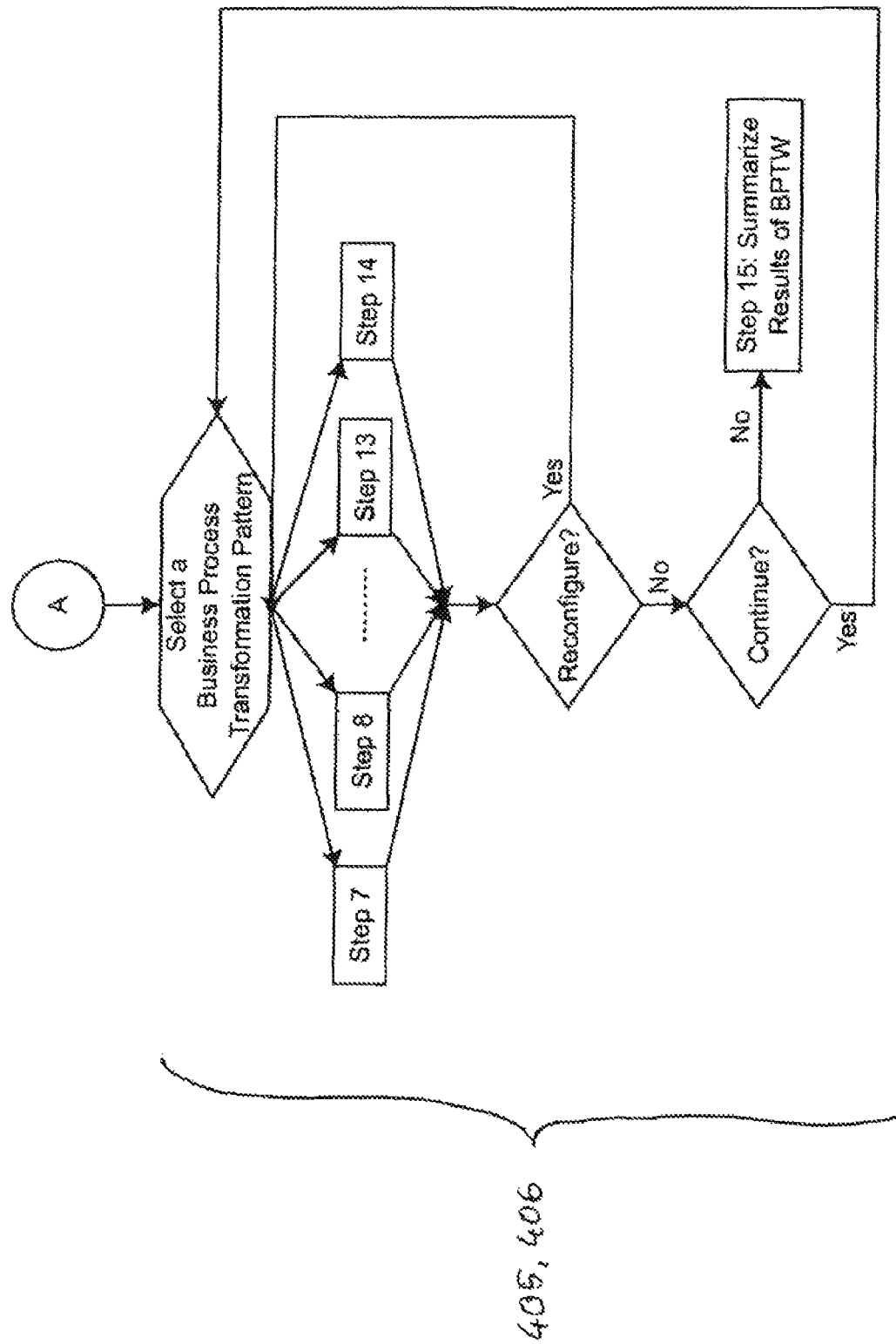

FIGS. 53A and 53B provide in flow diagram form a summary of the steps by which the Wizard leads a business analyst through various transformation options. Notice that steps 7 to 14 can possibly be done individually or in different combinations. Also this invention is not limited by the specifics of the individual steps described above. Modifications of the individual steps or additional steps are within the scope of the invention. Moreover, different analysis techniques such as discrete event simulation, simulation optimization, systems dynamics, queuing analytics etc. can be invoked within steps 7 to 14.

Note that the scope of this invention is not restricted by specific details of transformation patterns. Further, the transformation patterns may be analyzed in any sequential order and any subset of patterns may be chosen for analysis. Moreover, the analyst may go back and forth to perform different types of analysis. The scope of this invention is not restricted by sequence specific details of the Transformation Wizard. The Wizard may also be used with a knowledge database that contains specific information of the effectiveness of different transformation patterns on specific business process patterns.

Therefore, while the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A computer implemented method for a business process transformation wizard to assess by computer analysis business processes and to identify by computer analysis transformation options, comprising the steps of:

on-screen prompting on a display by a business process transformation wizard running on at least one computer, of a business analyst to specify business objectives of process transformation, said business process transformation wizard displays a menu of key performance indicators (KPIs) which can be selected by the business analyst, selected KPIs affecting selection by the business process transformation wizard running on said computer of a minimal set of input parameters required to build the business process model that is amenable for analysis to predict the process KPIs;

adding required parameters to a business process model by the business process transformation wizard running on said computer until the business process model is completed;

determining transformation patterns based on information contained in a knowledge database storage unit accessible by the computer, wherein the information includes different business process patterns and effectiveness of different transformation patterns for different business process patterns;

selecting, by said business analyst using said transformation wizard, transformation patterns for optimizing process parameters from a first set of transformation patterns, said first set of transformation patterns including "Optimizing Resource Capabilities", "Optimizing Resource Scheduling Policies", "Combining Roles", Change Branching Probability", and "Introducing IT Systems", optimizing, by the business process transformation wizard running on said computer, process parameters using an optimization technique and said selected transformation patterns for optimizing process parameters; and selecting, by said business analyst using said transformation wizard, transformation patterns for optimizing topology of the business process from a second set of transformation patterns, said second set of transformation patterns including "Parallelize Business Process sub system", "Permute Order of Tasks", and "Remove Activity" and, for each selected transformation pattern from said second set of transformation patterns;

optimizing, by the business process transformation wizard running on said computer, topology for the business process using a transformation technique and said selected transformation patterns for optimizing topology.

2. The computer implemented method for a business transformation wizard as recited in claim 1 wherein inputs for the business transformation wizard running on said computer are obtained from design-time business process modeling systems.

3. The computer implemented method for a business transformation wizard as recited in claim 1 wherein inputs for the business transformation wizard running on said computer are obtained from run-time business process monitoring systems.

4. The computer implemented method for a business transformation wizard as recited in claim 1 wherein the outputs for the business transformation wizard running on said computer are deployed in run-time as a business process in a business process management system.

5. The computer implemented method for a business transformation wizard as recited in claim 1 further comprising the steps of:
on-screen prompting on the display, by the business process transformation wizard running on said computer, of the business analyst to provide business model validation criteria; and
executing a process analysis by the business process transformation wizard running on said computer to check whether results of the analysis validate the model according to criteria specified by the business analyst.

6. The computer implemented method for a business transformation wizard as recited in claim 1 wherein the steps of on-screen prompting the business analyst to select transformation patterns for optimizing process parameters from said first set of transformation patterns and on-screen prompting the business analyst to select transformation patterns for optimizing topology from said second set of transformation patterns of the business process include displaying on said display a menu of transformation techniques or transformation patterns which may be selected by the business analyst.

7. A computer system implementing a business process transformation wizard comprising:
at least one processing unit communicating with a memory device storing an interactive transformation wizard program for leading a business analyst through analytic methods for analyzing a business process;
a display device controlled by said processing unit and supporting a graphic user interface; and
at least one user input device providing input to said processing unit and permitting interaction with said graphic user interface, said interactive transformation wizard program when executed by the processing unit, performing the steps of:
prompting by the business process transformation wizard a business analyst to select a business process to be optimized;
prompting by the business process transformation wizard the business analyst to specify business objectives of process transformation, said business process transformation wizard displays a menu of key performance indicators (KPIs) which can be selected by the business analyst, selected KPIs affecting selection by the business process transformation wizard running on said computer of a minimal set of input parameters required to build the business process model that is amenable for analysis to predict the process KPIs;
adding required parameters to a business process model by the business process transformation wizard until the business process model is completed:
determining transformation patterns based on information contained in a knowledge database storage unit accessible by the computer, wherein the information includes different business process patterns and effectiveness of different transformation patterns for different business process patterns;
selecting, by said business analyst using said transformation wizard, transformation patterns for optimizing process parameters from a first set of transformation patterns, said first set of transformation patterns including "Optimizing Resource Capabilities", "Optimizing Resource Scheduling Policies", "Combining Roles", Change Branching Probability", and "Introducing IT Systems";
optimizing, by the business process transformation wizard process parameters using an optimization technique and said selected transformation patterns for optimizing process parameters; and
selecting, by said business analyst using said transformation wizard, transformation patterns for optimizing topology of the business process from a second set of transformation patterns, said second set of transformation patterns including "Parallelize Business Process sub system", "Permute Order of Tasks", and "Remove Activity" and, for each selected transformation pattern from said second set of transformation patterns;
optimizing, by the business process transformation wizard topology for the business process using a transformation technique and said selected transformation patterns for optimizing topology.

8. A non-transitory computer readable media containing code for implementing business process transformation wizard which analyzes business processes and identifies computer analysis transformation options, which when executed performs the steps of:
on-screen prompting on a display of a business analyst, by the business process transformation wizard to select a business process to be optimized,
on-screen prompting on said display of the business analyst, to specify business objectives of process transformation, said business process transformation wizard displays a menu of key performance indicators (KPIs) which can be selected by the business analyst, selected KPIs affecting selection by the business process transformation wizard running on said computer of a minimal set of input parameters required to build the business process model that is amenable for analysis to predict the process KPIs;

adding required parameters to a business process model by the business process transformation wizard until the business process model is completed;

determining transformation patterns based on information contained in a knowledge database storage unit, wherein the information includes different business process patterns and effectiveness of different transformation patterns for different business process patterns;

receiving selections from said business analyst using said transformation wizard, transformation patterns for optimizing process parameters from a first set of transformation patterns, said first set of transformation patterns including "Optimizing Resource Capabilities", "Optimizing Resource Scheduling Policies", "Combining Roles", Change Branching Probability", and "Introducing IT Systems";

optimizing, by the business process transformation wizard process parameters using an optimization technique and said selected transformation patterns for optimizing process parameters;

receiving selection from said business analyst using said transformation wizard, transformation patterns for optimizing topology of the business process from a second set of transformation patterns, said second set of transformation patterns including "Parallelize Business Process sub system", "Permute Order of Tasks", and "Remove Activity" and, for each selected transformation pattern from said second set of transformation patterns;

optimizing, by the business process transformation wizard topology for the business process using a transformation technique and said selected transformation patterns for optimizing topology.

* * * * *